United States Patent
Samuels et al.

(10) Patent No.: US 9,479,447 B2
(45) Date of Patent: Oct. 25, 2016

(54) SYSTEMS AND METHODS FOR REAL-TIME ENDPOINT APPLICATION FLOW CONTROL WITH NETWORK STRUCTURE COMPONENT

(71) Applicant: Citrix Systems, Inc., Fort Lauderdale, FL (US)

(72) Inventors: Allen R. Samuels, San Jose, CA (US); Henry Collins, High Wycombe (GB)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 118 days.

(21) Appl. No.: 14/080,453

(22) Filed: Nov. 14, 2013

(65) Prior Publication Data

US 2014/0173127 A1 Jun. 19, 2014

Related U.S. Application Data

(63) Continuation of application No. 12/575,315, filed on Oct. 7, 2009, now Pat. No. 8,589,579.

(60) Provisional application No. 61/103,703, filed on Oct. 8, 2008.

(51) Int. Cl.
*H04L 12/835* (2013.01)
*H04L 12/24* (2006.01)
(Continued)

(52) U.S. Cl.
CPC .......... *H04L 47/30* (2013.01); *H04L 41/082* (2013.01); *H04L 47/10* (2013.01); *H04L 47/26* (2013.01);
(Continued)

(58) Field of Classification Search
None
See application file for complete search history.

(56) References Cited

U.S. PATENT DOCUMENTS

| 5,016,009 A | 5/1991 | Whiting et al. |
| 5,029,164 A | 7/1991 | Goldstein et al. |

(Continued)

FOREIGN PATENT DOCUMENTS

| WO | WO-02/10929 A1 | 2/2002 |
| WO | WO-03/001748 A1 | 1/2003 |

(Continued)

OTHER PUBLICATIONS

Ephremides, Anthony, and Bruce Hajek. "Information theory and communication networks: An unconsummated union." Information Theory, IEEE Transactions on 44, No. 6 (1998): 2416-2434.*

(Continued)

*Primary Examiner* — Ranodhi Serrao
*Assistant Examiner* — James Fiorillo
(74) *Attorney, Agent, or Firm* — Foley & Lardner LLP; Christopher J. McKenna

(57) ABSTRACT

The present solution is directed towards systems and methods to more efficiently control a flow of a data stream traversing at least one intermediary on a network between a client and a server. A sender transmits a first message, comprising a first value of a bandwidth between the first intermediary and a second intermediary determined by the sender, to a first intermediary. The first intermediary establishes a next value of the bandwidth between the first intermediary and the second intermediary. The sender receives from the first intermediary responsive to the first message a second message comprising the established next value of the bandwidth between the first intermediary and the second intermediary. A data transfer manager of the sender, responsive to the second message determines a size of a portion of data queued for transmission to transmit to the first intermediary and a time for transmitting the portion of data queued.

20 Claims, 13 Drawing Sheets

(51) Int. Cl.
  *H04L 12/801* (2013.01)
  *H04L 12/825* (2013.01)
  *H04L 12/841* (2013.01)
  *H04L 12/805* (2013.01)
  *H04L 12/811* (2013.01)
  *H04L 12/861* (2013.01)
  *H04W 28/24* (2009.01)
  *H04J 3/04* (2006.01)
  *H04L 12/26* (2006.01)

(52) U.S. Cl.
  CPC .............. *H04L 47/28* (2013.01); *H04L 47/36* (2013.01); *H04L 47/38* (2013.01); *H04L 49/90* (2013.01); *H04J 3/047* (2013.01); *H04L 41/0896* (2013.01); *H04L 43/0817* (2013.01); *H04L 43/0829* (2013.01); *H04L 43/0852* (2013.01); *H04W 28/24* (2013.01)

(56) References Cited

U.S. PATENT DOCUMENTS

| | | |
|---|---|---|
| 5,126,739 A | 6/1992 | Whiting et al. |
| 5,315,633 A | 5/1994 | Champa |
| 5,446,736 A | 8/1995 | Gleeson et al. |
| 5,537,551 A | 7/1996 | Denenberg et al. |
| 5,768,525 A | 6/1998 | Kralowetz et al. |
| 5,802,281 A | 9/1998 | Clapp et al. |
| 5,826,027 A | 10/1998 | Pedersen et al. |
| 5,862,260 A | 1/1999 | Rhoads |
| 5,909,559 A | 6/1999 | So |
| 5,991,542 A | 11/1999 | Han et al. |
| 6,016,535 A | 1/2000 | Krantz et al. |
| 6,052,120 A | 4/2000 | Nahi et al. |
| 6,057,857 A | 5/2000 | Bloomfield |
| 6,073,192 A | 6/2000 | Clapp et al. |
| 6,081,623 A | 6/2000 | Bloomfield et al. |
| 6,084,584 A | 7/2000 | Nahi et al. |
| 6,104,700 A | 8/2000 | Haddock et al. |
| 6,108,697 A | 8/2000 | Raymond et al. |
| 6,122,403 A | 9/2000 | Rhoads |
| 6,166,734 A | 12/2000 | Nahi et al. |
| 6,181,711 B1 | 1/2001 | Zhang et al. |
| 6,185,625 B1 | 2/2001 | Tso et al. |
| 6,253,326 B1 | 6/2001 | Lincke et al. |
| 6,256,773 B1 | 7/2001 | Bowman-Amuah |
| 6,324,647 B1 | 11/2001 | Bowman-Amuah |
| 6,343,318 B1 | 1/2002 | Hawkins et al. |
| 6,363,478 B1 | 3/2002 | Lambert et al. |
| 6,370,573 B1 | 4/2002 | Bowman-Amuah |
| 6,381,341 B1 | 4/2002 | Rhoads |
| 6,397,259 B1 | 5/2002 | Lincke et al. |
| 6,400,996 B1 | 6/2002 | Hoffberg et al. |
| 6,405,364 B1 | 6/2002 | Bowman-Amuah |
| 6,449,658 B1 | 9/2002 | Lafe et al. |
| 6,473,794 B1 | 10/2002 | Guheen et al. |
| 6,496,520 B1 | 12/2002 | Acosta |
| 6,519,571 B1 | 2/2003 | Guheen et al. |
| 6,523,027 B1 | 2/2003 | Underwood |
| 6,536,037 B1 | 3/2003 | Guheen et al. |
| 6,553,129 B1 | 4/2003 | Rhoads |
| 6,567,533 B1 | 5/2003 | Rhoads |
| 6,580,808 B2 | 6/2003 | Rhoads |
| 6,590,588 B2 | 7/2003 | Lincke et al. |
| 6,601,233 B1 | 7/2003 | Underwood |
| 6,603,470 B1 | 8/2003 | Deering |
| 6,609,128 B1 | 8/2003 | Underwood |
| 6,615,166 B1 | 9/2003 | Guheen et al. |
| 6,629,081 B1 | 9/2003 | Cornelius et al. |
| 6,633,878 B1 | 10/2003 | Underwood |
| 6,640,145 B2 | 10/2003 | Hoffberg et al. |
| 6,640,240 B1 | 10/2003 | Hoffman et al. |
| 6,647,128 B1 | 11/2003 | Rhoads |
| 6,647,130 B2 | 11/2003 | Rhoads |
| 6,662,357 B1 | 12/2003 | Bowman-Amuah |
| 6,681,029 B1 | 1/2004 | Rhoads |
| 6,700,990 B1 | 3/2004 | Rhoads |
| 6,701,345 B1 | 3/2004 | Carley et al. |
| 6,704,873 B1 | 3/2004 | Underwood |
| 6,718,535 B1 | 4/2004 | Underwood |
| 6,721,713 B1 | 4/2004 | Guheen et al. |
| 6,754,699 B2 | 6/2004 | Swildens et al. |
| 6,760,463 B2 | 7/2004 | Rhoads |
| 6,775,392 B1 | 8/2004 | Rhoads |
| 6,795,506 B1 | 9/2004 | Zhang et al. |
| 6,801,499 B1 | 10/2004 | Anandakumar et al. |
| 6,813,366 B1 | 11/2004 | Rhoads |
| 6,850,252 B1 | 2/2005 | Hoffberg |
| 6,856,651 B2 | 2/2005 | Singh |
| 6,879,701 B1 | 4/2005 | Rhoads |
| 6,918,113 B2 | 7/2005 | Patel et al. |
| 6,925,495 B2 | 8/2005 | Hegde et al. |
| 6,957,186 B1 | 10/2005 | Guheen et al. |
| 6,959,320 B2 | 10/2005 | Shah et al. |
| 6,968,364 B1 | 11/2005 | Wong et al. |
| 7,006,881 B1 | 2/2006 | Hoffberg et al. |
| 7,010,598 B2 | 3/2006 | Sitaraman et al. |
| 7,025,209 B2 | 4/2006 | Hawkins |
| 7,035,427 B2 | 4/2006 | Rhoads |
| 7,043,524 B2 | 5/2006 | Shah et al. |
| 7,051,126 B1 | 5/2006 | Franklin |
| 7,054,367 B2 | 5/2006 | Oguz et al. |
| 7,054,465 B2 | 5/2006 | Rhoads |
| 7,069,234 B1 | 6/2006 | Cornelius et al. |
| 7,070,098 B1 | 7/2006 | Lapstun et al. |
| 7,082,572 B2 | 7/2006 | Pea et al. |
| 7,100,195 B1 | 8/2006 | Underwood |
| 7,103,197 B2 | 9/2006 | Rhoads |
| 7,107,285 B2 | 9/2006 | von Kaenel et al. |
| 7,113,596 B2 | 9/2006 | Rhoads |
| 7,113,614 B2 | 9/2006 | Rhoads |
| 7,116,781 B2 | 10/2006 | Rhoads |
| 7,126,955 B2 | 10/2006 | Nabhan et al. |
| 7,127,525 B2 | 10/2006 | Coleman et al. |
| 7,134,131 B1 | 11/2006 | Hendricks et al. |
| 7,139,999 B2 | 11/2006 | Bowman-Amuah |
| 7,146,053 B1 | 12/2006 | Rijavec et al. |
| 7,149,698 B2 | 12/2006 | Guheen et al. |
| 7,150,017 B1 | 12/2006 | Vogl et al. |
| 7,165,041 B1 | 1/2007 | Guheen et al. |
| 7,167,844 B1 | 1/2007 | Leong et al. |
| 7,171,016 B1 | 1/2007 | Rhoads |
| 7,212,661 B2 | 5/2007 | Samara et al. |
| 7,251,372 B2 | 7/2007 | Wood |
| 7,292,602 B1 * | 11/2007 | Liu ............ H04J 3/047 370/437 |
| 7,451,221 B2 | 11/2008 | Basani et al. |
| 7,477,621 B1 | 1/2009 | Loc et al. |
| 7,532,642 B1 | 5/2009 | Peacock |
| 2001/0019630 A1 | 9/2001 | Johnson |
| 2002/0035596 A1 | 3/2002 | Yang et al. |
| 2002/0049608 A1 | 4/2002 | Hartsell et al. |
| 2002/0049841 A1 | 4/2002 | Johnson et al. |
| 2002/0059274 A1 | 5/2002 | Hartsell et al. |
| 2002/0065864 A1 | 5/2002 | Hartsell et al. |
| 2002/0071438 A1 | 6/2002 | Singh |
| 2002/0083183 A1 | 6/2002 | Pujare et al. |
| 2002/0083185 A1 * | 6/2002 | Ruttenberg ............ H04L 29/06 709/232 |
| 2002/0085496 A1 | 7/2002 | Jamp et al. |
| 2002/0101860 A1 | 8/2002 | Thornton et al. |
| 2002/0110084 A1 * | 8/2002 | Butt ............ H04L 47/10 370/230 |
| 2002/0174227 A1 | 11/2002 | Hartsell et al. |
| 2003/0009538 A1 | 1/2003 | Shah et al. |
| 2003/0055896 A1 | 3/2003 | Hu et al. |
| 2003/0065763 A1 | 4/2003 | Swildens et al. |
| 2004/0073512 A1 | 4/2004 | Maung |
| 2004/0146053 A1 | 7/2004 | Nabhan et al. |
| 2004/0215746 A1 | 10/2004 | McCanne et al. |
| 2005/0033858 A1 | 2/2005 | Swildens et al. |
| 2005/0063307 A1 | 3/2005 | Samuels et al. |
| 2005/0080850 A1 | 4/2005 | Salesky et al. |
| 2005/0144186 A1 | 6/2005 | Hesselink et al. |

(56) References Cited

U.S. PATENT DOCUMENTS

| | | |
|---|---|---|
| 2005/0177866 A1 | 8/2005 | Kirsch |
| 2006/0015570 A1 | 1/2006 | Khemani et al. |
| 2006/0029016 A1 | 2/2006 | Peles |
| 2006/0064716 A1 | 3/2006 | Sull et al. |
| 2006/0274828 A1 | 12/2006 | Siemens et al. |
| 2007/0245409 A1 | 10/2007 | Harris et al. |
| 2008/0165693 A1* | 7/2008 | Castro ............... H04L 12/2856 370/237 |
| 2008/0186931 A1* | 8/2008 | Prakash ............... H04W 28/24 370/338 |
| 2008/0320151 A1 | 12/2008 | McCanne et al. |
| 2009/0240766 A1* | 9/2009 | Kikkawa ............... H04L 47/27 709/203 |
| 2009/0254660 A1* | 10/2009 | Hanson ............... H04L 12/10 709/226 |
| 2010/0070628 A1* | 3/2010 | Harrang ............... H04L 47/10 709/224 |
| 2013/0204965 A1* | 8/2013 | Masputra ............... H04L 47/60 709/217 |

FOREIGN PATENT DOCUMENTS

| | | |
|---|---|---|
| WO | WO-03/075116 | 9/2003 |
| WO | WO-2004/045167 | 5/2004 |
| WO | WO-2006/074072 A3 | 7/2006 |
| WO | WO-2008/016848 | 2/2008 |

OTHER PUBLICATIONS

U.S. Appl. No. 12/575,315, filed Oct. 7, 2009.
International Preliminary Report on Patentability regarding PCT/US2009/059785 mailed on Apr. 12, 2011.
US Notice of Allowance for U.S. Appl. No. 12/575,315 dated Jul. 23, 2013.
US Office Action for U.S. Appl. No. 12/575,315 dated Oct. 16, 2012.
US Office Action for U.S. Appl. No. 12/575,315 dated Mar. 26, 2012.
US Office Action for U.S. Appl. No. 12/575,315 dated Mar. 4, 2013.
Written Opinion of the International Searching Authority regarding PCT/US2009/059785 mailed on Apr. 12, 2011.

* cited by examiner

SYSTEMS AND METHODS FOR REAL-TIME ENDPOINT APPLICATION FLOW CONTROL WITH NETWORK STRUCTURE COMPONENT

RELATED APPLICATION

This application claims priority to and is a continuation of U.S. application Ser. No. 12/575,315, entitled "Systems And Methods For Real-Time Endpoint Application Flow Control With Network Structure Component", and filed on Oct. 7, 2009, which claims the benefit of priority to U.S. Provisional Application No. 61/103,703, entitled "Systems And Methods For Real-Time Endpoint Application Flow Control With Network Structure Component", filed on Oct. 8, 2008, all of which are incorporated herein by reference in their entirety.

FIELD OF THE INVENTION

The present application generally relates to data communication networks. In particular, the present application relates to systems and methods for flow control of data communicated over a network using a network structure component, such as an intermediary.

BACKGROUND OF THE INVENTION

Network traffic comprising a portion of bulk data and a portion of interactive data may be transmitted over a network between a client and a server traversing one or more network-infrastructure components. Applications that transmit bulk and interactive data may multiplex these types of data. Selections of the quantity and timing of bulk data for transmission and the quantity and timing of the interactive data for transmission may be challenging to determine. Furthermore, any one or more of the infrastructure network components may process the network traffic in a manner that impacts how the data should be efficiently multiplexed. For example, if the data stream is compressed by a network component with a compression format in which the compression ratios of the compressed data packets vary, the controlling of the data flow becomes more difficult.

BRIEF SUMMARY OF THE INVENTION

The present solution is related to utilizing an intermediary between clients and servers to monitor the status of the network and update the sender of the transmission with latest information necessary to estimate the correct amounts and timings of the bulk data and interactive data to send over the network. In some aspects, the present disclosure also relates to addressing the issue of bandwidth estimation of compressed data wherein the packets of compressed data may have varying compression ratios.

The present disclosure presents various embodiments of a solution to address this and similar issues and introduces methods and systems which enable a more efficient data flow control of the combined data stream. The methods and systems thus address the issue of efficient data flow control of the compressed data stream while minimizing the queuing time and maximizing the utilization of the network's available resources.

The present disclosure is directed towards systems and methods for more efficiently controlling a flow of a data stream communicated via a network between a client and a server and traversing an intermediary. The methods described are related to improved models of data flow control providing a sender of the data stream a means to more efficiently keep a track of a status of the network by receiving a set of updated values from the intermediary intercepting the data between the client and the server. The systems described are related to the devices and structures associated with the methods described, including the structures of the intermediary.

In some aspects, the present disclosure relates to a method for more efficiently controlling a flow of a data stream communicated via a network between a client and a server and traversing at least one intermediary. The method includes a step of a sender transmitting a first message comprising a first value of a bandwidth between the first intermediary and a second intermediary determined by the sender, to a first intermediary. The method also includes the steps of the first intermediary establishing a next value of the bandwidth between the first intermediary and the second intermediary and the sender, in response to the first message, receiving from the first intermediary a second message comprising the established next value of the bandwidth between the first intermediary and the second intermediary. The method further includes the step of a data transfer manager of the sender responding to the second message by determining a size of a portion of data queued for transmission to transmit to the first intermediary and a time for transmitting the portion of data queued to the first intermediary.

In some embodiments, the method includes a step of the sender transmitting the first message comprising one of a first compression ratio value of a compression ratio of a data compressed by the first intermediary or a first backlog value of an amount of data to be sent; and the sender receiving the second message comprising any of a next compression ratio value of a data compressed by the first intermediary or a next backlog value of an amount of data to be sent. In a number of embodiments, the method includes a step of the sender transmitting a third message comprising one of a first compression ratio value of a compression ratio of a data compressed by the first intermediary or a first backlog value of an amount of data to be sent, and the sender receiving a fourth message comprising any of a next compression ratio value of a data compressed by the first intermediary or a next backlog value of an amount of data to be sent.

In a number of embodiments the method includes the step of the first intermediary establishing the next value of the bandwidth between the first intermediary and the second intermediary using the difference in time of arrival of two compressed data packets received by the first intermediary and sent consecutively by the second intermediary or received by the second intermediary and sent consecutively by the first intermediary, each of the two compressed data packets having a one of a same or a different compression ratio than the other. In a plurality of embodiments, the established next value of the bandwidth between the first intermediary and the second intermediary is determined by using a plurality of the next values of the bandwidth from the first intermediary to the second intermediary or a plurality of the next values of the bandwidth from the second intermediary to the first intermediary.

In some embodiments, the method comprises the step of the sender transmitting the portion of data queued for transmission comprising a portion of one of non real-time data, a real-time data or a combination of non real-time and real-time data. In certain embodiments, the method includes the step of the sender transmitting one of the first message or the next message with the portion of data queued for transmission.

In some aspects, the present disclosure relates to a method to more efficiently control a flow a of data stream communicated via a network between a client and a server and traversing a first and a second intermediary. The method includes a step of a sender transmitting a first message comprising a first bandwidth value of the bandwidth between a first intermediary and a second intermediary and a first compression ratio value of a compression ratio of a data compressed by the first intermediary, to a first intermediary. The method also includes the step of the first intermediary establishing a next compression ratio value of a compression ratio of a data compressed by the first intermediary and a next bandwidth value between the first intermediary and the second intermediary. The method further includes the step of the sender receiving a second message comprising the next value of the bandwidth between the first intermediary and the second intermediary or the next compression ratio value of the data compressed by the first intermediary, from the first intermediary, responsive to the first message and one of the established next bandwidth value or the established next compression ratio value. The method further includes the step of a data transfer manager of the sender in response to the second message determining a size of a portion of data queued for transmission to transmit to the first intermediary and a time for transmitting the portion of data queued to the intermediary.

In some embodiments, the method further comprises one of the sender, the first intermediary or the second intermediary being one of a server, a client, or any device capable of transmitting of data or receiving of data. In a plurality of embodiments, the method includes the step of the sender transmitting the first message comprising a first backlog value of an amount of data to be sent, the first intermediary establishing a next backlog value of an amount of data to be sent to the first intermediary by the sender, the sender receiving the second message further comprising the established next backlog value.

In certain embodiments, the method includes the step of the first intermediary establishing the next value of the bandwidth between the first intermediary and the second intermediary using the difference in time of arrival of two compressed data packets received by the first intermediary and sent consecutively by the second intermediary or received by the second intermediary and sent consecutively by the first intermediary, each of the two compressed data packets having a one of a same or a different compression ratio than the other. In a number of embodiments, the method includes the step of the sender transmitting the portion of data queued for transmission comprising any one of a combination of a portion of non real-time data, a portion of real-time data or a combination of non real-time and real-time data. In a plurality of embodiments, the method includes the step of the sender transmitting the portion of data queued for transmission comprising a portion of one of non real-time data, a real-time data or a combination of non real-time and real-time data.

In some aspects, the present invention relates to a system to more efficiently control a flow a of data stream communicated via a network between a client and a server and traversing at least one intermediary. The system comprises a sender and a first intermediary communicating via a network wherein the sender is transmitting to the first intermediary a first message comprising a first value of a bandwidth between the first intermediary and a second intermediary determined by the sender. The system also comprises a bandwidth measurer of the first intermediary establishing a next value of the bandwidth between the first intermediary and the second intermediary, and the sender receiving from the first intermediary a second message in response to the first message, the second message comprising the established next value of the bandwidth between the first intermediary and the second intermediary. The system further comprises a data transfer manager of the sender which in response to the second message determines a size of a portion of data queued for transmission to transmit to the first intermediary and a time for transmitting the portion of data queued to the first intermediary.

In some embodiments, the system further comprises a compression engine on the first or the second intermediary performing compression or decompression of a data stream communicated between the first intermediary and a second intermediary. In a number of embodiments, the system includes a compression engine performing a compression of a plurality of compressed data packets, each one of the plurality of compressed data packets comprising one or more data packets and each one of the plurality of compressed data packet being compressed with a compression ratio that is one of different than the compression ratio of another one of the plurality of compressed data packets or same as the compression ratio of another one of the plurality of compressed data packets.

In a plurality of embodiments, the system further comprises one of the sender, the first intermediary or the second intermediary comprising an appliance including one of the compression engine, the bandwidth measurer or the data transfer manager. In certain embodiments, the system further includes any combination of the two or all three of the data transfer manager, the bandwidth estimator, and the compression engine comprising a single process.

Any embodiment or embodiments mentioned or described may be combined with any other embodiment or embodiments mentioned or described to create any other variation or a combination of an embodiment of the disclosure or the invention. The details of various embodiments of the invention are set forth in the accompanying drawings and the description below.

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1A:
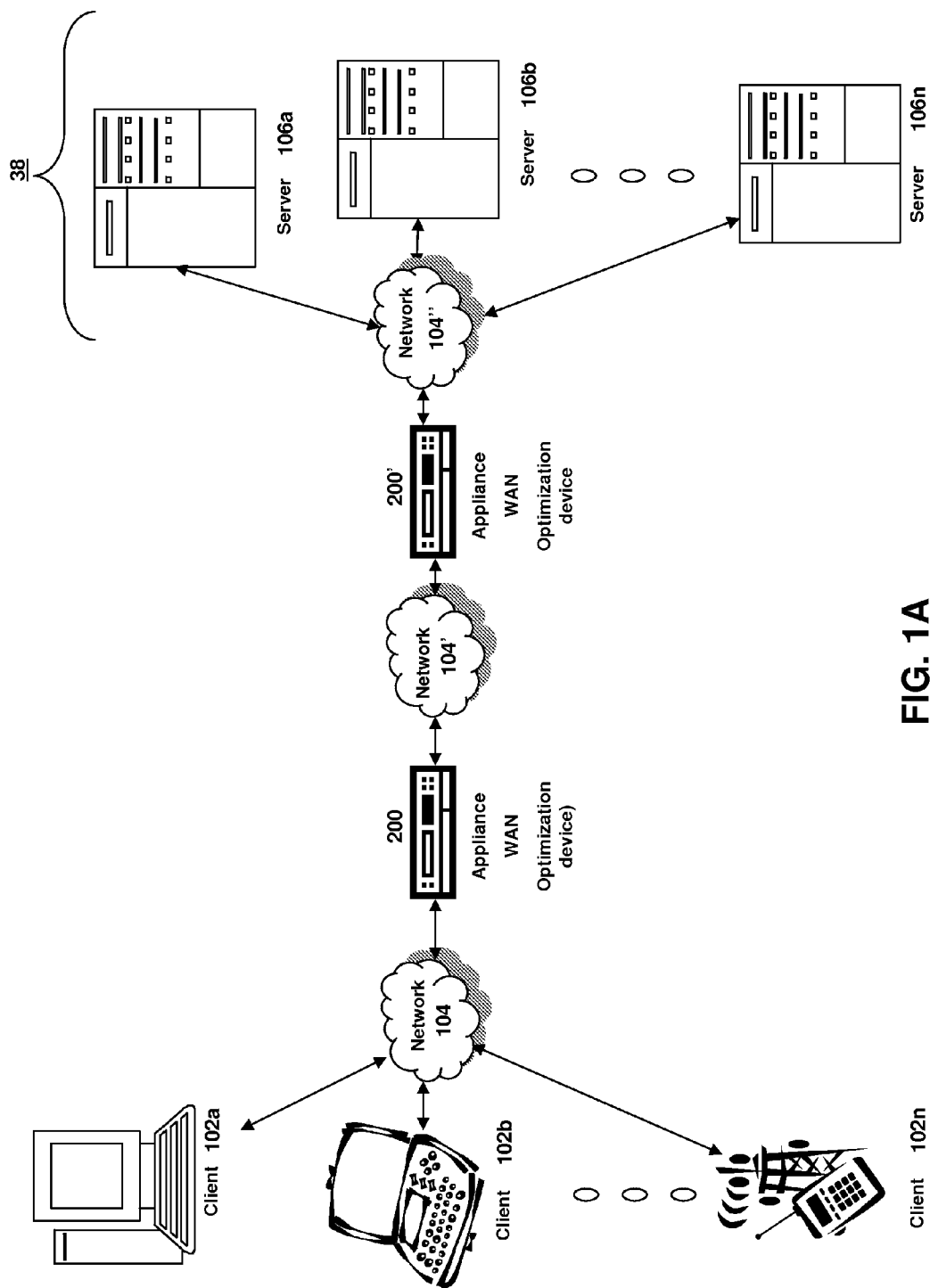
FIG. 1A is a block diagram illustrating some embodiments of a network environment for a client to access a server via one or more network optimization appliances.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments of the present disclosure below, the following descriptions of the sections of the specification and their respective contents may be helpful:

- Section A describes a network environment and computing environment useful for practicing an embodiment of the present disclosure;
- Section B describes embodiments of a system and appliance architecture for accelerating delivery of a computing environment to a remote user;
- Section C describes embodiments of a client agent for accelerating communications between a client and a server; and
- Section D describes embodiments of systems and methods for a more efficient control of a flow of a data stream communicated via a network between a client and a server and traversing an intermediary.
- Section E describes embodiments of systems and methods for allocation of bandwidth credit and allocation of annuity of bandwidth credit to a sender transmitting a data, via an intermediary, to a receiver on a network.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment has one or more clients 102a-102n (also generally referred to as local machine(s) 102, or client(s) 102) in communication with one or more servers 106a-106n (also generally referred to as server(s) 106, or remote machine(s) 106) via one or more networks 104, 104', 104". In some embodiments, a client 102 communicates with a server 106 via one or more network optimization appliances 200, 200' (generally referred to as appliance 200). In one embodiment, the network optimization appliance 200 is designed, configured or adapted to optimize Wide Area Network (WAN) network traffic. In some embodiments, a first appliance 200 works in conjunction or cooperation with a second appliance 200' to optimize network traffic. For example, a first appliance 200 may be located between a branch office and a WAN connection while the second appliance 200' is located between the WAN and a corporate Local Area Network (LAN). The appliances 200 and 200' may work together to optimize the WAN related network traffic between a client in the branch office and a server on the corporate LAN.

Although FIG. 1A shows a network 104, network 104' and network 104" (generally referred to as network(s) 104) between the clients 102 and the servers 106, the clients 102 and the servers 106 may be on the same network 104. The networks 104, 104', 104" can be the same type of network or different types of networks. The network 104 can be a local-area network (LAN), such as a company Intranet, a metropolitan area network (MAN), or a wide area network (WAN), such as the Internet or the World Wide Web. The networks 104, 104', 104" can be a private or public network. In one embodiment, network 104' or network 104" may be a private network and network 104 may be a public network. In some embodiments, network 104 may be a private network and network 104' and/or network 104" a public network. In another embodiment, networks 104, 104', 104" may be private networks. In some embodiments, clients 102 may be located at a branch office of a corporate enterprise communicating via a WAN connection over the network 104 to the servers 106 located on a corporate LAN in a corporate data center.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein.

As depicted in FIG. 1A, a first network optimization appliance 200 is shown between networks 104 and 104' and a second network optimization appliance 200' is also between networks 104' and 104". In some embodiments, the appliance 200 may be located on network 104. For example, a corporate enterprise may deploy an appliance 200 at the branch office. In other embodiments, the appliance 200 may be located on network 104'. In some embodiments, the appliance 200' may be located on network 104' or network 104". For example, an appliance 200 may be located at a corporate data center. In one embodiment, the appliance 200 and 200' are on the same network. In another embodiment, the appliance 200 and 200' are on different networks.

In one embodiment, the appliance 200 is a device for accelerating, optimizing or otherwise improving the performance, operation, or quality of service of any type and form of network traffic. In some embodiments, the appliance 200 is a performance enhancing proxy. In other embodiments, the appliance 200 is any type and form of WAN optimization or acceleration device, sometimes also referred to as a WAN optimization controller. In one embodiment, the appliance 200 is any of the product embodiments referred to as WANScaler manufactured by Citrix Systems, Inc. of Ft. Lauderdale, Fla. In other embodiments, the appliance 200 includes any of the product embodiments referred to as BIG-IP link controller and WANjet manufactured by F5 Networks, Inc. of Seattle, Wash. In another embodiment, the appliance 200 includes any of the WX and WXC WAN acceleration device platforms manufactured by Juniper Networks, Inc. of Sunnyvale, Calif. In some embodiments, the appliance 200 includes any of the steelhead line of WAN optimization appliances manufactured by Riverbed Technology of San Francisco, Calif. In other embodiments, the appliance 200 includes any of the WAN related devices manufactured by Expand Networks Inc. of Roseland, N.J. In one embodiment, the appliance 200 includes any of the WAN related appliances manufactured by Packeteer Inc. of Cupertino, Calif., such as the PacketShaper, iShared, and SkyX product embodiments provided by Packeteer. In yet another embodiment, the appliance 200 includes any WAN related appliances and/or software manufactured by Cisco Systems, Inc. of San Jose, Calif., such as the Cisco Wide Area Network Application Services software and network modules, and Wide Area Network engine appliances.

In some embodiments, the appliance 200 provides application and data acceleration services for branch-office or remote offices. In one embodiment, the appliance 200 includes optimization of Wide Area File Services (WAFS). In another embodiment, the appliance 200 accelerates the delivery of files, such as via the Common Internet File System (CIFS) protocol. In other embodiments, the appliance 200 provides caching in memory and/or storage to accelerate delivery of applications and data. In one embodiment, the appliance 205 provides compression of network traffic at any level of the network stack or at any protocol or network layer. In another embodiment, the appliance 200 provides transport layer protocol optimizations, flow control, performance enhancements or modifications and/or management to accelerate delivery of applications and data over a WAN connection. For example, in one embodiment, the appliance 200 provides Transport Control Protocol (TCP) optimizations. In other embodiments, the appliance 200 provides optimizations, flow control, performance enhancements or modifications and/or management for any session or application layer protocol. Further details of the optimization techniques, operations and architecture of the appliance 200 are discussed below in Section B.

Still referring to FIG. 1A, the network environment may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Deployed with Other Appliances.

Figure 1B:
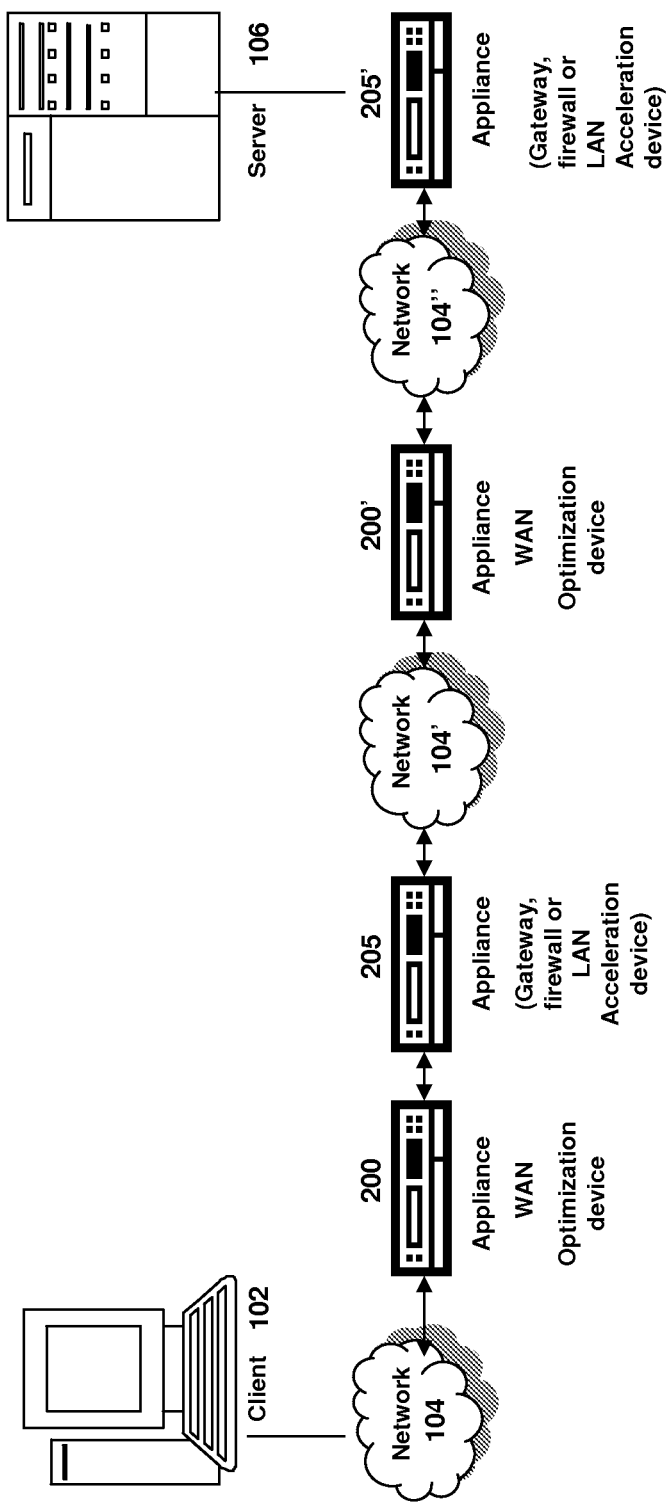
FIG. 1B is a block diagram illustrating some embodiments of a network environment for a client to access a server via one or more network optimization appliances in conjunction with other network appliances.

Referring now to FIG. 1B, another embodiment of a network environment is depicted in which the network optimization appliance 200 is deployed with one or more other appliances 205, 205' (generally referred to as appliance 205 or second appliance 205) such as a gateway, firewall or acceleration appliance. For example, in one embodiment, the appliance 205 is a firewall or security appliance while appliance 205' is a LAN acceleration device. In some embodiments, a client 102 may communicate to a server 106 via one or more of the first appliances 200 and one or more second appliances 205.

One or more appliances 200 and 205 may be located at any point in the network or network communications path between a client 102 and a server 106. In some embodiments, a second appliance 205 may be located on the same network 104 as the first appliance 200. In other embodiments, the second appliance 205 may be located on a different network 104 as the first appliance 200. In yet another embodiment, a first appliance 200 and second appliance 205 is on the same network, for example network 104, while the first appliance 200' and second appliance 205' is on the same network, such as network 104".

In one embodiment, the second appliance 205 includes any type and form of transport control protocol or transport later terminating device, such as a gateway or firewall device. In one embodiment, the appliance 205 terminates the transport control protocol by establishing a first transport control protocol connection with the client and a second transport control connection with the second appliance or server. In another embodiment, the appliance 205 terminates the transport control protocol by changing, managing or controlling the behavior of the transport control protocol connection between the client and the server or second appliance. For example, the appliance 205 may change, queue, forward or transmit network packets in manner to effectively terminate the transport control protocol connection or to act or simulate as terminating the connection.

In some embodiments, the second appliance 205 is a performance enhancing proxy. In one embodiment, the appliance 205 provides a virtual private network (VPN) connection. In some embodiments, the appliance 205 provides a Secure Socket Layer VPN (SSL VPN) connection. In other embodiments, the appliance 205 provides an IPsec (Internet Protocol Security) based VPN connection. In some embodiments, the appliance 205 provides any one or more of the following functionality: compression, acceleration, load-balancing, switching/routing, caching, and Transport Control Protocol (TCP) acceleration.

In one embodiment, the appliance 205 is any of the product embodiments referred to as Access Gateway, Application Firewall, Application Gateway, or NetScaler manufactured by Citrix Systems, Inc. of Ft. Lauderdale, Fla. As such, in some embodiments, the appliance 205 includes any logic, functions, rules, or operations to perform services or functionality such as SSL VPN connectivity, SSL offloading, switching/load balancing, Domain Name Service resolution, LAN acceleration and an application firewall.

In some embodiments, the appliance 205 provides a SSL VPN connection between a client 102 and a server 106. For example, a client 102 on a first network 104 requests to establish a connection to a server 106 on a second network 104'. In some embodiments, the second network 104" is not routable from the first network 104. In other embodiments, the client 102 is on a public network 104 and the server 106 is on a private network 104', such as a corporate network. In one embodiment, a client agent intercepts communications of the client 102 on the first network 104, encrypts the communications, and transmits the communications via a first transport layer connection to the appliance 205. The appliance 205 associates the first transport layer connection on the first network 104 to a second transport layer connection to the server 106 on the second network 104. The appliance 205 receives the intercepted communication from the client agent, decrypts the communications, and transmits the communication to the server 106 on the second network 104 via the second transport layer connection. The second transport layer connection may be a pooled transport layer connection. In one embodiment, the appliance 205 provides an end-to-end secure transport layer connection for the client 102 between the two networks 104, 104'

In one embodiments, the appliance 205 hosts an intranet internet protocol or intranetIP address of the client 102 on the virtual private network 104. The client 102 has a local network identifier, such as an internet protocol (IP) address and/or host name on the first network 104. When connected to the second network 104' via the appliance 205, the appliance 205 establishes, assigns or otherwise provides an IntranetIP, which is network identifier, such as IP address and/or host name, for the client 102 on the second network 104'. The appliance 205 listens for and receives on the second or private network 104' for any communications directed towards the client 102 using the client's established IntranetIP. In one embodiment, the appliance 205 acts as or on behalf of the client 102 on the second private network 104.

In some embodiment, the appliance 205 has an encryption engine providing logic, business rules, functions or operations for handling the processing of any security related protocol, such as SSL or TLS, or any function related thereto. For example, the encryption engine encrypts and decrypts network packets, or any portion thereof, communicated via the appliance 205. The encryption engine may also setup or establish SSL or TLS connections on behalf of the client 102a-102n, server 106a-106n, or appliance 200, 205. As such, the encryption engine provides offloading and acceleration of SSL processing. In one embodiment, the encryption engine uses a tunneling protocol to provide a virtual private network between a client 102a-102n and a server 106a-106n. In some embodiments, the encryption engine uses an encryption processor. In other embodiments, the encryption engine includes executable instructions running on an encryption processor.

In some embodiments, the appliance 205 provides one or more of the following acceleration techniques to communications between the client 102 and server 106: 1) compression, 2) decompression, 3) Transmission Control Protocol pooling, 4) Transmission Control Protocol multiplexing, 5) Transmission Control Protocol buffering, and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 205 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 205, and the destination network address is changed to that of the intended server. In the case of an outbound packet (that is, one received from a server 106), the source network address is changed from that of the server 106 to that of an output port of appliance 205 and the destination address is changed from that of appliance 205 to that of the requesting client 102. The sequence numbers and acknowledgment numbers of the packet are also translated to sequence numbers and acknowledgement expected by the client 102 on the appliance's 205 transport layer connection to the client 102. In some embodiments, the packet checksum of the transport layer protocol is recalculated to account for these translations.

In another embodiment, the appliance 205 provides switching or load-balancing functionality for communications between the client 102 and server 106. In some embodiments, the appliance 205 distributes traffic and directs client requests to a server 106 based on layer 4 payload or application-layer request data. In one embodiment, although the network layer or layer 2 of the network packet identifies a destination server 106, the appliance 205 determines the server 106 to distribute the network packet by application information and data carried as payload of the transport layer packet. In one embodiment, a health monitoring program of the appliance 205 monitors the health of servers to determine the server 106 for which to distribute a client's request. In some embodiments, if the appliance 205 detects a server 106 is not available or has a load over a predetermined threshold, the appliance 205 can direct or distribute client requests to another server 106.

In some embodiments, the appliance 205 acts as a Domain Name Service (DNS) resolver or otherwise provides resolution of a DNS request from clients 102. In some embodiments, the appliance intercepts' a DNS request transmitted by the client 102. In one embodiment, the appliance 205 responds to a client's DNS request with an IP address of or hosted by the appliance 205. In this embodiment, the client 102 transmits network communication for the domain name to the appliance 200. In another embodiment, the appliance 200 responds to a client's DNS request with an IP address of or hosted by a second appliance 200'. In some embodiments, the appliance 205 responds to a client's DNS request with an IP address of a server 106 determined by the appliance 200.

In yet another embodiment, the appliance 205 provides application firewall functionality for communications between the client 102 and server 106. In one embodiment, a policy engine 295' provides rules for detecting and blocking illegitimate requests. In some embodiments, the application firewall protects against denial of service (DoS) attacks. In other embodiments, the appliance inspects the content of intercepted requests to identify and block application-based attacks. In some embodiments, the rules/policy engine includes one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall of the appliance provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall of the appliance 205 ensures cookies are not modified. In other embodiments, the appliance 205 protects against forceful browsing by enforcing legal URLs.

In still yet other embodiments, the application firewall appliance 205 protects any confidential information contained in the network communication. The appliance 205 may inspect or analyze any network communication in accordance with the rules or polices of the policy engine to identify any confidential information in any field of the network packet. In some embodiments, the application firewall identifies in the network communication one or more occurrences of a credit card number, password, social security number, name, patient code, contact information, and age. The encoded portion of the network communication may include these occurrences or the confidential information. Based on these occurrences, in one embodiment, the application firewall may take a policy action on the network communication, such as prevent transmission of the network communication. In another embodiment, the application firewall may rewrite, remove or otherwise mask such identified occurrence or confidential information.

Although generally referred to as a network optimization or first appliance 200 and a second appliance 205, the first appliance 200 and second appliance 205 may be the same type and form of appliance. In some embodiments an appliance 205 or an appliance 200 may be any type of device or a structure capable of affecting a data stream traversing it on the way from a client to a server or vice versa. In one embodiment, the second appliance 205 may perform the same functionality, or portion thereof, as the first appliance 200, and vice-versa. For example, the first appliance 200 and second appliance 205 may both provide acceleration techniques. In one embodiment, the first appliance may perform LAN acceleration while the second appliance performs WAN acceleration, or vice-versa. In another example, the first appliance 200 may also be a transport control protocol terminating device as with the second appliance 205. Furthermore, although appliances 200 and 205 are shown as separate devices on the network, the appliance 200 and/or 205 could be a part of any client 102 or server 106.

Figure 1C:
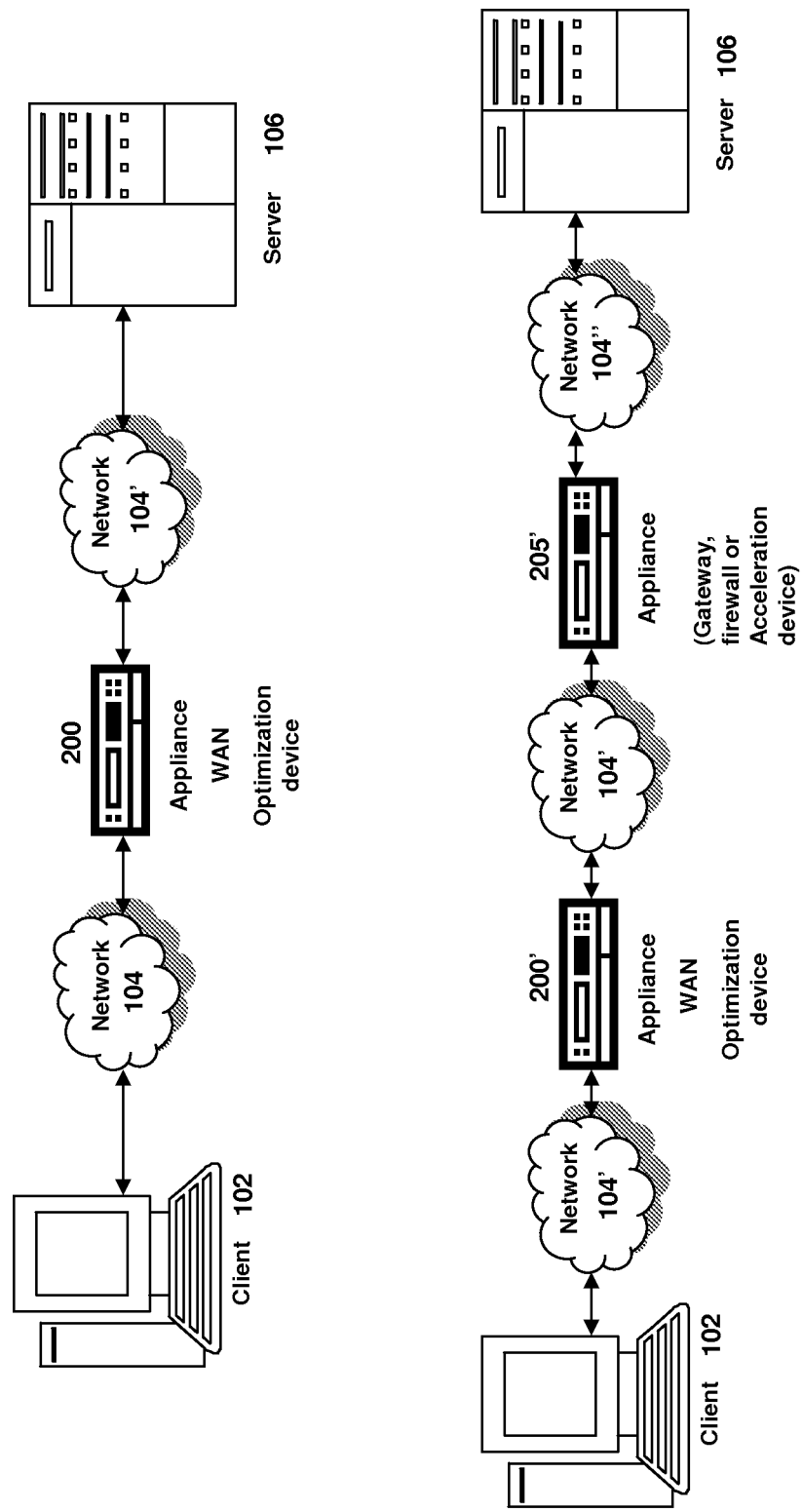
FIG. 1C is a block diagram illustrating some embodiments of a network environment for a client to access a server via a single network optimization appliance deployed stand-alone or in conjunction with other network appliances.

Referring now to FIG. 1C, other embodiments of a network environment for deploying the appliance 200 are depicted. In another embodiment as depicted on the top of FIG. 1C, the appliance 200 may be deployed as a single appliance or single proxy on the network 104. For example, the appliance 200 may be designed, constructed or adapted to perform WAN optimization techniques discussed herein without a second cooperating appliance 200'. In other embodiments as depicted on the bottom of FIG. 1C, a single appliance 200 may be deployed with one or more second appliances 205. For example, a WAN acceleration first appliance 200, such as a Citrix WANScaler appliance, may be deployed with a LAN accelerating or Application Firewall second appliance 205, such as a Citrix NetScaler appliance.

Computing Device

Figure 1D:
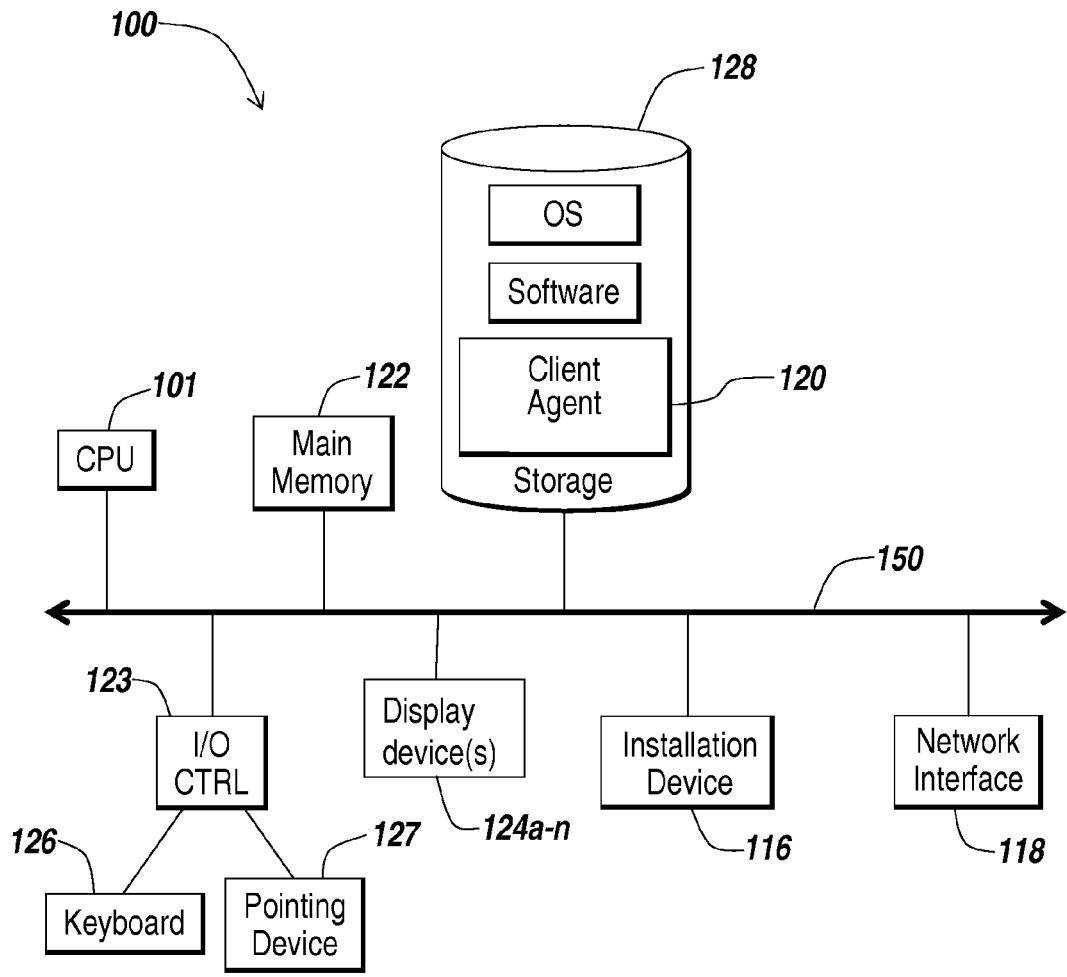
FIGS. 1D and 1E are block diagrams illustrating some embodiments of a computing device.

The client 102, server 106, and appliance 200 and 205 may be deployed as and/or executed on any type and form of computing device, such as a computer, network device or appliance capable of communicating on any type and form of network and performing the operations described herein. FIGS. 1C and 1D depict block diagrams of a computing device 100 useful for practicing an embodiment of the client 102, server 106 or appliance 200. As shown in FIGS. 1C and 1D, each computing device 100 may include a central processing unit 101, and a main memory unit 122. As shown in FIG. 1C, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as:

those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1D depicts an embodiment of a computer 100 in which the main processor 101 communicates directly with I/O device 130 via HyperTransport, Rapid I/O, or InfiniBand. FIG. 1D also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. System and Appliance Architecture

Figure 2A:
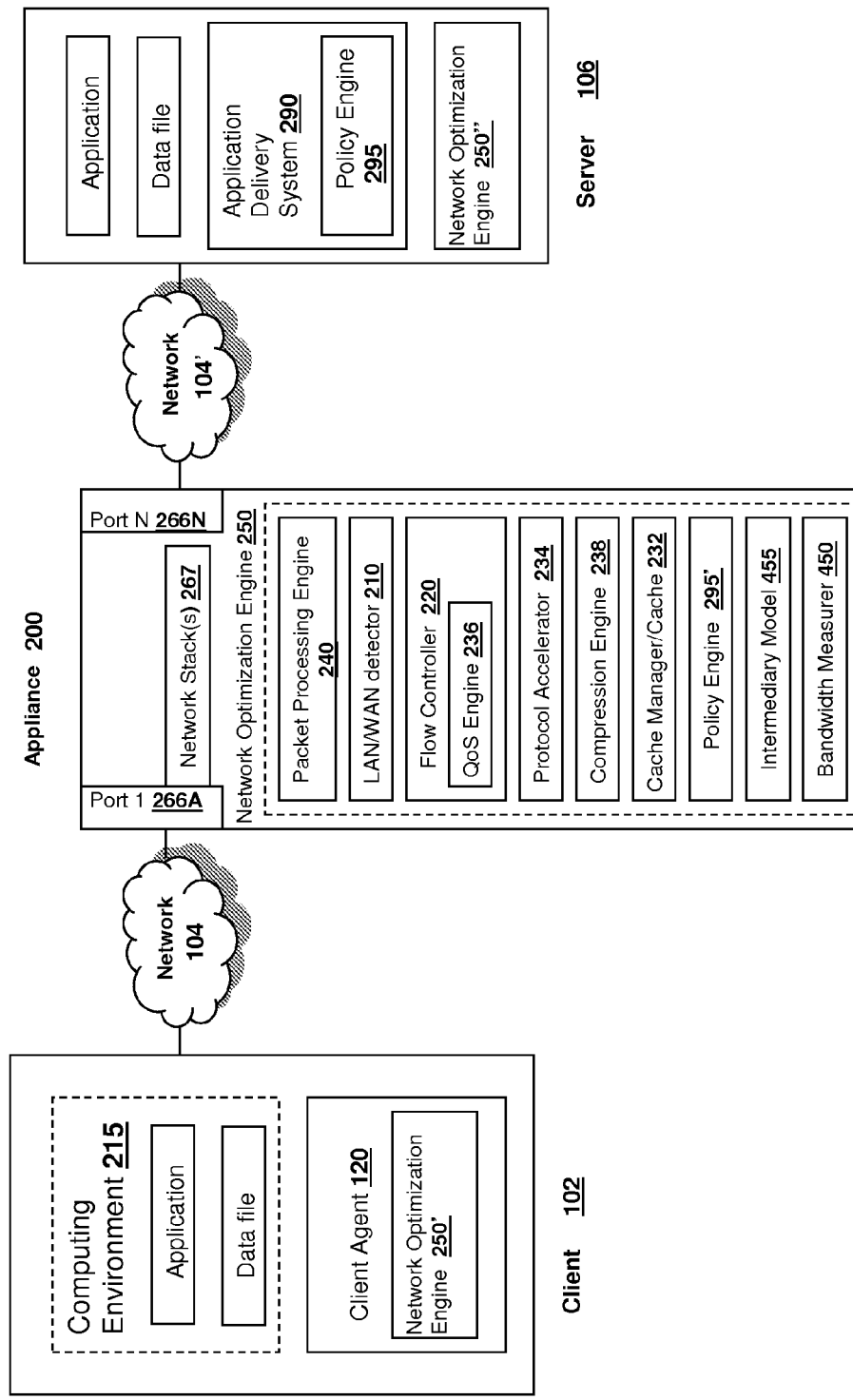
FIG. 2A is a block diagram illustrating some embodiments of an appliance for processing communications between a client and a server.

Referring now to FIG. 2A, an embodiment of a system environment and architecture of an appliance 200 for delivering and/or operating a computing environment on a client is depicted. In some embodiments, a server 106 includes an application delivery system 290 for delivering a computing environment or an application and/or data file to one or more clients 102. In brief overview, a client 102 is in communication with a server 106 via network 104 and appliance 200. For example, the client 102 may reside in a remote office of a company, e.g., a branch office, and the server 106 may reside at a corporate data center. The client 102 has a client agent 120, and a computing environment 215. The computing environment 215 may execute or operate an application that accesses, processes or uses a data file. The computing environment 215, application and/or data file may be delivered via the appliance 200 and/or the server 106.

In some embodiments, the appliance 200 accelerates delivery of a computing environment 215, or any portion thereof, to a client 102. In one embodiment, the appliance 200 accelerates the delivery of the computing environment 215 by the application delivery system 290. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. In another embodiment, the appliance 200 controls, manages, or adjusts the transport layer protocol to accelerate delivery of the computing environment. In some embodiments, the appliance 200 uses caching and/or compression techniques to accelerate delivery of a computing environment.

In some embodiments, the application delivery management system 290 provides application delivery techniques to deliver a computing environment to a desktop of a user, remote or otherwise, based on a plurality of execution methods and based on any authentication and authorization policies applied via a policy engine 295. With these techniques, a remote user may obtain a computing environment and access to server stored applications and data files from any network connected device 100. In one embodiment, the application delivery system 290 may reside or execute on a server 106. In another embodiment, the application delivery system 290 may reside or execute on a plurality of servers 106a-106n. In some embodiments, the application delivery system 290 may execute in a server farm 38. In one embodiment, the server 106 executing the application delivery system 290 may also store or provide the application and data file. In another embodiment, a first set of one or more servers 106 may execute the application delivery system 290, and a different server 106n may store or provide the application and data file. In some embodiments, each of the application delivery system 290, the application, and data file may reside or be located on different servers. In yet another embodiment, any portion of the application delivery system 290 may reside, execute or be stored on or distributed to the appliance 200, or a plurality of appliances.

The client 102 may include a computing environment 215 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 290 and/or server 106 may deliver the application and data file to the client 102. For example, in one embodiment, the server 106 may transmit the application as an application stream to operate in computing environment 215 on client 102.

In some embodiments, the application delivery system 290 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 290 may deliver one or more applications to clients 102 or users via a remote-display protocol or otherwise via remote-based or server-based computing. In another embodiment, the application delivery system 290 may deliver one or more applications to clients or users via steaming of the application.

In one embodiment, the application delivery system 290 includes a policy engine 295 for controlling and managing the access to, selection of application execution methods and the delivery of applications. In some embodiments, the policy engine 295 determines the one or more applications a user or client 102 may access. In another embodiment, the policy engine 295 determines how the application should be delivered to the user or client 102, e.g., the method of execution. In some embodiments, the application delivery system 290 provides a plurality of delivery techniques from which to select a method of application execution, such as a server-based computing, streaming or delivering the application locally to the client 120 for local execution.

In one embodiment, a client 102 requests execution of an application program and the application delivery system 290 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 290 enumerates a plurality of application programs available to the client 102. The application delivery system 290 receives a request to execute an enumerated application. The application delivery system 290 selects one of a predetermined number of methods for executing the enumerated application, for example, responsive to a policy of a policy engine. The application delivery system 290 may select a method of execution of the application enabling the client 102 to receive application-output data generated by execution of the application program on a server 106. The application delivery system 290 may select a method of execution of the application enabling the client or local machine 102 to execute the application program locally after retrieving a plurality of application files comprising the application. In yet another embodiment, the application delivery system 290 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiment the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Example Appliance Architecture

Figure 1E:
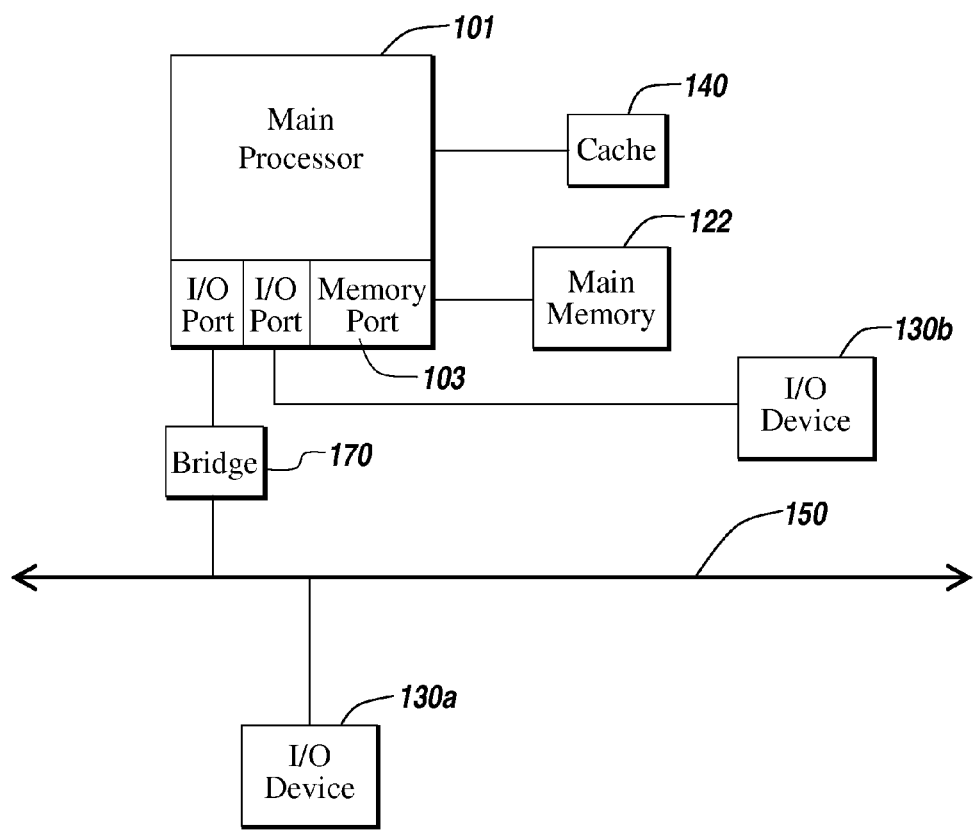

FIG. 2A also illustrates an example embodiment of the appliance 200. The architecture of the appliance 200 in FIG. 2A is provided by way of illustration only and is not intended to be limiting in any manner. The appliance 200 may include any type and form of computing device 100, such as any element or portion described in conjunction with FIGS. 1D and 1E above. In brief overview, the appliance 200 has one or more network ports 266A-226N and one or more networks stacks 267A-267N for receiving and/or transmitting communications via networks 104. The appliance 200 also has a network optimization engine 250 for optimizing, accelerating or otherwise improving the performance, operation, or quality of any network traffic or communications traversing the appliance 200.

The appliance 200 includes or is under the control of an operating system. The operating system of the appliance 200 may be any type and/or form of Unix operating system although the disclosure is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The operating system of appliance 200 allocates, manages, or otherwise segregates the available system memory into what is referred to as kernel or system space, and user or application space. The kernel space is typically reserved for running the kernel, including any device drivers, kernel extensions or other kernel related software. As known to those skilled in the art, the kernel is the core of the operating system, and provides access, control, and management of resources and hardware-related elements of the appliance 200. In accordance with an embodiment of the appliance 200, the kernel space also includes a number of network services or processes working in conjunction with the network optimization engine 250, or any portion thereof. Additionally, the embodiment of the kernel will depend on the embodiment of the operating system installed, configured, or otherwise used by the device 200. In contrast to kernel space, user space is the memory area or portion of the operating system used by user mode applications or programs otherwise running in user mode. A user mode application may not access kernel space directly and uses service calls in order to access kernel services. The operating system uses the user or application space for executing or running applications and provisioning of user level programs, services, processes and/or tasks.

The appliance 200 has one or more network ports 266 for transmitting and receiving data over a network 104. The network port 266 provides a physical and/or logical interface between the computing device and a network 104 or another device 100 for transmitting and receiving network communications. The type and form of network port 266 depends on the type and form of network and type of medium for connecting to the network. Furthermore, any software of, provisioned for or used by the network port 266 and network stack 267 may run in either kernel space or user space.

In one embodiment, the appliance 200 has one network stack 267, such as a TCP/IP based stack, for communicating on a network 105, such with the client 102 and/or the server 106. In one embodiment, the network stack 267 is used to communicate with a first network, such as network 104, and also with a second network 104'. In another embodiment, the appliance 200 has two or more network stacks, such as first network stack 267A and a second network stack 267N. The first network stack 267A may be used in conjunction with a first port 266A to communicate on a first network 104. The second network stack 267N may be used in conjunction with a second port 266N to communicate on a second network 104'. In one embodiment, the network stack(s) 267 has one or more buffers for queuing one or more network packets for transmission by the appliance 200.

The network stack 267 includes any type and form of software, or hardware, or any combinations thereof, for providing connectivity to and communications with a network. In one embodiment, the network stack 267 includes a software implementation for a network protocol suite. The network stack 267 may have one or more network layers, such as any networks layers of the Open Systems Interconnection (OSI) communications model as those skilled in the art recognize and appreciate. As such, the network stack 267 may have any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 267 includes a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 267 has any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 267 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 267, such as for voice communications or real-time data communications.

Furthermore, the network stack 267 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 267 may be customized, modified or adapted to provide a custom or modified portion of the network stack 267 in support of any of the techniques described herein.

In one embodiment, the appliance 200 provides for or maintains a transport layer connection between a client 102 and server 106 using a single network stack 267. In some embodiments, the appliance 200 effectively terminates the transport layer connection by changing, managing or controlling the behavior of the transport control protocol connection between the client and the server. In these embodiments, the appliance 200 may use a single network stack 267. In other embodiments, the appliance 200 terminates a first transport layer connection, such as a TCP connection of a client 102, and establishes a second transport layer connection to a server 106 for use by or on behalf of the client 102, e.g., the second transport layer connection is terminated at the appliance 200 and the server 106. The first and second transport layer connections may be established via a single network stack 267. In other embodiments, the appliance 200 may use multiple network stacks, for example 267A and 267N. In these embodiments, the first transport layer connection may be established or terminated at one network stack 267A, and the second transport layer connection may be established or terminated on the second network stack 267N. For example, one network stack may be for receiving and transmitting network packets on a first network, and another network stack for receiving and transmitting network packets on a second network.

As shown in FIG. 2A, the network optimization engine 250 includes one or more of the following elements, components or modules: network packet processing engine 240, LAN/WAN detector 210, flow controller 220, QoS engine 236, protocol accelerator 234, compression engine 238, cache manager 232 and policy engine 295'. The network optimization engine 250, or any portion thereof, may include software, hardware or any combination of software and hardware. Furthermore, any software of, provisioned for or used by the network optimization engine 250 may run in either kernel space or user space. For example, in one embodiment, the network optimization engine 250 may run in kernel space. In another embodiment, the network optimization engine 250 may run in user space. In yet another embodiment, a first portion of the network optimization engine 250 runs in kernel space while a second portion of the network optimization engine 250 runs in user space.

Network Packet Processing Engine

The network packet engine 240, also generally referred to as a packet processing engine or packet engine, is responsible for controlling and managing the processing of packets received and transmitted by appliance 200 via network ports 266 and network stack(s) 267. The network packet engine 240 may operate at any layer of the network stack 267. In one embodiment, the network packet engine 240 operates at layer 2 or layer 3 of the network stack 267. In some embodiments, the packet engine 240 intercepts or otherwise receives packets at the network layer, such as the IP layer in a TCP/IP embodiment. In another embodiment, the packet engine 240 operates at layer 4 of the network stack 267. For example, in some embodiments, the packet engine 240 intercepts or otherwise receives packets at the transport layer, such as intercepting packets as the TCP layer in a TCP/IP embodiment. In other embodiments, the packet engine 240 operates at any session or application layer above layer 4. For example, in one embodiment, the packet engine 240 intercepts or otherwise receives network packets above the transport layer protocol layer, such as the payload of a TCP packet in a TCP embodiment.

The packet engine 240 may include a buffer for queuing one or more network packets during processing, such as for receipt of a network packet or transmission of a network packet. Additionally, the packet engine 240 is in communication with one or more network stacks 267 to send and receive network packets via network ports 266. The packet engine 240 may include a packet processing timer. In one embodiment, the packet processing timer provides one or more time intervals to trigger the processing of incoming, i.e., received, or outgoing, i.e., transmitted, network packets. In some embodiments, the packet engine 240 processes network packets responsive to the timer. The packet processing timer provides any type and form of signal to the packet engine 240 to notify, trigger, or communicate a time related event, interval or occurrence. In many embodiments, the packet processing timer operates in the order of milliseconds, such as for example 100 ms, 50 ms, 25 ms, 10 ms, 5 ms or 1 ms.

During operations, the packet engine 240 may be interfaced, integrated or be in communication with any portion of the network optimization engine 250, such as the LAN/WAN detector 210, flow controller 220, QoS engine 236, protocol accelerator 234, compression engine 238, cache manager 232 and/or policy engine 295'. As such, any of the logic, functions, or operations of the LAN/WAN detector 210, flow controller 220, QoS engine 236, protocol accelerator 234, compression engine 238, cache manager 232 and policy engine 295' may be performed responsive to the packet processing timer and/or the packet engine 240. In some embodiments, any of the logic, functions, or operations of the encryption engine 234, cache manager 232, policy engine 236 and multi-protocol compression logic 238 may be performed at the granularity of time intervals provided via the packet processing timer, for example, at a time interval of less than or equal to 10 ms. For example, in one embodiment, the cache manager 232 may perform expiration of any cached objects responsive to the integrated packet engine 240 and/or the packet processing timer 242. In another embodiment, the expiry or invalidation time of a cached object can be set to the same order of granularity as the time interval of the packet processing timer, such as at every 10 ms.

Cache Manager

The cache manager 232 may include software, hardware or any combination of software and hardware to store data, information and objects to a cache in memory or storage, provide cache access, and control and manage the cache. The data, objects or content processed and stored by the cache manager 232 may include data in any format, such as a markup language, or any type of data communicated via any protocol. In some embodiments, the cache manager 232 duplicates original data stored elsewhere or data previously computed, generated or transmitted, in which the original data may require longer access time to fetch, compute or otherwise obtain relative to reading a cache memory or storage element. Once the data is stored in the cache, future use can be made by accessing the cached copy rather than re-fetching or re-computing the original data, thereby reducing the access time. In some embodiments, the cache may comprise a data object in memory of the appliance 200. In another embodiment, the cache may comprise any type and form of storage element of the appliance 200, such as a portion of a hard disk. In some embodiments, the processing unit of the device may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any caching techniques of the appliance 200. In some embodiments, the cache manager 232 may operate as an application, library, program, service, process, thread or task. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

Policy Engine

The policy engine 295' includes any logic, function or operations for providing and applying one or more policies or rules to the function, operation or configuration of any portion of the appliance 200. The policy engine 295' may include, for example, an intelligent statistical engine or other programmable application(s). In one embodiment, the policy engine 295 provides a configuration mechanism to allow a user to identify, specify, define or configure a policy for the network optimization engine 250, or any portion thereof. For example, the policy engine 295 may provide policies for what data to cache, when to cache the data, for whom to cache the data, when to expire an object in cache or refresh the cache. In other embodiments, the policy engine 236 may include any logic, rules, functions or operations to determine and provide access, control and management of objects, data or content being cached by the appliance 200 in addition to access, control and management of security, network traffic, network access, compression or any other function or operation performed by the appliance 200.

In some embodiments, the policy engine 295' provides and applies one or more policies based on any one or more of the following: a user, identification of the client, identification of the server, the type of connection, the time of the connection, the type of network, or the contents of the network traffic. In one embodiment, the policy engine 295'provides and applies a policy based on any field or header at any protocol layer of a network packet. In another embodiment, the policy engine 295' provides and applies a policy based on any payload of a network packet. For example, in one embodiment, the policy engine 295' applies a policy based on identifying a certain portion of content of an application layer protocol carried as a payload of a transport layer packet. In another example, the policy engine 295' applies a policy based on any information identified by a client, server or user certificate. In yet another embodiment, the policy engine 295' applies a policy based on any attributes or characteristics obtained about a client 102, such as via any type and form of endpoint detection (see for example the collection agent of the client agent discussed below).

In one embodiment, the policy engine 295' works in conjunction or cooperation with the policy engine 295 of the application delivery system 290. In some embodiments, the policy engine 295' is a distributed portion of the policy engine 295 of the application delivery system 290. In another embodiment, the policy engine 295 of the application delivery system 290 is deployed on or executed on the appliance 200. In some embodiments, the policy engines 295, 295' both operate on the appliance 200. In yet another embodiment, the policy engine 295', or a portion thereof, of the appliance 200 operates on a server 106.

Multi-Protocol and Multi-Layer Compression Engine

The compression engine 238 includes any logic, business rules, function or operations for compressing one or more protocols of a network packet, such as any of the protocols used by the network stack 267 of the appliance 200. The compression engine 238 may also be referred to as a multi-protocol compression engine 238 in that it may be designed, constructed or capable of compressing a plurality of protocols. In one embodiment, the compression engine 238 applies context insensitive compression, which is compression applied to data without knowledge of the type of data. In another embodiment, the compression engine 238 applies context-sensitive compression. In this embodiment, the compression engine 238 utilizes knowledge of the data type to select a specific compression algorithm from a suite of suitable algorithms. In some embodiments, knowledge of the specific protocol is used to perform context-sensitive compression. In one embodiment, the appliance 200 or compression engine 238 can use port numbers (e.g., well-known ports), as well as data from the connection itself to determine the appropriate compression algorithm to use. Some protocols use only a single type of data, requiring only a single compression algorithm that can be selected when the connection is established. Other protocols contain different types of data at different times. For example, POP, IMAP, SMTP, and HTTP all move files of arbitrary types interspersed with other protocol data.

In one embodiment, the compression engine 238 uses a delta-type compression algorithm. In another embodiment, the compression engine 238 uses first site compression as well as searching for repeated patterns among data stored in cache, memory or disk. In some embodiments, the compression engine 238 uses a lossless compression algorithm. In other embodiments, the compression engine uses a lossy compression algorithm. In some cases, knowledge of the data type and, sometimes, permission from the user are required to use a lossy compression algorithm. Compression is not limited to the protocol payload. The control fields of the protocol itself may be compressed. In some embodiments, the compression engine 238 uses a different algorithm than that used for the payload.

In some embodiments, the compression engine 238 compresses at one or more layers of the network stack 267. In one embodiment, the compression engine 238 compresses at a transport layer protocol. In another embodiment, the compression engine 238 compresses at an application layer protocol. In some embodiments, the compression engine 238 compresses at a layer 2-4 protocol. In other embodiments, the compression engine 238 compresses at a layer 5-7 protocol. In yet another embodiment, the compression engine compresses a transport layer protocol and an application layer protocol. In some embodiments, the compression engine 238 compresses a layer 2-4 protocol and a layer 5-7 protocol.

In some embodiments, the compression engine 238 uses memory-based compression, cache-based compression or disk-based compression or any combination thereof. As such, the compression engine 238 may be referred to as a multi-layer compression engine. In one embodiment, the compression engine 238 uses a history of data stored in memory, such as RAM. In another embodiment, the compression engine 238 uses a history of data stored in a cache, such as L2 cache of the processor. In other embodiments, the compression engine 238 uses a history of data stored to a disk or storage location. In some embodiments, the compression engine 238 uses a hierarchy of cache-based, memory-based and disk-based data history. The compression engine 238 may first use the cache-based data to determine one or more data matches for compression, and then may check the memory-based data to determine one or more data matches for compression. In another case, the compression engine 238 may check disk storage for data matches for compression after checking either the cache-based and/or memory-based data history.

In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of HyperText Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine by integrating with packet processing engine 240 accessing the network stack 267 is able to compress any of the protocols carried by a transport layer protocol, such as any application layer protocol.

LAN/WAN Detector

The LAN/WAN detector 238 includes any logic, business rules, function or operations for automatically detecting a slow side connection (e.g., a wide area network (WAN) connection such as an Intranet) and associated port 267, and a fast side connection (e.g., a local area network (LAN) connection) and an associated port 267. In some embodiments, the LAN/WAN detector 238 monitors network traffic on the network ports 267 of the appliance 200 to detect a synchronization packet, sometimes referred to as a "tagged" network packet. The synchronization packet identifies a type or speed of the network traffic. In one embodiment, the synchronization packet identifies a WAN speed or WAN type connection. The LAN/WAN detector 238 also identifies receipt of an acknowledgement packet to a tagged synchronization packet and on which port it is received. The appliance 200 then configures itself to operate the identified port on which the tagged synchronization packet arrived so that the speed on that port is set to be the speed associated with the network connected to that port. The other port is then set to the speed associated with the network connected to that port.

For ease of discussion herein, reference to "fast" side will be made with respect to connection with a wide area network (WAN), e.g., the Internet, and operating at a network speed of the WAN. Likewise, reference to "slow" side will be made with respect to connection with a local area network (LAN) and operating at a network speed the LAN. However, it is noted that "fast" and "slow" sides in a network can change on a per-connection basis and are relative terms to the speed of the network connections or to the type of network topology. Such configurations are useful in complex network topologies, where a network is "fast" or "slow" only when compared to adjacent networks and not in any absolute sense.

In one embodiment, the LAN/WAN detector 238 may be used to allow for auto-discovery by an appliance 200 of a network to which it connects. In another embodiment, the LAN/WAN detector 238 may be used to detect the existence or presence of a second appliance 200' deployed in the network 104. For example, an auto-discovery mechanism in operation in accordance with FIG. 1A functions as follows: appliance 200 and 200' are placed in line with the connection linking client 102 and server 106. The appliances 200 and 200' are at the ends of a low-speed link, e.g., Internet, connecting two LANs. In one example embodiment, appliances 200 and 200' each include two ports—one to connect with the "lower" speed link and the other to connect with a "higher" speed link, e.g., a LAN. Any packet arriving at one port is copied to the other port. Thus, appliance 200 and 200' are each configured to function as a bridge between the two networks 104.

When an end node, such as the client 102, opens a new TCP connection with another end node, such as the server 106, the client 102 sends a TCP packet with a synchronization (SYN) header bit set, or a SYN packet, to the server 106. In the present example, client 102 opens a transport layer connection to server 106. When the SYN packet passes through appliance 200, the appliance 200 inserts, attaches or otherwise provides a characteristic TCP header option to the packet, which announces its presence. If the packet passes through a second appliance, in this example appliance 200' the second appliance notes the header option on the SYN packet. The server 106 responds to the SYN packet with a synchronization acknowledgment (SYN-ACK) packet. When the SYN-ACK packet passes through appliance 200', a TCP header option is tagged (e.g., attached, inserted or added) to the SYN-ACK packet to announce appliance 200' presence to appliance 200. When appliance 200 receives this packet, both appliances 200, 200' are now aware of each other and the connection can be appropriately accelerated.

Further to the operations of the LAN/WAN detector 238, a method or process for detecting "fast" and "slow" sides of a network using a SYN packet is described. During a transport layer connection establishment between a client 102 and a server 106, the appliance 200 via the LAN/WAN detector 238 determines whether the SYN packet is tagged with an acknowledgement (ACK). If it is tagged, the appliance 200 identifies or configures the port receiving the tagged SYN packet (SYN-ACK) as the "slow" side. In one embodiment, the appliance 200 optionally removes the ACK tag from the packet before copying the packet to the other port. If the LAN/WAN detector 238 determines that the packet is not tagged, the appliance 200 identifies or configure the port receiving the untagged packet as the "fast" side. The appliance 200 then tags the SYN packet with an ACK and copies the packet to the other port.

In another embodiment, the LAN/WAN detector 238 detects fast and slow sides of a network using a SYN-ACK packet. The appliance 200 via the LAN/WAN detector 238 determines whether the SYN-ACK packet is tagged with an acknowledgement (ACK). If it is tagged, the appliance 200 identifies or configures the port receiving the tagged SYN packet (SYN-ACK) as the "slow" side. In one embodiment, the appliance 200 optionally removes the ACK tag from the packet before copying the packet to the other port. If the LAN/WAN detector 238 determines that the packet is not tagged, the appliance 200 identifies or configures the port receiving the untagged packet as the "fast" side. The LAN/WAN detector 238 determines whether the SYN packet was tagged. If the SYN packet was not tagged, the appliance 200 copied the packet to the other port. If the SYN packet was tagged, the appliance tags the SYN-ACK packet before copying it to the other port.

The appliance 200, 200' may add, insert, modify, attach or otherwise provide any information or data in the TCP option header to provide any information, data or characteristics about the network connection, network traffic flow, or the configuration or operation of the appliance 200. In this manner, not only does an appliance 200 announce its presence to another appliance 200' or tag a higher or lower speed connection, the appliance 200 provides additional information and data via the TCP option headers about the appliance or the connection. The TCP option header information may be useful to or used by an appliance in controlling, managing, optimizing, acceleration or improving the network traffic flow traversing the appliance 200, or to otherwise configure itself or operation of a network port.

Although generally described in conjunction with detecting speeds of network connections or the presence of appliances, the LAN/WAN detector 238 can be used for applying any type of function, logic or operation of the appliance 200 to a port, connection or flow of network traffic. In particular, automated assignment of ports can occur whenever a device performs different functions on different ports, where the assignment of a port to a task can be made during the unit's operation, and/or the nature of the network segment on each port is discoverable by the appliance 200.

Flow Control

The flow controller 220 includes any logic, business rules, logical rules, functions or operations for optimizing, accelerating or otherwise improving the performance, operation or quality of service of transport layer communications of network packets or the delivery of packets at the transport layer. A flow controller, also sometimes referred to as a flow control module, regulates, manages and controls data transfer rates. In some embodiments, the flow controller 220 is deployed at or connected at a bandwidth bottleneck in the network 104. In one embodiment, the flow controller 220 effectively regulates, manages and controls bandwidth usage or utilization. In other embodiments, the flow control modules may also be deployed at points on the network of latency transitions (low latency to high latency) and on links with media losses (such as wireless or satellite links).

In some embodiments, a flow controller 220 may include a receiver-side flow control module for controlling the rate of receipt of network transmissions and a sender-side flow control module for the controlling the rate of transmissions of network packets. In other embodiments, a first flow controller 220 includes a receiver-side flow control module and a second flow controller 220' includes a sender-side flow control module. In some embodiments, a first flow controller 220 is deployed on a first appliance 200 and a second flow controller 220' is deployed on a second appliance 200'. As such, in some embodiments, a first appliance 200 controls the flow of data on the receiver side and a second appliance 200' controls the data flow from the sender side. In yet another embodiment, a single appliance 200 includes flow control for both the receiver-side and sender-side of network communications traversing the appliance 200.

In one embodiment, a flow control module 220 is configured to allow bandwidth at the bottleneck to be more fully utilized, and in some embodiments, not overutilized. In some embodiments, the flow control module 220 transparently buffers (or rebuffers data already buffered by, for example, the sender) network sessions that pass between nodes having associated flow control modules 220. When a session passes through two or more flow control modules 220, one or more of the flow control modules controls a rate of the session(s).

In one embodiment, the flow control module 200 is configured with predetermined data relating to bottleneck bandwidth. In another embodiment, the flow control module 220 may be configured to detect the bottleneck bandwidth or data associated therewith. Unlike conventional network protocols such as TCP, a receiver-side flow control module 220 controls the data transmission rate. The receiver-side flow control module controls 220 the sender-side flow control module, e.g., 220, data transmission rate by forwarding transmission rate limits to the sender-side flow control module 220. In one embodiment, the receiver-side flow control module 220 piggybacks these transmission rate limits on acknowledgement (ACK) packets (or signals) sent to the sender, e.g., client 102, by the receiver, e.g., server 106. The receiver-side flow control module 220 does this in response to rate control requests that are sent by the sender side flow control module 220'. The requests from the sender-side flow control module 220' may be "piggybacked" on data packets sent by the sender 106.

In some embodiments, the flow controller 220 manipulates, adjusts, simulates, changes, improves or otherwise adapts the behavior of the transport layer protocol or any other layer protocol to provide improved performance or operations of delivery, data rates and/or bandwidth utilization of the transport layer. The flow controller 220 may implement a plurality of data flow control techniques at the transport layer, including but not limited to 1) pre-acknowledgements, 2) window virtualization, 3) recongestion techniques, 3) local retransmission techniques, 4) wavefront detection and disambiguation, 5) transport control protocol selective acknowledgements, 6) transaction boundary detection techniques and 7) repacketization.

Although a sender may be generally described herein as a client 102 and a receiver as a server 106, a sender may be any end point such as a server 106 or any computing device 100 on the network 104. Likewise, a receiver may be a client 102 or any other computing device on the network 104.

Pre-Acknowledgements

In brief overview of a pre-acknowledgement flow control technique, the flow controller 220, in some embodiments, handles the acknowledgements and retransmits for a sender, effectively terminating the sender's connection with the downstream portion of a network connection. In reference to FIG. 1B, one possible deployment of an appliance 200 into a network architecture to implement this feature is depicted.

In this example environment, a sending computer or client 102 transmits data on network 104, for example, via a switch, which determines that the data is destined for VPN appliance 205. Because of the chosen network topology, all data destined for VPN appliance 205 traverses appliance 200, so the appliance 200 can apply any necessary algorithms to this data.

Continuing further with the example, the client 102 transmits a packet, which is received by the appliance 200. When the appliance 200 receives the packet, which is transmitted from the client 102 to a recipient via the VPN appliance 205 the appliance 200 retains a copy of the packet and forwards the packet downstream to the VPN appliance 205. The appliance 200 then generates an acknowledgement packet (ACK) and sends the ACK packet back to the client 102 or sending endpoint. This ACK, a pre-acknowledgment, causes the sender 102 to believe that the packet has been delivered successfully, freeing the sender's resources for subsequent processing. The appliance 200 retains the copy of the packet data in the event that a retransmission of the packet is required, so that the sender 102 does not have to handle retransmissions of the data. This early generation of acknowledgements may be called "preacking."

If a retransmission of the packet is required, the appliance 200 retransmits the packet to the sender. The appliance 200 may determine whether retransmission is required as a sender would in a traditional system, for example, determining that a packet is lost if an acknowledgement has not been received for the packet after a predetermined amount of time. To this end, the appliance 200 monitors acknowledgements generated by the receiving endpoint, e.g., server 106 (or any other downstream network entity) so that it can determine whether the packet has been successfully delivered or needs to be retransmitted. If the appliance 200 determines that the packet has been successfully delivered, the appliance 200 is free to discard the saved packet data. The appliance 200 may also inhibit forwarding acknowledgements for packets that have already been received by the sending endpoint.

In the embodiment described above, the appliance 200 via the flow controller 220 controls the sender 102 through the delivery of pre-acknowledgements, also referred to as "preacks", as though the appliance 200 was a receiving endpoint itself. Since the appliance 200 is not an endpoint and does not actually consume the data, the appliance 200 includes a mechanism for providing overflow control to the sending endpoint. Without overflow control, the appliance 200 could run out of memory because the appliance 200 stores packets that have been preacked to the sending endpoint but not yet acknowledged as received by the receiving endpoint. Therefore, in a situation in which the sender 102 transmits packets to the appliance 200 faster than the appliance 200 can forward the packets downstream, the memory available in the appliance 200 to store unacknowledged packet data can quickly fill. A mechanism for overflow control allows the appliance 200 to control transmission of the packets from the sender 102 to avoid this problem.

In one embodiment, the appliance 200 or flow controller 220 includes an inherent "self-clocking" overflow control mechanism. This self-clocking is due to the order in which the appliance 200 may be designed to transmit packets downstream and send ACKs to the sender 102 or 106. In some embodiments, the appliance 200 does not preack the packet until after it transmits the packet downstream. In this way, the sender 102 will receive the ACKs at the rate at which the appliance 200 is able to transmit packets rather than the rate at which the appliance 200 receives packets from the sender 100. This helps to regulate the transmission of packets from a sender 102.

Window Virtualization

Another overflow control mechanism that the appliance 200 may implement is to use the TCP window size parameter, which tells a sender how much buffer the receiver is permitting the sender to fill up. A nonzero window size (e.g., a size of at least one Maximum Segment Size (MSS)) in a preack permits the sending endpoint to continue to deliver data to the appliance, whereas a zero window size inhibits further data transmission. Accordingly, the appliance 200 may regulate the flow of packets from the sender, for example when the appliance's 200 buffer is becoming full, by appropriately setting the TCP window size in each preack.

Another technique to reduce this additional overhead is to apply hysteresis. When the appliance 200 delivers data to the slower side, the overflow control mechanism in the appliance 200 can require that a minimum amount of space be available before sending a nonzero window advertisement to the sender. In one embodiment, the appliance 200 waits until there is a minimum of a predetermined number of packets, such as four packets, of space available before sending a nonzero window packet, such as a window size of four packet). This reduces the overhead by approximately a factor four, since only two ACK packets are sent for each group of four data packets, instead of eight ACK packets for four data packets.

Another technique the appliance 200 or flow controller 220 may use for overflow control is the TCP delayed ACK mechanism, which skips ACKs to reduce network traffic. The TCP delayed ACKs automatically delay the sending of an ACK, either until two packets are received or until a fixed timeout has occurred. This mechanism alone can result in cutting the overhead in half; moreover, by increasing the numbers of packets above two, additional overhead reduction is realized. But merely delaying the ACK itself may be insufficient to control overflow, and the appliance 200 may also use the advertised window mechanism on the ACKs to control the sender. When doing this, the appliance 200 in one embodiment avoids triggering the timeout mechanism of the sender by delaying the ACK too long.

In one embodiment, the flow controller 220 does not preack the last packet of a group of packets. By not preacking the last packet, or at least one of the packets in the group, the appliance avoids a false acknowledgement for a group of packets. For example, if the appliance were to send a preack for a last packet and the packet were subsequently lost, the sender would have been tricked into thinking that the packet is delivered when it was not. Thinking that the packet had been delivered, the sender could discard that data. If the appliance also lost the packet, there would be no way to retransmit the packet to the recipient. By not preacking the last packet of a group of packets, the sender will not discard the packet until it has been delivered.

In another embodiment, the flow controller 220 may use a window virtualization technique to control the rate of flow or bandwidth utilization of a network connection. Though it may not immediately be apparent from examining conventional literature such as RFC 1323, there is effectively a send window for transport layer protocols such as TCP. The send window is similar to the receive window, in that it consumes buffer space (though on the sender). The sender's send window consists of all data sent by the application that has not been acknowledged by the receiver. This data must be retained in memory in case retransmission is required. Since memory is a shared resource, some TCP stack implementations limit the size of this data. When the send window is full, an attempt by an application program to send more data results in blocking the application program until space is available. Subsequent reception of acknowledgements will free send-window memory and unblock the application program. In some embodiments, this window size is known as the socket buffer size in some TCP implementations.

In one embodiment, the flow control module 220 is configured to provide access to increased window (or buffer) sizes. This configuration may also be referenced to as window virtualization. In the embodiment of TCP as the transport layer protocol, the TCP header includes a bit string corresponding to a window scale. In one embodiment, "window" may be referenced in a context of send, receive, or both.

One embodiment of window virtualization is to insert a preacking appliance 200 into a TCP session. In reference to any of the environments of FIG. 1A or 1B, initiation of a data communication session between a source node, e.g., client 102 (for ease of discussion, now referenced as source node 102), and a destination node, e.g., server 106 (for ease of discussion, now referenced as destination node 106) is established. For TCP communications, the source node 102 initially transmits a synchronization signal ("SYN") through its local area network 104 to first flow control module 220. The first flow control module 220 inserts a configuration identifier into the TCP header options area. The configuration identifier identifies this point in the data path as a flow control module.

The appliances 200 via a flow control module 220 provide window (or buffer) to allow increasing data buffering capabilities within a session despite having end nodes with small buffer sizes, e.g., typically 16 k bytes. However, RFC 1323 requires window scaling for any buffer sizes greater than 64 k bytes, which must be set at the time of session initialization (SYN, SYN-ACK signals). Moreover, the window scaling corresponds to the lowest common denominator in the data path, often an end node with small buffer size. This window scale often is a scale of 0 or 1, which corresponds to a buffer size of up to 64 k or 128 k bytes. Note that because the window size is defined as the window field in each packet shifted over by the window scale, the window scale establishes an upper limit for the buffer, but does not guarantee the buffer is actually that large. Each packet indicates the current available buffer space at the receiver in the window field.

In one embodiment of scaling using the window virtualization technique, during connection establishment (i.e., initialization of a session) when the first flow control module 220 receives from the source node 102 the SYN signal (or packet), the flow control module 220 stores the windows scale of the source node 102 (which is the previous node) or stores a 0 for window scale if the scale of the previous node is missing. The first flow control module 220 also modifies the scale, e.g., increases the scale to 4 from 0 or 1, in the SYN-FCM signal. When the second flow control module 220 receives the SYN signal, it stores the increased scale from the first flow control signal and resets the scale in the SYN signal back to the source node 103 scale value for transmission to the destination node 106. When the second flow controller 220 receives the SYN-ACK signal from the destination node 106, it stores the scale from the destination node 106 scale, e.g., 0 or 1, and modifies it to an increased scale that is sent with the SYN-ACK-FCM signal. The first flow control node 220 receives and notes the received window scale and revises the windows scale sent back to the source node 102 back down to the original scale, e.g., 0 or 1. Based on the above window shift conversation during connection establishment, the window field in every subsequent packet, e.g., TCP packet, of the session must be shifted according to the window shift conversion.

The window scale, as described above, expresses buffer sizes of over 64 k and may not be required for window virtualization. Thus, shifts for window scale may be used to express increased buffer capacity in each flow control module 220. This increase in buffer capacity in may be referenced as window (or buffer) virtualization. The increase in buffer size allows greater packet through put from and to the respective end nodes 102 and 106. Note that buffer sizes in TCP are typically expressed in terms of bytes, but for ease of discussion "packets" may be used in the description herein as it relates to virtualization.

By way of example, a window (or buffer) virtualization performed by the flow controller 220 is described. In this example, the source node 102 and the destination node 106 are configured similar to conventional end nodes having a limited buffer capacity of 16 k bytes, which equals approximately 10 packets of data. Typically, an end node 102, 106 must wait until the packet is transmitted and confirmation is received before a next group of packets can be transmitted. In one embodiment, using increased buffer capacity in the flow control modules 220, when the source node 103 transmits its data packets, the first flow control module 220 receives the packets, stores it in its larger capacity buffer, e.g., 512 packet capacity, and immediately sends back an acknowledgement signal indicating receipt of the packets ("REC-ACK") back to the source node 102. The source node 102 can then "flush" its current buffer, load it with 10 new data packets, and transmit those onto the first flow control module 220. Again, the first flow control module 220 transmits a REC-ACK signal back to the source node 102 and the source node 102 flushes its buffer and loads it with 10 more new packets for transmission.

As the first flow control module 220 receives the data packets from the source nodes, it loads up its buffer accordingly. When it is ready the first flow control module 220 can begin transmitting the data packets to the second flow control module 230, which also has an increased buffer size, for example, to receive 512 packets. The second flow control module 220' receives the data packets and begins to transmit 10 packets at a time to the destination node 106. Each REC-ACK received at the second flow control node 220 from the destination node 106 results in 10 more packets being transmitted to the destination node 106 until all the data packets are transferred. Hence, the present disclosure is able to increase data transmission throughput between the source node (sender) 102 and the destination node (receiver) 106 by taking advantage of the larger buffer in the flow control modules 220, 220' between the devices.

It is noted that by "preacking" the transmission of data as described previously, a sender (or source node 102) is allowed to transmit more data than is possible without the preacks, thus affecting a larger window size. For example, in one embodiment this technique is effective when the flow control module 220, 220' is located "near" a node (e.g., source node 102 or destination node 106) that lacks large windows.

Recongestion

Another technique or algorithm of the flow controller 220 is referred to as recongestion. The standard TCP congestion avoidance algorithms are known to perform poorly in the face of certain network conditions, including: large RTTs (round trip times), high packet loss rates, and others. When the appliance 200 detects a congestion condition such as long round trip times or high packet loss, the appliance 200 intervenes, substituting an alternate congestion avoidance algorithm that better suits the particular network condition. In one embodiment, the recongestion algorithm uses preacks to effectively terminate the connection between the sender and the receiver. The appliance 200 then resends the packets from itself to the receiver, using a different congestion avoidance algorithm. Recongestion algorithms may be dependent on the characteristics of the TCP connection. The appliance 200 monitors each TCP connection, characterizing it with respect to the different dimensions, selecting a recongestion algorithm that is appropriate for the current characterization.

In one embodiment, upon detecting a TCP connection that is limited by round trip times (RTT), a recongestion algorithm is applied which behaves as multiple TCP connections. Each TCP connection operates within its own performance limit but the aggregate bandwidth achieves a higher performance level. One parameter in this mechanism is the number of parallel connections that are applied (N). Too large a value of N and the connection bundle achieves more than its fair share of bandwidth. Too small a value of N and the connection bundle achieves less than its fair share of bandwidth. One method of establishing "N" relies on the appliance 200 monitoring the packet loss rate, RTT, and packet size of the actual connection. These numbers are plugged into a TCP response curve formula to provide an upper limit on the performance of a single TCP connection in the present configuration. If each connection within the connection bundle is achieving substantially the same performance as that computed to be the upper limit, then additional parallel connections are applied. If the current bundle is achieving less performance than the upper limit, the number of parallel connections is reduced. In this manner, the overall fairness of the system is maintained since individual connection bundles contain no more parallelism than is required to eliminate the restrictions imposed by the protocol itself. Furthermore, each individual connection retains TCP compliance.

Another method of establishing "N" is to utilize a parallel flow control algorithm such as the TCP "Vegas" algorithm or its improved version "Stabilized Vegas." In this method, the network information associated with the connections in the connection bundle (e.g., RTT, loss rate, average packet size, etc.) is aggregated and applied to the alternate flow control algorithm. The results of this algorithm are in turn distributed among the connections of the bundle controlling their number (i.e., N). Optionally, each connection within the bundle continues using the standard TCP congestion avoidance algorithm.

In another embodiment, the individual connections within a parallel bundle are virtualized, i.e., actual individual TCP connections are not established. Instead the congestion avoidance algorithm is modified to behave as though there were N parallel connections. This method has the advantage of appearing to transiting network nodes as a single connection. Thus the QOS, security and other monitoring methods of these nodes are unaffected by the recongestion algorithm. In yet another embodiment, the individual connections within a parallel bundle are real, i.e., a separate TCP connection is established for each of the parallel connections within a bundle. The congestion avoidance algorithm for each TCP connection need not be modified.

Retransmission

In some embodiments, the flow controller 220 may apply a local retransmission technique. One reason for implementing preacks is to prepare to transit a high-loss link (e.g., wireless). In these embodiments, the preacking appliance 200 or flow control module 220 is located most beneficially "before" the wireless link. This allows retransmissions to be performed closer to the high loss link, removing the retransmission burden from the remainder of the network. The appliance 200 may provide local retransmission, in which case, packets dropped due to failures of the link are retransmitted directly by the appliance 200. This is advantageous because it eliminates the retransmission burden upon an end node, such as server 106, and infrastructure of any of the networks 104. With appliance 200 providing local retransmissions, the dropped packet can be retransmitted across the high loss link without necessitating a retransmit by an end node and a corresponding decrease in the rate of data transmission from the end node.

Another reason for implementing preacks is to avoid a receive time out (RTO) penalty. In standard TCP there are many situations that result in an RTO, even though a large percentage of the packets in flight were successfully received. With standard TCP algorithms, dropping more than one packet within an RTT window would likely result in a timeout. Additionally, most TCP connections experience a timeout if a retransmitted packet is dropped. In a network with a high bandwidth delay product, even a relatively small packet loss rate will cause frequent Retransmission timeouts (RTOs). In one embodiment, the appliance 200 uses a retransmit and timeout algorithm is avoid premature RTOs. The appliance 200 or flow controller 220 maintains a count of retransmissions is maintained on a per-packet basis. Each time that a packet is retransmitted, the count is incremented by one and the appliance 200 continues to transmit packets. In some embodiments, only if a packet has been retransmitted a predetermined number of times is an RTO declared.

Wavefront Detection and Disambiguation

In some embodiments, the appliance 200 or flow controller 220 uses wavefront detection and disambiguation techniques in managing and controlling flow of network traffic. In this technique, the flow controller 220 uses transmit identifiers or numbers to determine whether particular data packets need to be retransmitted. By way of example, a sender transmits data packets over a network, where each instance of a transmitted data packet is associated with a transmit number. It can be appreciated that the transmit number for a packet is not the same as the packet's sequence number, since a sequence number references the data in the packet while the transmit number references an instance of a transmission of that data. The transmit number can be any information usable for this purpose, including a timestamp associated with a packet or simply an increasing number (similar to a sequence number or a packet number). Because a data segment may be retransmitted, different transmit numbers may be associated with a particular sequence number.

As the sender transmits data packets, the sender maintains a data structure of acknowledged instances of data packet transmissions. Each instance of a data packet transmission is referenced by its sequence number and transmit number. By maintaining a transmit number for each packet, the sender retains the ordering of the transmission of data packets. When the sender receives an ACK or a SACK, the sender determines the highest transmit number associated with packets that the receiver indicated has arrived (in the received acknowledgement). Any outstanding unacknowledged packets with lower transmit numbers are presumed lost.

In some embodiments, the sender is presented with an ambiguous situation when the arriving packet has been retransmitted: a standard ACK/SACK does not contain enough information to allow the sender to determine which transmission of the arriving packet has triggered the acknowledgement. After receiving an ambiguous acknowledgement, therefore, the sender disambiguates the acknowledgement to associate it with a transmit number. In various embodiments, one or a combination of several techniques may be used to resolve this ambiguity.

In one embodiment, the sender includes an identifier with a transmitted data packet, and the receiver returns that identifier or a function thereof with the acknowledgement. The identifier may be a timestamp (e.g., a TCP timestamp as described in RFC 1323), a sequential number, or any other information that can be used to resolve between two or more instances of a packet's transmission. In an embodiment in which the TCP timestamp option is used to disambiguate the acknowledgement, each packet is tagged with up to 32-bits of unique information. Upon receipt of the data packet, the receiver echoes this unique information back to the sender with the acknowledgement. The sender ensures that the originally sent packet and its retransmitted version or versions contain different values for the timestamp option, allowing it to unambiguously eliminate the ACK ambiguity. The sender may maintain this unique information, for example, in the data structure in which it stores the status of sent data packets. This technique is advantageous because it complies with industry standards and is thus likely to encounter little or no interoperability issues. However, this technique may require ten bytes of TCP header space in some implementations, reducing the effective throughput rate on the network and reducing space available for other TCP options.

In another embodiment, another field in the packet, such as the IP ID field, is used to disambiguate in a way similar to the TCP timestamp option described above. The sender arranges for the ID field values of the original and the retransmitted version or versions of the packet to have different ID fields in the IP header. Upon reception of the data packet at the receiver, or a proxy device thereof, the receiver sets the ID field of the ACK packet to a function of the ID field of the packet that triggers the ACK. This method is advantageous, as it requires no additional data to be sent, preserving the efficiency of the network and TCP header space. The function chosen should provide a high degree of likelihood of providing disambiguation. In a preferred embodiment, the sender selects IP ID values with the most significant bit set to 0. When the receiver responds, the IP ID value is set to the same IP ID value with the most significant bit set to a one.

In another embodiment, the transmit numbers associated with non-ambiguous acknowledgements are used to disambiguate an ambiguous acknowledgement. This technique is based on the principle that acknowledgements for two packets will tend to be received closer in time as the packets are transmitted closer in time. Packets that are not retransmitted will not result in ambiguity, as the acknowledgements received for such packets can be readily associated with a transmit number. Therefore, these known transmit numbers are compared to the possible transmit numbers for an ambiguous acknowledgement received near in time to the known acknowledgement. The sender compares the transmit numbers of the ambiguous acknowledgement against the last known received transmit number, selecting the one closest to the known received transmit number. For example, if an acknowledgement for data packet 1 is received and the last received acknowledgement was for data packet 5, the sender resolves the ambiguity by assuming that the third instance of data packet 1 caused the acknowledgement.

Selective Acknowledgements

Another technique of the appliance 200 or flow controller 220 is to implement an embodiment of transport control protocol selective acknowledgements, or TCP SACK, to determine what packets have or have not been received. This technique allows the sender to determine unambiguously a list of packets that have been received by the receiver as well as an accurate list of packets not received. This functionality may be implemented by modifying the sender and/or receiver, or by inserting sender- and receiver-side flow control modules 220 in the network path between the sender and receiver. In reference to FIG. 1A or FIG. 1B, a sender, e.g., client 102, is configured to transmit data packets to the receiver, e.g., server 106, over the network 104. In response, the receiver returns a TCP Selective Acknowledgment option, referred to as SACK packet to the sender. In one embodiment, the communication is bi-directional, although only one direction of communication is discussed here for simplicity. The receiver maintains a list, or other suitable data structure, that contains a group of ranges of sequence numbers for data packets that the receiver has actually received. In some embodiments, the list is sorted by sequence number in an ascending or descending order. The receiver also maintains a left-off pointer, which comprises a reference into the list and indicates the left-off point from the previously generated SACK packet.

Upon reception of a data packet, the receiver generates and transmits a SACK packet back to the sender. In some embodiments, the SACK packet includes a number of fields, each of which can hold a range of sequence numbers to indicate a set of received data packets. The receiver fills this first field of the SACK packet with a range of sequence numbers that includes the landing packet that triggered the SACK packet. The remaining available SACK fields are filled with ranges of sequence numbers from the list of received packets. As there are more ranges in the list than can be loaded into the SACK packet, the receiver uses the left-off pointer to determine which ranges are loaded into the SACK packet. The receiver inserts the SACK ranges consecutively from the sorted list, starting from the range referenced by the pointer and continuing down the list until the available SACK range space in the TCP header of the SACK packet is consumed. The receiver wraps around to the start of the list if it reaches the end. In some embodiments, two or three additional SACK ranges can be added to the SACK range information.

Once the receiver generates the SACK packet, the receiver sends the acknowledgement back to the sender. The receiver then advances the left-off pointer by one or more SACK range entries in the list. If the receiver inserts four SACK ranges, for example, the left-off pointer may be advanced two SACK ranges in the list. When the advanced left-off pointer reaches at the end of the list, the pointer is reset to the start of the list, effectively wrapping around the list of known received ranges. Wrapping around the list enables the system to perform well, even in the presence of large losses of SACK packets, since the SACK information that is not communicated due to a lost SACK packet will eventually be communicated once the list is wrapped around.

It can be appreciated, therefore, that a SACK packet may communicate several details about the condition of the receiver. First, the SACK packet indicates that, upon generation of the SACK packet, the receiver had just received a data packet that is within the first field of the SACK information. Secondly, the second and subsequent fields of the SACK information indicate that the receiver has received the data packets within those ranges. The SACK information also implies that the receiver had not, at the time of the SACK packet's generation, received any of the data packets that fall between the second and subsequent fields of the SACK information. In essence, the ranges between the second and subsequent ranges in the SACK information are "holes" in the received data, the data therein known not to have been delivered. Using this method, therefore, when a SACK packet has sufficient space to include more than two SACK ranges, the receiver may indicate to the sender a range of data packets that have not yet been received by the receiver.

In another embodiment, the sender uses the SACK packet described above in combination with the retransmit technique described above to make assumptions about which data packets have been delivered to the receiver. For example, when the retransmit algorithm (using the transmit numbers) declares a packet lost, the sender considers the packet to be only conditionally lost, as it is possible that the SACK packet identifying the reception of this packet was lost rather than the data packet itself. The sender thus adds this packet to a list of potentially lost packets, called the presumed lost list. Each time a SACK packet arrives, the known missing ranges of data from the SACK packet are compared to the packets in the presumed lost list. Packets that contain data known to be missing are declared actually lost and are subsequently retransmitted. In this way, the two schemes are combined to give the sender better information about which packets have been lost and need to be retransmitted.

Transaction Boundary Detection

In some embodiments, the appliance 200 or flow controller 220 applies a technique referred to as transaction boundary detection. In one embodiment, the technique pertains to ping-pong behaved connections. At the TCP layer, ping-pong behavior is when one communicant—a sender—sends data and then waits for a response from the other communicant—the receiver. Examples of ping-pong behavior include remote procedure call, HTTP and others. The algorithms described above use retransmission timeout (RTO) to recover from the dropping of the last packet or packets associated with the transaction. Since the TCP RTO mechanism is extremely coarse in some embodiments, for example requiring a minimum one second value in all cases, poor application behavior may be seen in these situations.

In one embodiment, the sender of data or a flow control module 220 coupled to the sender detects a transaction boundary in the data being sent. Upon detecting a transaction boundary, the sender or a flow control module 220 sends additional packets, whose reception generates additional ACK or SACK responses from the receiver. Insertion of the additional packets is preferably limited to balance between improved application response time and network capacity utilization. The number of additional packets that is inserted may be selected according to the current loss rate associated with that connection, with more packets selected for connections having a higher loss rate.

One method of detecting a transaction boundary is time based. If the sender has been sending data and ceases, then after a period of time the sender or flow control module 200 declares a transaction boundary. This may be combined with other techniques. For example, the setting of the PSH (TCP Push) bit by the sender in the TCP header may indicate a transaction boundary. Accordingly, combining the time-based approach with these additional heuristics can provide for more accurate detection of a transaction boundary. In another technique, if the sender or flow control module 220 understands the application protocol, it can parse the protocol data stream and directly determine transaction boundaries. In some embodiment, this last behavior can be used independent of any time-based mechanism.

Responsive to detecting a transaction boundary, the sender or flow control module 220 transmits additional data packets to the receiver to cause acknowledgements therefrom. The additional data packets should therefore be such that the receiver will at least generate an ACK or SACK in response to receiving the data packet. In one embodiment, the last packet or packets of the transaction are simply retransmitted. This has the added benefit of retransmitting needed data if the last packet or packets had been dropped, as compared to merely sending dummy data packets. In another embodiment, fractions of the last packet or packets are sent, allowing the sender to disambiguate the arrival of these packets from their original packets. This allows the receiver to avoid falsely confusing any reordering adaptation algorithms. In another embodiment, any of a number of well-known forward error correction techniques can be used to generate additional data for the inserted packets, allowing for the reconstruction of dropped or otherwise missing data at the receiver.

In some embodiments, the boundary detection technique described herein helps to avoid a timeout when the acknowledgements for the last data packets in a transaction are dropped. When the sender or flow control module 220 receives the acknowledgements for these additional data packets, the sender can determine from these additional acknowledgements whether the last data packets have been received or need to be retransmitted, thus avoiding a timeout. In one embodiment, if the last packets have been received but their acknowledgements were dropped, a flow control module 220 generates an acknowledgement for the data packets and sends the acknowledgement to the sender, thus communicating to the sender that the data packets have been delivered. In another embodiment, if the last packets have not been received, a flow control module 200 sends a packet to the sender to cause the sender to retransmit the dropped data packets.

Repacketization

In yet another embodiment, the appliance 200 or flow controller 220 applies a repacketization technique for improving the flow of transport layer network traffic. In some embodiments, performance of TCP is proportional to packet size. Thus increasing packet sizes improves performance unless it causes substantially increased packet loss rates or other nonlinear effects, like IP fragmentation. In general, wired media (such as copper or fibre optics) have extremely low bit-error rates, low enough that these can be ignored. For these media, it is advantageous for the packet size to be the maximum possible before fragmentation occurs (the maximum packet size is limited by the protocols of the underlying transmission media). Whereas for transmission media with higher loss rates (e.g., wireless technologies such as WiFi, etc., or high-loss environments such as power-line networking, etc.), increasing the packet size may lead to lower transmission rates, as media-induced errors cause an entire packet to be dropped (i.e., media-induced errors beyond the capability of the standard error correcting code for that media), increasing the packet loss rate. A sufficiently large increase in the packet loss rate will actually negate any performance benefit of increasing packet size. In some cases, it may be difficult for a TCP endpoint to choose an optimal packet size. For example, the optimal packet size may vary across the transmission path, depending on the nature of each link.

By inserting an appliance 200 or flow control module 220 into the transmission path, the flow controller 220 monitors characteristics of the link and repacketizes according to determined link characteristics. In one embodiment, an appliance 200 or flow controller 220 repacketizes packets with sequential data into a smaller number of larger packets. In another embodiment, an appliance 200 or flow controller 220 repacketizes packets by breaking part a sequence of large packets into a larger number of smaller packets. In other embodiments, an appliance 200 or flow controller 220 monitors the link characteristics and adjusts the packet sizes through recombination to improve throughput.

QoS

Still referring to FIG. 2A, the flow controller 220, in some embodiments, may include a QoS Engine 236, also referred to as a QoS controller. In another embodiment, the appliance 200 and/or network optimization engine 250 includes the QoS engine 236, for example, separately but in communication with the flow controller 220. The QoS Engine 236 includes any logic, business rules, function or operations for performing one or more Quality of Service (QoS) techniques improving the performance, operation or quality of service of any of the network connections. In some embodiments, the QoS engine 236 includes network traffic control and management mechanisms that provide different priorities to different users, applications, data flows or connections. In other embodiments, the QoS engine 236 controls, maintains, or assures a certain level of performance to a user, application, data flow or connection. In one embodiment, the QoS engine 236 controls, maintains or assures a certain portion of bandwidth or network capacity for a user, application, data flow or connection. In some embodiments, the QoS engine 236 monitors the achieved level of performance or the quality of service corresponding to a user, application, data flow or connection, for example, the data rate and delay. In response to monitoring, the QoS engine 236 dynamically controls or adjusts scheduling priorities of network packets to achieve the desired level of performance or quality of service.

In some embodiments, the QoS engine 236 prioritizes, schedules and transmits network packets according to one or more classes or levels of services. In some embodiments, the class or level service may include: 1) best efforts, 2) controlled load, 3) guaranteed or 4) qualitative. For a best efforts class of service, the appliance 200 makes reasonable effort to deliver packets (a standard service level). For a controlled load class of service, the appliance 200 or QoS engine 236 approximates the standard packet error loss of the transmission medium or approximates the behavior of best-effort service in lightly loaded network conditions. For a guaranteed class of service, the appliance 200 or QoS engine 236 guarantees the ability to transmit data at a determined rate for the duration of the connection. For a qualitative class of service, the appliance 200 or QoS engine 236 the qualitative service class is used for applications, users, data flows or connection that require or desire prioritized traffic but cannot quantify resource needs or level of service. In these cases, the appliance 200 or QoS engine 236 determines the class of service or prioritization based on any logic or configuration of the QoS engine 236 or based on business rules or policies. For example, in one embodiment, the QoS engine 236 prioritizes, schedules and transmits network packets according to one or more policies as specified by the policy engine 295, 295'.

Protocol Acceleration

The protocol accelerator 234 includes any logic, business rules, function or operations for optimizing, accelerating, or otherwise improving the performance, operation or quality of service of one or more protocols. In one embodiment, the protocol accelerator 234 accelerates any application layer protocol or protocols at layers 5-7 of the network stack. In other embodiments, the protocol accelerator 234 accelerates a transport layer or a layer 4 protocol. In one embodiment, the protocol accelerator 234 accelerates layer 2 or layer 3 protocols. In some embodiments, the protocol accelerator 234 is configured, constructed or designed to optimize or accelerate each of one or more protocols according to the type of data, characteristics and/or behavior of the protocol. In another embodiment, the protocol accelerator 234 is configured, constructed or designed to improve a user experience, response times, network or computer load, and/or network or bandwidth utilization with respect to a protocol.

In one embodiment, the protocol accelerator 234 is configured, constructed or designed to minimize the effect of WAN latency on file system access. In some embodiments, the protocol accelerator 234 optimizes or accelerates the use of the CIFS (Common Internet File System) protocol to improve file system access times or access times to data and files. In some embodiments, the protocol accelerator 234 optimizes or accelerates the use of the NFS (Network File System) protocol. In another embodiment, the protocol accelerator 234 optimizes or accelerates the use of the File Transfer protocol (FTP).

In one embodiment, the protocol accelerator 234 is configured, constructed or designed to optimize or accelerate a protocol carrying as a payload or using any type and form of markup language. In other embodiments, the protocol accelerator 234 is configured, constructed or designed to optimize or accelerate a HyperText Transfer Protocol (HTTP). In another embodiment, the protocol accelerator 234 is configured, constructed or designed to optimize or accelerate a protocol carrying as a payload or otherwise using XML (eXtensible Markup Language).

Transparency and Multiple Deployment Configuration

In some embodiments, the appliance 200 and/or network optimization engine 250 is transparent to any data flowing across a network connection or link, such as a WAN link. In one embodiment, the appliance 200 and/or network optimization engine 250 operates in such a manner that the data flow across the WAN is recognizable by any network monitoring, QOS management or network analysis tools. In some embodiments, the appliance 200 and/or network optimization engine 250 does not create any tunnels or streams for transmitting data that may hide, obscure or otherwise make the network traffic not transparent. In other embodiments, the appliance 200 operates transparently in that the appliance does not change any of the source and/or destination address information or port information of a network packet, such as internet protocol addresses or port numbers. In other embodiments, the appliance 200 and/or network optimization engine 250 is considered to operate or behave transparently to the network, an application, client, server or other appliances or computing device in the network infrastructure. That is, in some embodiments, the appliance is transparent in that network related configuration of any device or appliance on the network does not need to be modified to support the appliance 200.

The appliance 200 may be deployed in any of the following deployment configurations: 1) in-line of traffic, 2) in proxy mode, or 3) in a virtual in-line mode. In some embodiments, the appliance 200 may be deployed inline to one or more of the following: a router, a client, a server or another network device or appliance. In other embodiments, the appliance 200 may be deployed in parallel to one or more of the following: a router, a client, a server or another network device or appliance. In parallel deployments, a client, server, router or other network appliance may be configured to forward, transfer or transit networks to or via the appliance 200.

In the embodiment of in-line, the appliance 200 is deployed inline with a WAN link of a router. In this way, all traffic from the WAN passes through the appliance before arriving at a destination of a LAN.

In the embodiment of a proxy mode, the appliance 200 is deployed as a proxy device between a client and a server. In some embodiments, the appliance 200 allows clients to make indirect connections to a resource on a network. For example, a client connects to a resource via the appliance 200, and the appliance provides the resource either by connecting to the resource, a different resource, or by serving the resource from a cache. In some cases, the appliance may alter the client's request or the server's response for various purposes, such as for any of the optimization techniques discussed herein. In other embodiments, the appliance 200 behaves as a transparent proxy, by intercepting and forwarding requests and responses transparently to a client and/or server. Without client-side configuration, the appliance 200 may redirect client requests to different servers or networks. In some embodiments, the appliance 200 may perform any type and form of network address translation, referred to as NAT, on any network traffic traversing the appliance.

In some embodiments, the appliance 200 is deployed in a virtual in-line mode configuration. In this embodiment, a router or a network device with routing or switching functionality is configured to forward, reroute or otherwise provide network packets destined to a network to the appliance 200. The appliance 200 then performs any desired processing on the network packets, such as any of the WAN optimization techniques discussed herein. Upon completion of processing, the appliance 200 forwards the processed network packet to the router to transmit to the destination on the network. In this way, the appliance 200 can be coupled to the router in parallel but still operate as it if the appliance 200 were inline. This deployment mode also provides transparency in that the source and destination addresses and port information are preserved as the packet is processed and transmitted via the appliance through the network.

End Node Deployment

Although the network optimization engine 250 is generally described above in conjunction with an appliance 200, the network optimization engine 250, or any portion thereof, may be deployed, distributed or otherwise operated on any end node, such as a client 102 and/or server 106. As such, a client or server may provide any of the systems and methods of the network optimization engine 250 described herein in conjunction with one or more appliances 200 or without an appliance 200.

Figure 2B:
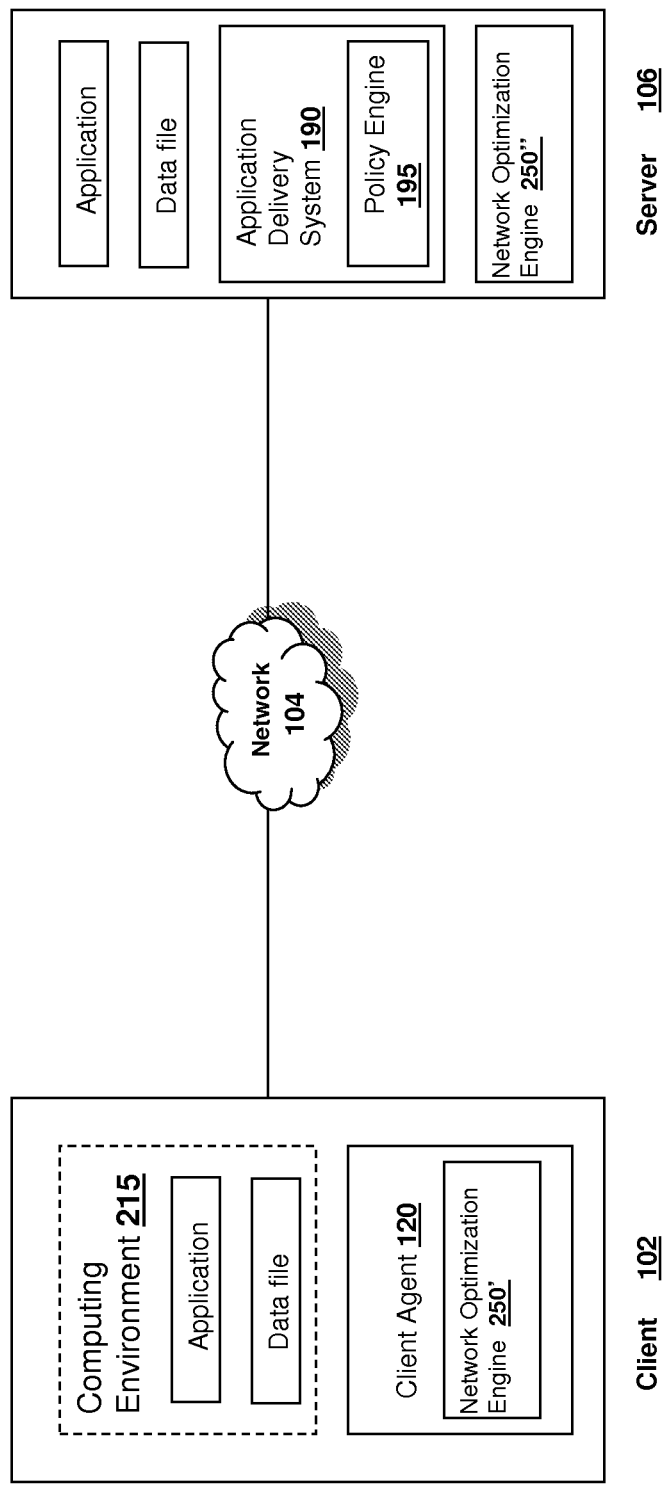
FIG. 2B is a block diagram illustrating some embodiments of a client and/or server deploying the network optimization features of the appliance.

Referring now to FIG. 2B, an example embodiment of the network optimization engine 250 deployed on one or more end nodes is depicted. In brief overview, the client 102 may include a first network optimization engine 250' and the server 106 may include a second network optimization engine 250". The client 102 and server 106 may establish a transport layer connection and exchange communications with or without traversing an appliance 200.

In one embodiment, the network optimization engine 250' of the client 102 performs the techniques described herein to optimize, accelerate or otherwise improve the performance, operation or quality of service of network traffic communicated with the server 106. In another embodiment, the network optimization engine 250" of the server 106 performs the techniques described herein to optimize, accelerate or otherwise improve the performance, operation or quality of service of network traffic communicated with the client 102. In some embodiments, the network optimization engine 250' of the client 102 and the network optimization engine 250" of the server 106 perform the techniques described herein to optimize, accelerate or otherwise improve the performance, operation or quality of service of network traffic communicated between the client 102 and the server 106. In yet another embodiment, the network optimization engine 250' of the client 102 performs the techniques described herein in conjunction with an appliance 200 to optimize, accelerate or otherwise improve the performance, operation or quality of service of network traffic communicated with the client 102. In still another embodiment, the network optimization engine 250" of the server 106 performs the techniques described herein in conjunction with an appliance 200 to optimize, accelerate or otherwise improve the performance, operation or quality of service of network traffic communicated with the server 106.

C. Client Agent

Figure 3:
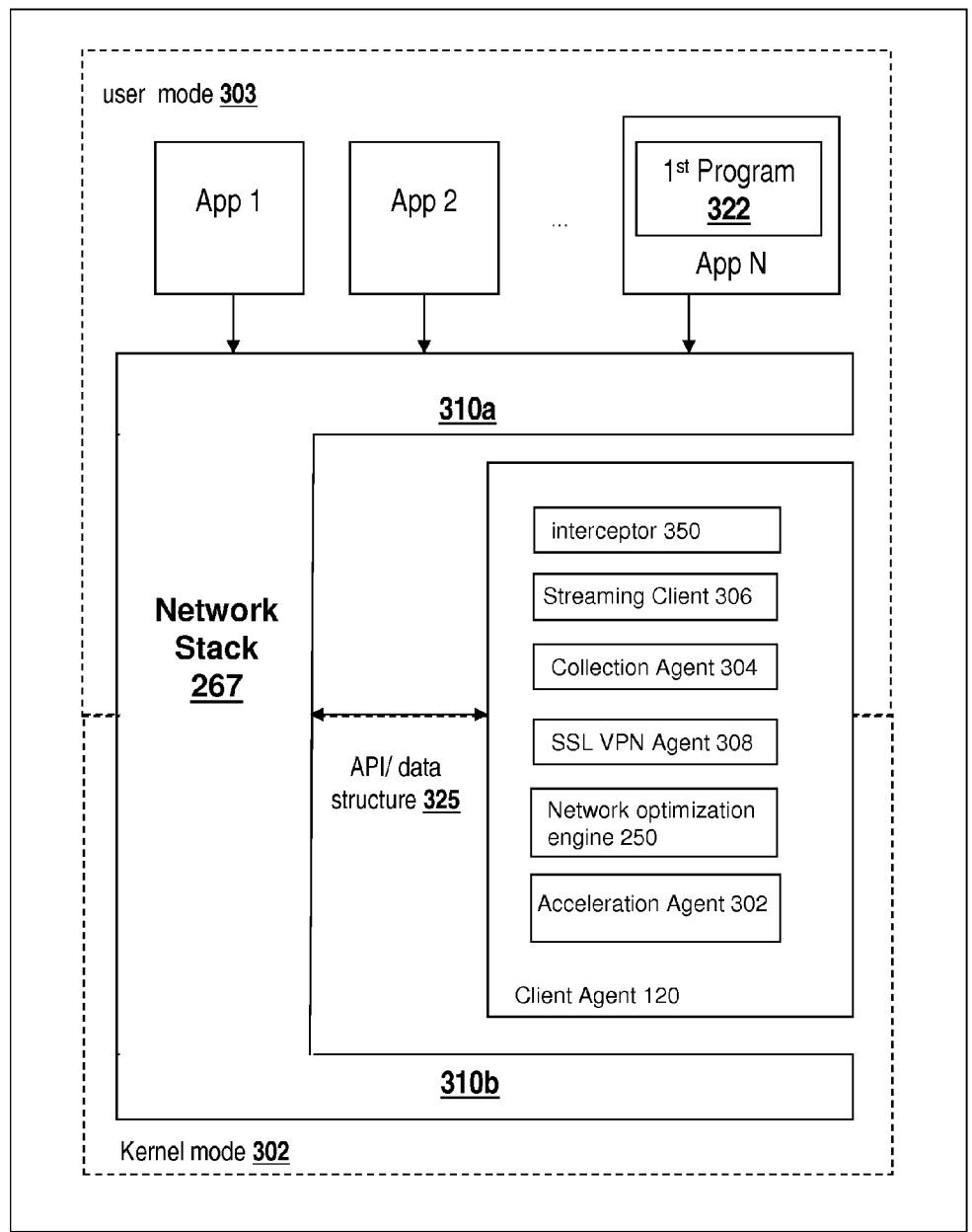
FIG. 3 is a block diagram illustrating some embodiments of a client for communicating with a server using the network optimization feature.

Referring now to FIG. 3, an embodiment of a client agent 120 is depicted. The client 102 has a client agent 120 for establishing, exchanging, managing or controlling communications with the appliance 200, appliance 205 and/or server 106 via a network 104. In some embodiments, the client agent 120, which may also be referred to as a WAN client, accelerates WAN network communications and/or is used to communicate via appliance 200 on a network. In brief overview, the client 102 operates on computing device 100 having an operating system with a kernel mode 302 and a user mode 303, and a network stack 267 with one or more layers 310a-310b. The client 102 may have installed and/or execute one or more applications. In some embodiments, one or more applications may communicate via the network stack 267 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 267 from the one or more applications.

As with the appliance 200, the client has a network stack 267 including any type and form of software, hardware, or any combinations thereof, for providing connectivity to and communications with a network 104. The network stack 267 of the client 102 includes any of the network stack embodiments described above in conjunction with the appliance 200. In some embodiments, the client agent 120, or any portion thereof, is designed and constructed to operate with or work in conjunction with the network stack 267 installed or otherwise provided by the operating system of the client 102.

In further details, the network stack 267 of the client 102 or appliance 200 (or 205) may include any type and form of interfaces for receiving, obtaining, providing or otherwise accessing any information and data related to network communications of the client 102. In one embodiment, an interface to the network stack 267 includes an application programming interface (API). The interface may also have any function call, hooking or filtering mechanism, event or call back mechanism, or any type of interfacing technique. The network stack 267 via the interface may receive or provide any type and form of data structure, such as an object, related to functionality or operation of the network stack 267. For example, the data structure may include information and data related to a network packet or one or more network packets. In some embodiments, the data structure includes, references or identifies a portion of the network packet processed at a protocol layer of the network stack 267, such as a network packet of the transport layer. In some embodiments, the data structure 325 is a kernel-level data structure, while in other embodiments, the data structure 325 is a user-mode data structure. A kernel-level data structure may have a data structure obtained or related to a portion of the network stack 267 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 267 may execute or operate in kernel-mode 302, for example, the data link or network layer, while other portions execute or operate in user-mode 303, such as an application layer of the network stack 267. For example, a first portion 310a of the network stack may provide user-mode access to the network stack 267 to an application while a second portion 310a of the network stack 267 provides access to a network. In some embodiments, a first portion 310a of the network stack has one or more upper layers of the network stack 267, such as any of layers 5-7. In other embodiments, a second portion 310b of the network stack 267 includes one or more lower layers, such as any of layers 1-4. Each of the first portion 310a and second portion 310b of the network stack 267 may include any portion of the network stack 267, at any one or more network layers, in user-mode 303, kernel-mode, 302, or combinations thereof, or at any portion of a network layer or interface point to a network layer or any portion of or interface point to the user-mode 302 and kernel-mode 203.

The interceptor 350 may include software, hardware, or any combination of software and hardware. In one embodiment, the interceptor 350 intercepts or otherwise receives a network communication at any point in the network stack 267, and redirects or transmits the network communication to a destination desired, managed or controlled by the interceptor 350 or client agent 120. For example, the interceptor 350 may intercept a network communication of a network stack 267 of a first network and transmit the network communication to the appliance 200 for transmission on a second network 104. In some embodiments, the interceptor 350 includes or is a driver, such as a network driver constructed and designed to interface and work with the network stack 267. In some embodiments, the client agent 120 and/or interceptor 350 operates at one or more layers of the network stack 267, such as at the transport layer. In one embodiment, the interceptor 350 includes a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 includes a driver complying with the Network Driver Interface Specification (NDIS), or a NDIS driver. In another embodiment, the interceptor 350 may be a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts or receives any transport layer connection requests. In these embodiments, the interceptor 350 executes transport layer application programming interface (API) calls to set the destination information, such as destination IP address and/or port to a desired location for the location. In this manner, the interceptor 350 intercepts and redirects the transport layer connection to an IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may include two agents 120 and 120'. In one embodiment, a first agent 120 may include an interceptor 350 operating at the network layer of the network stack 267. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 267. For example, in one embodiment, the interceptor 350 operates or interfaces with the transport layer of the network stack 267 transparently to any protocol layer below the transport layer, such as the network layer, and any protocol layer above the transport layer, such as the session, presentation or application layer protocols. This allows the other protocol layers of the network stack 267 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor 350 may operate at or interface with the network stack 267 in a manner transparent to any application, a user of the client 102, the client 102 and/or any other computing device 100, such as a server or appliance 200, 206, in communications with the client 102. The client agent 120, or any portion thereof, may be installed and/or executed on the client 102 in a manner without modification of an application. In one embodiment, the client agent 120, or any portion thereof, is installed and/or executed in a manner transparent to any network configuration of the client 102, appliance 200, 205 or server 106. In some embodiments, the client agent 120, or any portion thereof, is installed and/or executed with modification to any network configuration of the client 102, appliance 200, 205 or server 106. In one embodiment, the user of the client 102 or a computing device in communications with the client 102 are not aware of the existence, execution or operation of the client agent 12, or any portion thereof. As such, in some embodiments, the client agent 120 and/or interceptor 350 is installed, executed, and/or operated transparently to an application, user of the client 102, the client 102, another computing device, such as a server or appliance 200, 2005, or any of the protocol layers above and/or below the protocol layer interfaced to by the interceptor 350.

The client agent 120 includes a streaming client 306, a collection agent 304, SSL VPN agent 308, a network optimization engine 250, and/or acceleration program 302. In one embodiment, the client agent 120 is an Independent Computing Architecture (ICA) client, or any portion thereof, developed by Citrix Systems, Inc. of Fort Lauderdale, Fla., and is also referred to as an ICA client. In some embodiments, the client agent 120 has an application streaming client 306 for streaming an application from a server 106 to a client 102. In another embodiment, the client agent 120 includes a collection agent 304 for performing end-point detection/scanning and collecting end-point information for the appliance 200 and/or server 106. In some embodiments, the client agent 120 has one or more network accelerating or optimizing programs or agents, such as an network optimization engine 250 and an acceleration program 302. In one embodiment, the acceleration program 302 accelerates communications between client 102 and server 106 via appliance 205'. In some embodiments, the network optimization engine 250 provides WAN optimization techniques as discussed herein.

The streaming client 306 is an application, program, process, service, task or set of executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 is an application, program, process, service, task or set of executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 is an endpoint detection and scanning program, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or version of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

The SSL VPN agent 308 is an application, program, process, service, task or set of executable instructions for establishing a Secure Socket Layer (SSL) virtual private network (VPN) connection from a first network 104 to a second network 104', 104", or a SSL VPN connection from a client 102 to a server 106. In one embodiment, the SSL VPN agent 308 establishes a SSL VPN connection from a public network 104 to a private network 104' or 104". In some embodiments, the SSL VPN agent 308 works in conjunction with appliance 205 to provide the SSL VPN connection. In one embodiment, the SSL VPN agent 308 establishes a first transport layer connection with appliance 205. In some embodiment, the appliance 205 establishes a second transport layer connection with a server 106. In another embodiment, the SSL VPN agent 308 establishes a first transport layer connection with an application on the client, and a second transport layer connection with the appliance 205. In other embodiments, the SSL VPN agent 308 works in conjunction with WAN optimization appliance 200 to provide SSL VPN connectivity.

In some embodiments, the acceleration program 302 is a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

In one embodiment, the acceleration program 302 is designed, constructed or configured to work with appliance 205 to provide LAN side acceleration or to provide acceleration techniques provided via appliance 205. For example, in one embodiment of a NetScaler appliance 205 manufactured by Citrix Systems, Inc., the acceleration program 302 includes a NetScaler client. In some embodiments, the acceleration program 302 provides NetScaler acceleration techniques stand-alone in a remote device, such as in a branch office. In other embodiments, the acceleration program 302 works in conjunction with one or more NetScaler appliances 205. In one embodiment, the acceleration program 302 provides LAN-side or LAN based acceleration or optimization of network traffic.

In some embodiments, the network optimization engine 250 may be designed, constructed or configured to work with WAN optimization appliance 200. In other embodiments, network optimization engine 250 may be designed, constructed or configured to provide the WAN optimization techniques of appliance 200, with or without an appliance 200. For example, in one embodiment of a WANScaler appliance 200 manufactured by Citrix Systems, Inc. the network optimization engine 250 includes the WANscaler client. In some embodiments, the network optimization engine 250 provides WANScaler acceleration techniques stand-alone in a remote location, such as a branch office. In other embodiments, the network optimization engine 250 works in conjunction with one or more WANScaler appliances 200.

In another embodiment, the network optimization engine 250 includes the acceleration program 302, or the function, operations and logic of the acceleration program 302. In some embodiments, the acceleration program 302 includes the network optimization engine 250 or the function, operations and logic of the network optimization engine 250. In yet another embodiment, the network optimization engine 250 is provided or installed as a separate program or set of executable instructions from the acceleration program 302. In other embodiments, the network optimization engine 250 and acceleration program 302 are included in the same program or same set of executable instructions.

In some embodiments and still referring to FIG. 3, a first program 322 may be used to install and/or execute the client agent 120, or any portion thereof, automatically, silently, transparently, or otherwise. In one embodiment, the first program 322 is a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 is designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers and the client agent 120, or any portion thereof, on the operating system of the client 102.

In some embodiments, each or any of the portions of the client agent 120—a streaming client 306, a collection agent 304, SSL VPN agent 308, a network optimization engine 250, acceleration program 302, and interceptor 350—may be installed, executed, configured or operated as a separate application, program, process, service, task or set of executable instructions. In other embodiments, each or any of the portions of the client agent 120 may be installed, executed, configured or operated together as a single client agent 120.

D. Systems and Methods for Data Flow Control

Figure 4:
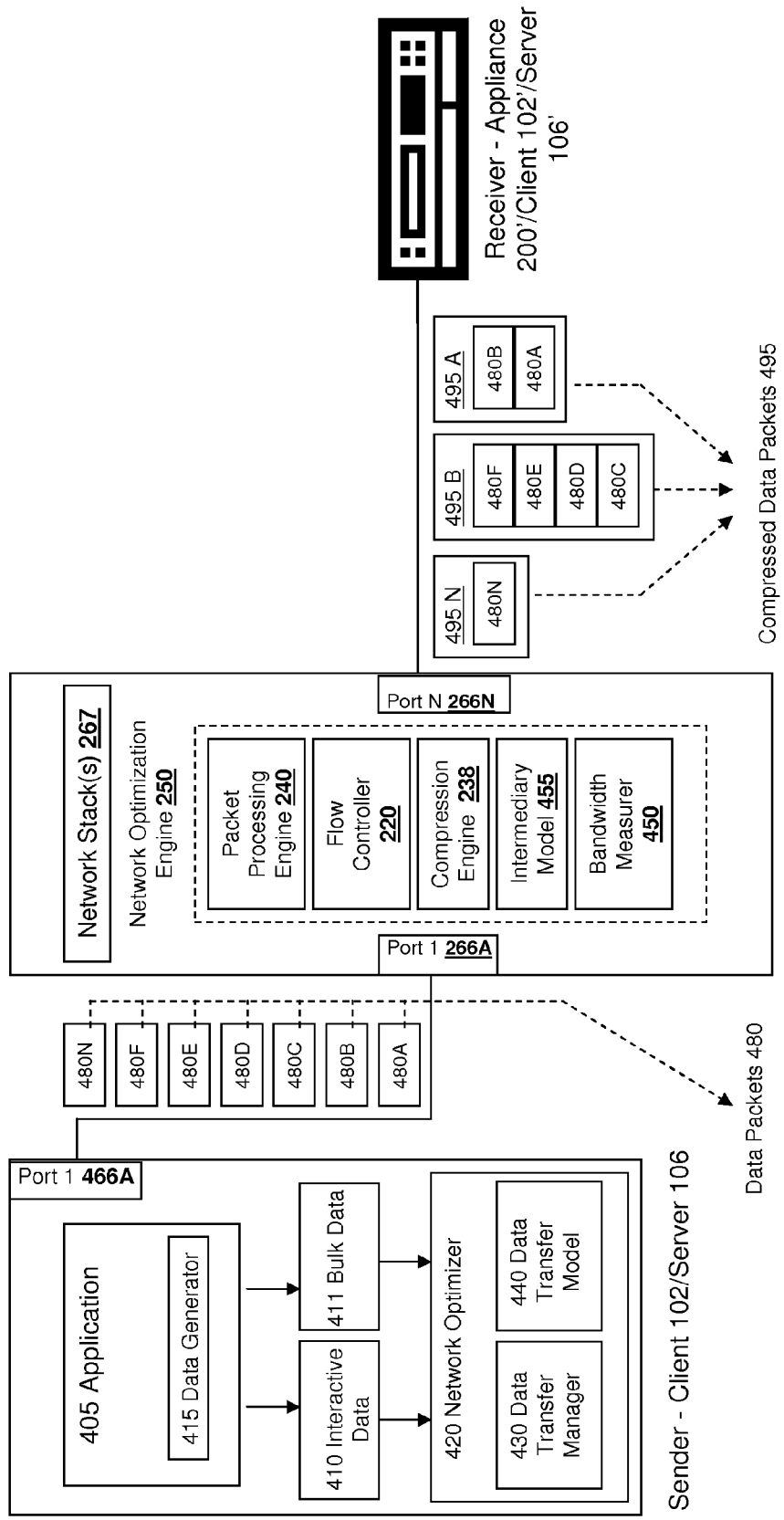
FIG. 4 is a block diagram illustrating some embodiments of a sender such as a client transmitting a data stream to a receiver, such as a server via an appliance 200.

Referring now to FIG. 4, some embodiments of a system for efficient data flow control are illustrated. The illustration shows a flow of data in a system comprising a sender and an appliance disposed in the path of the data stream transmitted between the sender and the receiver. FIG. 4 also illustrates embodiments of a system having an appliance 200 disposed along a data path between a server and a receiver, as well as embodiments wherein two or more appliances are deployed along the same data path.

In a brief overview, FIG. 4 illustrates a sender sending data to a receiver. Since data may be upstream and downstream, both, the sender or the receiver may either be a client 102 or a server 106. In some embodiments, the sender or the receiver may be an appliance 200. As shown in FIG. 4, the sender may include an application 405 comprising a data generator 415. Either the application 405 or the data generator 415 may generate data, such as interactive data 410 or bulk data 411. Herein, interactive data 410 and bulk data 411 may also be referred to as data portions 410 and 411. FIG. 4 illustrates the interactive data 410 and the bulk data 411 flowing into a network optimizer 420. The network optimizer 420 may include a data transfer manager 430 and a data transfer model 440. The network optimizer 420, in a plurality of embodiments, processes the data and may manage, control or improve the process of sending data. FIG. 4 also depicts the data portions 410 and 411 formed into data packets 480A-N and sent over the network from the 466A port of the sender to the 266A port of the appliance 200. The appliance 200, in addition to the aforementioned packet processing engine 240, the flow controller 220 and the compression engine 238 may also comprise an intermediary model 455 and a bandwidth measurer 450. In some embodiments, the appliance 200 processes data packets 480 and formats the packets into compressed data packets 495 which are sent over the network to the receiver.

In the embodiments depicted by FIG. 4, the sender is shown as an appliance comprising a number of components. It should be understood the sender may be any type of device sending or receiving communication via a network. In some embodiments, the sender is any system, apparatus or a unit communicating with another device. In a number of embodiments, the sender is a device running an application generating bulk data 411 or data which is not real time data. In a plurality of embodiments, the sender is a device running an application generating an interactive data 410 or a real time data. In some embodiments, the sender comprises a data generator. In some embodiments, the sender comprises a device, a unit, a program or a system controlling the flow of information or data transmitted by the sender. In a plurality of embodiments, the sender comprises a compression engine or a data formatting unit. In some embodiments, the sender is a device or a system capable of transmitting or receiving information or data.

Application 405 may be any application, computer program, firmware or software running on a sender. In a plurality of embodiments, the application 405 is a device, system, unit or a software generating or sending data. Application 405 may comprise a data generator 415 generating interactive data 410 or bulk data 411. In a number of embodiments, application 405 generates interactive data 410 or bulk data 411. In specific embodiments, application 405 or data generator 415 generate a combination of bulk data 411 and interactive data 410. The data may be generated in a continuous stream and may be of any format. Sometimes, the data is generated in discrete steps or in non-continuous way. In some embodiments, data generated by application 405 includes an action, instruction or data from the user. Such actions, instructions or data may comprise a movement of a mouse on a user's computer, a click of a mouse on a computer, an input from a keyboard, a video or audio stream, a computer program or an application, a video game or any kind of software or computer generated data. In some embodiments, application 405 generates a data such as a display of an action or a command of the user such as a letter typed by the user in an application such as a text editor. The application 405 may comprise any type or form of virtualization application, program, software or computer service. In some embodiments, the application 405 comprises a remote display application, a remote access application or a web browser. In a number of embodiments, application 405 is a computer operating system. In one embodiment, the application is, comprises or interfaces with an ICA client, developed by Citrix Systems, Inc. of Fort Lauderdale, Fla. In other embodiments, the application is, comprises or interfaces with a Remote Desktop (RDP) client, developed by Microsoft Corporation of Redmond, Wash. In a plurality of embodiments, application 405 is any type of an editing application, calculating application, storage application, planning application, graphical or a video application, audio application, an instant messenger application or any other type of application which may be run on a client 102, a server 106 or otherwise to produce or generate data.

In some embodiments, the application uses a protocol having multiple channels for communicating bulk and interactive data. A communication channel may be any medium, path or means of communication used for a particular type of transmission or data. In some embodiments, communication channels may be used for transmitting multiple kinds of data. Sometimes, channels are defined by a communication protocol used for communication. In one embodiment, one or more channels are used for communicating interactive data. In some embodiments, one or more channels are used for communicating bulk data. In some embodiments. one or more channels are used for interactive data while one or more other channels are used for bulk data. In yet another embodiments, a single communication channel may be used for communicating bulk data and interactive data. In one embodiment, the channels of communication are established and maintained by a protocol of an ICA client or a Remote Desktop Client protocol.

Data generator 415 may be any application, software, hardware, device or a unit generating or producing data. Though, as illustrated by FIG. 4, data generator 415 may be comprised or controlled by the application 405, data generator 415 may also be a standalone, independent unit operating and producing data. Data generator 415 may comprise any type and form of software, application service, library, database, process, task or set of executable instructions. In a plurality of embodiments, data generator 415 is a component managing data generated by another application or a software. In some embodiments, data generator 415 is a unit or a system processing, preparing, formatting or shaping the data generated by an application for network optimizer. In a number of embodiments, data generator 415 operates as an intermediate step or an interface for the data outputted by the application 405. Data generator 415 may prepare, format or process the data and interface with network optimizer 420. In some embodiments, data generator 415 is a software component managing or transforming the data created by the application 405.

Data generator 415 may generate any type of data, code, instruction or communication. In some embodiments, data generator 415 generates interactive data 410. In some embodiments, data generator 415 generates bulk data 411. Data generator 415 may generate any combination of interactive and bulk data in any format. Data generator 415 may be a component of a software or an application producing data of any kind. Data generator 415 may be a unit producing an output, such as a video or graphical output. Sometimes, data generator may produce an output for a graphical user interface.

Interactive data 410 may be any type of data resulting from interaction between one device and another device. Interactive data 410 may be any kind of real-time data. Interactive data 410 may also be any data that updates on its own schedule, such as stock quotes, manufacturing statistics, web server loads, warehouse activity, traffic and more. Sometimes, interactive data 410 may be any type and form of data resulting from user interaction with a client 102, server 106, intermediary appliance 200 or any other device on a network 104. In some embodiment, interactive data 410 is output from an application, such as display output, for example, display output transmitted via remote display protocol. In some embodiments, interactive data 410 is data resulting from a computer mouse or an input on a computer. In a plurality of embodiments, interactive data 410 is a letter, character or a symbol typed in from the keyboard of a computer. In a number of embodiments, interactive data 410 is a continuously updating data stream from an application 405 or a data generator 415. In a plurality of embodiments, interactive data 410 is related to any data produced by the application, by the user or by the sender. In some embodiments, interactive data 410 is a constantly changing data while in other embodiments 410 interactive data does not have to be constantly changing. In a number of embodiments, interactive data 410 comprises a component of data which is not changing. In some embodiments, interactive data 410 comprises any type of data that may have a varying time of data generated. In a number of embodiments, interactive data 410 is generated within a periodic and predefined generation time which may be constant or may be changing. Interactive data 410 may be any data whose transfer in a remote desktop application from a server to a client is of a higher priority than other type of data whose transfer at a later time will not impact the quality of user experience.

In a plurality of embodiments, interactive data 410 is user input dependent. In certain embodiments, interactive data 410 has a periodic generation time wherein a period of time in which an amount of data is generated varies in duration from another period of time in which another amount of data is generated. In a number of embodiments, interactive data 410 is generated in a continuous or a discrete fashion in which each discrete amount of time within which an amount of data is generated may have a different amount of data generated from another amount of data generated in another discrete amount of time. In some embodiments, interactive data 410 comprises a data stream. In a plurality of embodiments, interactive data 410 comprises a user data or a payload. In a plurality of embodiments, interactive data 410 comprises a frame or a screen shot of an application as displayed on the screen of a computer.

Bulk data 411 may be any type of data having less of a priority to be transferred than interactive data. Bulk data 411 may be any data not being subject to change over a longer period of time than the period of time within which interactive data 410 is going to change. Bulk data 411 may be data comprising information regarding files to be printed. Bulk data 411 may be data comprising a large chunk or a large size of data whose transfer is at a lower priority than the transfer of the interactive data 410. In some embodiments, bulk data 411 comprises an amount of data greater than a predetermined threshold. In many embodiments, bulk data 411 is any type of non real-time data. In some embodiments, bulk data 411 comprises commands, data or instructions for printing a file or a program. In a number of embodiments, bulk data 411 comprises any data including components of data that are unchanging or remaining constant over a relatively short or a relatively long period of time. In some embodiments, bulk data 411 comprises portions of data that are changing or do not remain constant over a relatively short or a relatively long period of time. In a plurality of embodiments, bulk data 411 comprises a file, a video, an audio, an application, or data from a data base. In some embodiments, bulk data 411 comprises elements of a graphical user interface. In a plurality of embodiments, bulk data 411 comprises a user data or a payload.

Network optimizer 420 may be any type of a device, structure or an application which improves, controls, manages or optimizes a flow of data. Network optimizer 420 may be a system or a unit controlling and managing the flow of data transferred between the sender and a receiver. A network optimizer 420 may be any component, unit or a system receiving interactive data 410 and bulk data 411 and controlling the output flow of the interactive data 410 and the bulk data 411 from the sender to the receiver. Network optimizer 420 may be any component, a function or a unit, comprising any hardware, software, circuitry or logic for forming, formatting, managing and controlling the flow of data transmitted by the sender. The network optimizer 420 may be any device, application or a unit distinguishing between bulk data 411 and interactive data 410. Network optimizer 420 may separate or sort the real time data from the interactive data in order to manage or control the transfer of the data. In one embodiment, network optimizer 420 identifies bulk data from the interactive data and formats or sorts the bulk data and interactive data in their respective packets based on their identification. In another embodiment, the network optimizer 420 processes data generated by the application 405 or the data generator 415 in order to control the amount of bulk data 411 and interactive data 410 to be transmitted over the network. Network optimizer 420 may comprise a model used for transmission of the interactive data 410 and bulk data 411 over the network to the receiver. The model may comprise any type of statistics used for anticipating or estimating a more or the most efficient amount of data to be transmitted over the network. In some embodiments, network optimizer 420 comprises a data transfer model which comprises information relating the data congestion and data occupancy on the network. The network optimizer may assist the data transfer manager in selecting an optimal or desired amount of data to be sent over the network and/or timing of the data to be sent over the network. In a number of embodiments, network optimizer reorganizes or reformats data in data packets 480. The network optimizer comprises the network optimization engine or any portion thereof.

Network optimizer 420 may comprise a model for managing or controlling transmission of data to a receiver. The model of the network optimizer 420 may be any model within the network optimizer 420, such as the data transfer model 440. The model of the network optimizer 420 may also be interchangeably referred to as the data transfer model 440 or the sender's model. Network optimizer 420 may utilize one or more models to control various aspects of the data or information transmission control, such as amounts of information to be transmitted, type of information to be transmitted or the timing of the amounts of information to be transmitted. Sometimes, one or more models of the network optimizer 420 utilizes statistics such as bandwidth of the network, congestion of the network or traffic affecting sender or the receiver, backlog of the information, and similar in order to determine the amount of data to be sent to the receiver and the time at which to send the amount of data. The data or information transmitted to the receiver using the model may be referred to as the bulk data 411 and/or interactive data 410.

In many embodiments, the model of the network optimizer 420 is updated by messages from a model of the appliance 200, such as the intermediary model 455. The intermediary model 455 of the appliance 200 may include more updated statistics, metrics or values for determinations of bandwidth between the sender and the receiver, compression ratio of a data compressed, or a backlog value of an amount of data to be transmitted. The intermediary model 455 upon realizing that the more updated determination or estimate of the value of bandwidth is more accurate than the value of bandwidth of the model of the network optimizer 420 of the sender, may send to the sender or to the sender's model the more updated value of bandwidth, the more updated value of compression ratio of transmitted data, or the backlog value. In some embodiments, the intermediary model sends updates of bandwidth values or measurements as changes occur. In other embodiments, the intermediary model sends updates of bandwidth values at a predetermined frequency. In some embodiments, the intermediary model sends updates of bandwidth values responsive to any type and form of event. In one embodiment, the intermediary model sends updates of bandwidth values responsive to a request.

The network optimizer 420 may update the sender's model in response to the received message comprising the updated values of the bandwidth from the intermediary model 455. Such updates may enable the network optimizer 420 to more accurately determine the amount of bulk data 411 and interactive data 410 to be transmitted and the timing of the amount of each type of data to be transmitted. Network optimizer 420 may utilize the data transfer manager 430 to control the amount and type of data or information to be transmitted utilizing the data transfer model 440 to determine the amount and timing of the data to transmit to the receiver via the appliance 200. Network optimizer 420 may utilize statistics or values from the model of the network optimizer 420, or from data transfer model 440, to determine the amount and the timing of transmission for each one of the interactive data 410 and bulk data 411. Network optimizer 420 may then utilize data transfer manager 430 to execute the transmission using the amount and the timing determined by the model, such as the data transfer model 440, or any other model of the network optimizer 420.

Data transfer manager 430 may be any type of device, software, application or a unit for controlling or managing the transfer or transmission of data from the sender to the receiver. Data transfer manager 430 may be a communication device capable of controlling the amount of transmitted information and the timing of the amount of the information transmitted. Data transfer manager 420 may be any device, unit, software or a component of the sender transmitting information using the values and statistics provided by any network optimizer 420 model, such as the data transfer model 440. Data transfer manager may comprise any hardware, software, circuitry, processors, logic and processing circuits, memory, firmware, logical functions or components to enable control and management of the data transmitted. Data transfer manager 430 In some embodiments, a data transfer manager 430 comprises software. The data transfer manager 430 may comprise any components or functionality to manage and maintain the backlog of the information to be transmitted. Data transfer manager 430 may comprise any features or functionality of a network optimizer 420, flow controller 220 or a data transfer model 440. In some embodiments, data transfer manager 430 is combined or fused into a single device, unit, function, software or a component together with the network optimizer 420, flow controller 220 and data transfer model 440. In some embodiments, data transfer manager 430 is a part of the network optimizer 420. In some embodiments, data transfer manager 430 is not comprised by the network optimizer 420, but communicates with it. In some embodiments, data transfer manager 430 is a part of the sender, while in other embodiments data transfer manager 430 is a component separate from the sender.

The network optimizer 420 and data transfer manager 430 may each comprise the functionality to determine when to transmit data, messages or information and determine the amount of data, messages or information to transmit. The network optimizer 420 and transfer manager 430 may control transmission of the information as determined as well as the timing of the transmission. The data transfer manager 430 may prioritize the order, timing and size of data to transmit. The data transfer manager 430 may distinguish between bulk and interactive data and manage transmission according to the amount of each. Sometimes, network optimizer 420 or the data transfer manager 430 utilize bandwidth estimation from the bandwidth monitor 720 to determine the amount of data to be transmitted. Sometimes, network optimizer 420 and data transfer manager 430 utilize compression statistics from the compression engine 238 or the backlog value from the appliance 200, or the intermediary, to determine the amount of data to transmit and the timing to transmit the data. The backlog of the intermediary 200 may be made up of the data previously transmitted by the sender but not yet forwarded to the receiver for whatever reason.

Data transfer manager 430 may utilize any statistics or metrics from any source to execute transmission of the data. In some embodiments, data transfer manager 430 may use statistics or metrics, such as the bandwidth information from a bandwidth monitoring component, internal or external to the sender, in order to manage the transmission of the data. In some embodiments, a data transfer manager 430 determines a next amount of the data to be sent based on the value of bandwidth known to the data transfer manager 430. In certain embodiments, a data transfer manager 430 determines a timing of the next amount of data to be sent based on the value of bandwidth known to the data transfer manager 430. In a plurality of embodiments, a data transfer manager 430 determines a next amount of the data to be sent or the timing of the next amount of data to be sent based on the compression ratio of a data compressed used by appliance 200. In certain embodiments, a data transfer manager 430 determines a next amount of the data to be sent or the timing of the next amount of data to be sent based on backlog information of the data to be transferred backlogged in a queue or stored in a memory before transmitted to the receiver. Backlog information may include any type of information, bulk or interactive data 411 and 410, metrics or statistics on any data queued to be transmitted or the updated values or messages to be transmitted between the sender's models, such as the data transfer model 440 and the receiver's models, such as the intermediary model 455 of the appliance 200 or a model of the receiver receiving the data from the appliance 200.

Data transfer manager 430 may determine any of: the timing or the amount of interactive data 410 to be transmitted, the timing or the amount of bulk data 411 to be transmitted, the amount of data as well as the specific portion of data to be sent during the next scheduled data transmitting event or the specific data from the determined amount to be sent during the next scheduled data transmitting event. In certain embodiments, the data transfer manager 430 makes determinations based on a compression ratio value of a compression ratio of a data compressed by an intermediary or an appliance 200, a backlog value of an amount of data to be sent from the appliance 200 to the receiver, or a bandwidth value expressing the available bandwidth of the network 104.

Data transfer model 440 may be any component or a unit used to store, represent or maintain a model to determine the amount of data to be transmitted and the timing of the data to be transmitted. Data transfer model 440 may be also referred to as the model of the network optimizer 420 described above. Network transfer model 420 may comprise a number of models and each of the models may comprise each and every functionality of the data transfer model 440 and any model of network optimizer 420 described above. Data transfer model 440 may comprise a software, an algorithm, an application, a logic unit, a memory, a processor, a hardware or any other component enabling the data transfer model 440 to maintain or update the values, metrics or statistics used to determine the amount and timing of the transmissions by the sender. The values, metrics or statistics may be values such as the bandwidth of the network, the compression ratio of a data compressed by either the sender or the appliance 200, the backlog value of an amount data backlogged for transmission either by the sender or by the appliance 200, the bandwidth between the sender and the appliance 200, the bandwidth between the appliance 200 and the receiver, the bandwidth between the sender and the receiver via the appliance 200, and more.

Data transfer model 440 may also receive from either the appliance 200 or the receiver the message which may comprise updated values of any of the bandwidth, compression ratios or backlog values. Data transfer model 440 may update the values, metrics or the statistics with the new received values from the received message. Data transfer model 440 may transmit messages back and forth with the model of the appliance or the receiver, such as the intermediary model 455 for example, in order to exchange the latest values, metrics and statistics and update the sender's model, such as the data transfer model 440. The model of the appliance 200, the intermediary model 455, being more likely to have more updated and more correct values, may provide the data transfer model 440 the latest values and statistics enabling the network optimizer 420 or the data transfer manager 430 to more accurately control the transmission of the data or information from the sender. Messages comprising the updated values used by the models may be transmitted between the sender and the receiver or between the sender and the intermediary, also referred to as the appliance 200, via data packets 480 and compressed data packets 495. In some embodiments, the messages may be transmitted together with interactive data 410 and bulk data 411. Sometimes, the messages may be transmitted individually and separately from the data or other information transmitted between the sender and the receiver.

Data transfer model 440 may monitor, estimate and/or predict any of the statistics affecting the transmission of the information or data between the sender and the receiver. In some embodiments, data transfer model 440 may monitor, estimate or predict the congestion of the network 104, bandwidth utilization or available bandwidth of the network 104. The data transform model 440 may include any type and form of model representation, such as data, data structures and/or executable instructions. Data transfer model 440 may store the latest statistics and information used to determine the optimal amount of data or information to be transmitted and optimal timing to transmit the amount in order to fully utilize available resources and not create any additional delays by sending too much data too quickly. Data transfer model 440 may comprise algorithms to determine the amount of interactive data 411 and bulk data 410 to be transmitted and at what time based on the latest updated information, values or statistics, as updated by messages received from the model of the receiver. The receiver, transmitting the messages comprising the updated values or statistics, may be the receiver receiving the interactive and bulk data 410 and 411. The receiver may also be the appliance 200, also referred to as the intermediary, traversing the data transmitted between the sender and the receiver. The appliance 200 may comprise the receiver's model and collect the statistics, such as the bandwidth, compression ratio of a data compressed or the backlog value to update the data transfer model 440. In some embodiments, data transfer model 440 receives messages with updated values or statistics from the model from the appliance 200 traversing the information transmitted and from the receiver receiving the information transmitted. The data transfer model 440 may utilize messages from both, the model of the appliance 200 and the model of the receiver, to update the values, metrics and statistics of the data transfer model 440 with the latest values, metrics or statistics.

For example, in a system depicted by FIG. 4, a sender may transmit via the appliance 200 to the receiver data which comprises interactive data 410 and bulk data 411. The network 104, or a connection between the sender and the receiver, may support an optimal amount of transmission which would utilize the available resources of the network to the maximum but not created additional delays and backlog. The network optimizer 420 and the data transfer model 440 may estimate the optimal amount of transmission based on the data transfer model 440, which may also be referred to as the model of the network optimizer 420. The data transfer model 440 may determine the optimal amount of data to be transmitted and the optimal timing for transmitting the optimal amount of data. The data transfer model 440 determines the optimal amount and the optimal timing based on the latest values, metrics and statistics. The values, metrics and statistics used for determining may be any information relating the status of the resources on the network, such as: the bandwidth of the connection between the sender and the receiver, bandwidth between the sender and the appliance 200, bandwidth between the appliance 200 and the receiver, mean bandwidth value between the sender and the receiver, standard deviation of the bandwidth between any two of the sender, appliance 200 and the receiver, compression ratio of data compressed by the appliance 200, the backlog value of an amount of data to be transmitted as stored in the queue of the appliance 200 and the backlog value of the data to be sent by the sender. The values, metrics and statistics of the data transfer model 440 may change with time and thus may become outdated, resulting in the amount of data to be transmitted and the timing as determined by the model to be not optimal.

In order to compensate for the outdated values, metrics and statistics, the intermediary model 455 of the appliance 200 may transmit to the data transfer model 440 the latest and the most up to date values, metrics and the statistics via one or more messages from either the receiver, the appliance 200, or both. The data transfer model 440 updates the values, metrics and statistics based on the values, metrics and statistics transmitted within any number of messages. The messages transmitted between the models may include any information relating the state of data or state of resources of the network. The data transfer model 440 may receive the message with updated metrics, values and statistics and metrics and may determine the new amount of data to be transmitted and the new timing of the new amount of data to be transmitted. The new amount and the new timing are determined using the latest metrics, values and statistics and are therefore optimal or closer to being optimal since the information used for determination are more up to date. Data transfer manager 430, may receive the new amount and the new timing and may transmit, via the appliance 200 to the receiver, a new amount of data 410 or 411 as determined by the new amount and at the time determined by the new timing. The transmission may thus be optimal until the situation of the network or network resources changes again. The appliance 200 and the receiver may keep monitoring the network and keep updating their models as necessary in order to update the data transfer model 440 for the future transmissions.

Sometimes, the data transfer model 440 may be used to calculate the amount of data to be sent over the network and the timing of amount of data to be transferred. Data transfer model 440 may also be used to determine which portions of the amount to be transferred will be made up of interactive data 410 or bulk data 411. In some embodiments, the data transfer model determines which data to be transmitted based on the backlog of the data in the queue of the appliance 200 waiting to be transmitted from the appliance 200 to the receiver.

FIG. 4 also illustrates communication of data packets 480 between the sender and a receiver, such as the appliance 200. The data packets are labeled 480A-N where N may stand for any number or symbol. Data packets may be any chunks, groups or amounts of data or information organized using any format utilized by the system. In some embodiments, data packets 480 are sequences of bytes comprising a header and a body. In a plurality of embodiments, data packets 480 comprise an identifier uniquely identifying each data packet from any other data packet communicated via the system. In a plurality of embodiments, data packets 480 are used as a part of a TCP communication. In some embodiments, data packets are compressed data packers, payloads or groups of information. In certain embodiments, data packets 480 may comprise packets and/or payloads of same size. In a plurality of embodiments, a data packet 480A may have a different size than another data packet 480B. In some embodiments, a data packet 480 comprises an instruction. In a plurality of embodiments, a data packet 480 comprises an information, a value or a data. In some embodiments, a data packet 480 comprises a command. In a number of embodiments, a data packet 480 comprises a user data or a payload. In some embodiments, a data packet 480 comprises an error detection code or an error detection mechanism. In a plurality of embodiments, a data packet 480 is a formatted group of information communicated via a TCP/IP network communication or any other network communication protocol.

FIG. 4 also illustrates appliance 200, already introduced earlier, and shown communicating with the sender and another appliance 200, client 102, or server 106 (e.g., receivers) which receive the transmission from the sender. In some embodiments, appliance 200 comprises any number of subcomponents introduced earlier, such as the packet processing engine 240, the flow controller 220 and the compression engine 238. FIG. 4 illustrates a number of embodiments wherein the appliance 200 comprises the intermediary model 455 and the bandwidth measurer 450. In some embodiments, the network system depicted by FIG. 4 may be such that the speed of the network transmissions between the sender and the appliance 200 is substantially faster than the speed of the network transmissions between the appliance 200 and the receiver, wherein the receiver may be another appliance 200, a client 102 or a server 106.

Compression engine 238, in addition to aforementioned features and embodiments, may also comprise other features or embodiments such as the means to perform high performance network compression. In some embodiments, compression engine 238 compresses data using a compression method utilizing a plurality of compressed data packets wherein one compressed data packet of the plurality of compressed data packets has a compression ratio different than another compressed data packet of the plurality of data packets. In a number of embodiments, a compression engine 238 stores a compression ratio of each individual compressed packet of a plurality of packets. In some embodiments, the stored compression ratio information of each individual compressed data packet is sent to the sender or the data transfer model 440. In some embodiments, the compression engine shares information or instructions with other units or components in the system such as the system illustrated in FIG. 4 to improve the throughput of the information or the efficiency of the transmissions. In certain embodiments, the compression engine 238 is sharing information and communicating with the sender or some subcomponents or subsystems of the sender.

The intermediary model 455 may be any device, software, algorithm or application used to model network activity, bandwidth utilization, transmission rates and compression rates related to the intermediary. In one embodiment, the intermediary model may predict an optimal or desired amount of data to be sent over the network and the timing of the data to be sent based on a number of values used for monitoring the state of the network. The intermediary model 455 may include any type and form of model representation, such as data, data structures and/or executable instructions. In a number of embodiments, intermediary model 455 is an independent device sharing information with appliance 200. In a plurality of embodiments, intermediary model 455 is a software application. In certain embodiments, intermediary model 455 is an appliance. In a plurality of embodiments, intermediary model 455 is a part of the compression engine 238, and in some other embodiments the intermediary model 455 comprises the compression engine 238. In some embodiments, intermediary model 455 is a part of the flow controller, and in some other embodiments the intermediary model 455 comprises the flow controller.

In some embodiments, intermediary model 455 comprises functions, operations or logic to model the transmission rates, compression rates and bandwidth utilization of one or more intermediaries. In one embodiment, intermediary model 455 is an algorithm using a statistical approach and a set of most recently updated values to predict a maximum or otherwise predetermined amount of data that can be transmitted over the network without creating additional transmission delays. In some embodiments, intermediary model 455 determines the amount of data to be transmitted over the network 104, such as via the intermediary, and the timing of the data to be transmitted based on the most recently updated bandwidth value. In a plurality of embodiments, intermediary model 455 determines the amount of data to be transmitted over the network 104 and the timing of the data to be transmitted based on: the most recently updated compression ratio value of a compressed data packet 495, compression ratio values of a plurality of compressed data packets 495 or a difference between the compression ratio values of two or more compressed data packets 495. In some embodiments, intermediary model 455 determines the amount of data to be transmitted over the network 104 and the timing of the data to be transmitted based on the most recently updated backlog value.

Bandwidth measurer 450 may be any bandwidth measuring device, function, operation or logic for determining bandwidth between two entities, such as the appliance 200 and a receiver. In some embodiments, bandwidth measurer 450 performs any type and form of ping command. In some embodiments, bandwidth measurer 450 determines an availability, idleness, throughput or utilization of network bandwidth. In another embodiment, bandwidth measurer 450 determines any type of round-trip time between two entities. The bandwidth measurer 450 may use any type and form of round-trip time computation or calculation to measure bandwidth. For example, the measurer 450 may use the following type of bandwidth measurement:

Bandwidth=Factor*MTU/(Round Trip Times*sqrt (Packet Loss)), where the factor may be for example 1.3

As illustrated by the above equation, bandwidth may be determined based on packet loss, round trip times and/or packet size adjusted by a predetermined factor. Although a measurement of bandwidth using the above equation is described, other derivatives of this request using any combination of factors, maximum transmission unit (MTU), round trip times and packet loss may be used.

In some embodiments, the bandwidth measurer 450 determines a number of bytes transferred between two entities, such as client and intermediary, intermediary and server or client and server. The bandwidth measurer 450 determines the number of transferred bytes over a time period, such as every second or bytes transferred per second. In one embodiment, the bandwidth measurer 450 determines an average number of bytes transferred per the time period, such as per second. In some embodiments, the bandwidth measurer 450 measures the number of bytes transmitted by the intermediary. In other embodiments, the bandwidth measurer 450 measures the number of bytes received by the intermediary. In one embodiment, the bandwidth measurer 450 measures the number of bytes received and transmitted by the intermediary. In yet another embodiment, the bandwidth measurer 450 measures the number of bytes transmitted by the one or more servers. In other embodiments, the bandwidth measurer 450 measures the number of bytes transmitted by one or more clients 102. In other embodiments, the bandwidth measurer 450 measures bandwidth based on the number of packets on a queue waiting to be transmitted. In some embodiments, the bandwidth measurer 450 determines bandwidth usage via the transition of a queue of network packets from empty to non-empty and vice-versa.

In a number of embodiments, bandwidth measurer 450 measures bandwidth by a method of bandwidth measurement including the step of transmitting, from a sender or a receiver, a pair of uniquely marked data packets 480 or compressed data packets 495 over the network along with values indicating the time the time of the transmission of each uniquely marked data packet 480 or compressed data packet 495. The method of bandwidth measurement also may comprise the step of receiving the pair of uniquely marked data packets 480 or compressed data packets 495, transmitted by the sender or the receiver, and marking the values comprising the timing of arrival of each data packet 480 or compressed data packet 495 as received by the receiver or the sender. In some embodiments, the bandwidth measurement method also uses the marked values indicating the time of the transmission and the values comprising the timing of arrival to establish the bandwidth of the network. In a number of embodiments, the method of bandwidth measurement also subtracts the difference between the timing of arrival of each uniquely marked data packets 480 or compressed data packets 495 sent using the timing difference between each of the uniquely marked data packet or compressed data packets received. In a plurality of embodiments, uniquely marked data packets 480 are compressed.

In a number of embodiments, a bandwidth measurer 450 comprises an appliance. In certain embodiments, a bandwidth measurer 450 is a part of the compression engine 238. In a plurality of embodiments, a bandwidth measurer 450 is be a part of the flow controller 220. In some embodiments, a bandwidth measurer 450 is a unit or a device independent from the network optimization engine 250, while in some embodiments the bandwidth measurer 450 is a part of the network optimization engine 250. In a plurality of embodiments, a bandwidth measurer 450 is a unit or a device independent from the appliance 200. In specific embodiments, bandwidth measurer 450 communicates the latest or the most recently updated bandwidth value to the intermediary model 450. In some embodiments, bandwidth measurer 450 communicates the latest or the most recently updated value of the bandwidth to the sender, the 420 network optimization engine or 440 data transfer model. In a number of embodiments, a bandwidth measurer 450 uses a plurality of bandwidth determinations to come up with a bandwidth value which will be used by the intermediary model 455.

Compressed data packets 495 may be any type and form of compressed or reformatted groups of data comprising a portion of, one of, or a plurality of 480 data packets. Compressed data packets 495 comprise any number of one or more data packets 480. Each of the one or more compressed data packets may be compressed using the same compression scheme or different compression scheme. Each of the one or more compressed data packets may be compressed in a manner resulting in the same compression ratio or different compression ratios. In some embodiments, a first compressed data packet 495 out of a plurality of compressed data packets 495 comprises a number of data packets 480 different than a number of data packets 480 comprised by a second compressed data packet 495 of a plurality of compressed data packets 495. In some embodiments, a first compressed data packet 495 out of a plurality of compressed data packets 495 comprises a substantially similar number of data packets 480 in comparison to a number of data packets 480 comprised by a second compressed data packet 495 of a plurality of compressed data packets 495. In some embodiments, a first compressed data packet 495 out of a plurality of compressed data packets 495 comprises a compression ratio that is different than a compression ratio comprised by a second compressed data packet 495 of a plurality of compressed data packets 495. In a number of embodiments, a first compressed data packet 495 out of a plurality of compressed data packets 495 comprises a compression ratio that is substantially similar to a compression ratio comprised by a second compressed data packet 495 of a plurality of compressed data packets 495.

The receiver is illustrated on the right side of the FIG. 4. The receiver may be any device, an appliance or any system capable of receiving information. In some embodiments the receiver is an appliance 200. In a number of embodiments, the receiver is a client 102. In a plurality of embodiments, the receiver is a server 106. In a number of embodiments, the receiver may be any combination of the appliance 200, server 106 or the client 102. The receiver may comprise any and all of features and embodiments of a server 106, a client 102 and an appliance 200.

Any embodiment of any feature illustrated in FIG. 4 or in the description relating to FIG. 4 may be combined with any other embodiment of any other feature illustrated elsewhere in FIG. 4 or in the description relating to FIG. 4 or in any other illustration in the present disclosure or in any portion of the text of the present disclosure.

Figure 5:
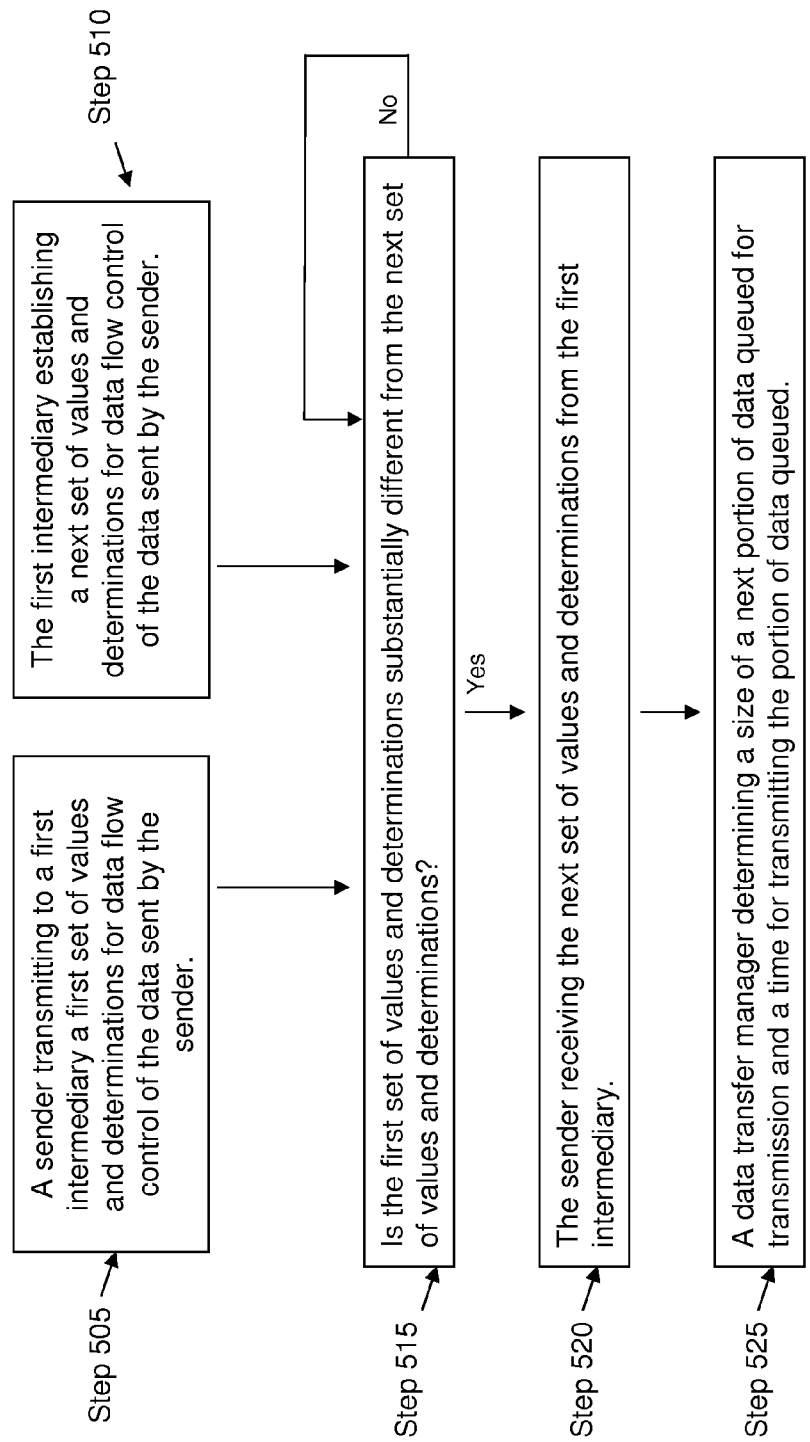
FIG. 5 is a flow diagram illustrating some embodiments of a method for a flow control of a data stream communicated via a network between a client and a server.

Referring now to FIG. 5, an embodiment of steps of a method 500 for implementing an efficient data flow control by an intermediary model 455 are illustrated. The steps of the method 500 may be implemented in any order despite how they are ordered in the illustration. In some embodiments, some steps of the method 500 are combined with other steps or may even be omitted from the method. Furthermore, the decision steps are also presented by the illustration as a part of the method. The steps are performed by the system such as the one introduced by FIG. 4, tailored to the control of the amount of data to transmit by the sender. A number of embodiments in the method utilize recently updated information to make a determination of the amount of the data to be transmitted and the timing of transmission. In some embodiments, the method utilizes not recently updated information to make a determination of the amount of the data to be transmitted and the timing of the transmission.

In brief overview, at step 505 of method 500, a sender transmits to a first intermediary a first set of values and determinations for data flow control of the data sent by the sender. At step 510, the first intermediary establishes a next set of values and determinations for data flow control of the data sent by the sender. At step 515, the sender determines if the first set of values and determinations substantially different from the next set of values and determinations. At step 520, the sender receives the next set of values and determinations from the first intermediary. At step 525, a data transfer manager determines a size of a next portion of data queued for transmission and a time for transmitting the portion of data queued.

In further details, step 505 involves a sender transmitting to a first intermediary a first set of values and determinations for data flow control of the data sent by the sender. In some embodiments, the sender in step 505 is the sender described in FIG. 4. The first intermediary described in step 505 may be any device, system, structure or an appliance intercepting the data transmitted by the sender to the receiver and performing an operation on the data transmitted, changing the data transmitted, or affecting the flow of the data transmitted. In some embodiments, the first intermediary may be any system, device or a structure intercepting data between a sender transmitting data and a receiver receiving the transmitted data. In some embodiments, a first intermediary is an appliance 200 or appliance 200'.

A first set of values and determinations described in step 505 may comprise any number of values, constants, functions or data structures comprising information which may be relevant to the state of the network or the available resources of the network over which the data is communicated. The first set of values and determinations may include the model-state message of the sender. These first set of models may be established or determined via any of the models described herein. In some embodiments, a first set of values and determinations comprise a value of a bandwidth between two appliances on a network. In a number of embodiments, a first set of values and determinations comprise a value relating a bandwidth determination of a bandwidth of the network or of the portion of a network over which the data is communicated. In some embodiments, a first set of values and determinations comprise a value relating to a compression of the data being communicated. In a plurality of embodiments, a first set of values and determinations comprise a value relating to a compression ratio of the data being transmitted or communicated. In a number of embodiments, a first set of values and determinations comprise a value relating to a backlog of the data transmitted on the network. In some embodiments, a first set of values and determinations comprise a value relating to specific time when a next amount of data should be transmitted. In a number of embodiments, a first set of values and determinations comprise a value in the form of an integer. In a plurality of embodiments, a first set of values and determinations comprise a value in the form of a float, a character or a symbol. In certain embodiments, a first set of values and determinations comprise an array of values. In some embodiments, a first set of values and determinations comprise a data structure comprising a variety of values or arrays comprising values. In a number of embodiments, a first set of values and determinations comprise a value relating to a specific amount of data to be transmitted by the sender or by the first intermediary, an appliance 200, a client 102 or a server 106. In some embodiments, a first set of values and determinations comprise a value relating to an amount of time a next transmission by a sender, a client 102 or a server 106 should be delay by. In certain embodiments, a first set of values and determinations is related to a level of traffic of a network or a congestion of a network over which the data is transmitted.

At step 510, the first intermediary establishes a next set of values and determinations for data flow control of the data sent by the sender. The next set of values and determinations may include the model-state-update message of the intermediary appliance, or the compressor of the intermediary appliance. This may be performed via any of the models described herein. In some embodiments, the first intermediary may be the first intermediary indicated from step 505. In some embodiments, the first intermediary may be a different first intermediary having the same features and embodiments as the first intermediary in step 505. In a plurality of embodiments, a next set of values and determinations is the first set of values and determinations as described above. In a number of embodiments, a next set of values and determinations comprise any and all embodiments of the first set of values and determinations described above. In some embodiments, a next set of values and determinations comprise any and all of features, descriptions, forms as described in the embodiments of the first set of values and determinations. In a plurality of embodiments, a next set of values and determinations is substantially similar in structure and form of the information comprised to the first set of values and determinations. In a plurality of embodiments, a next set of values and determinations is substantially different in structure and form of the information comprised to the first set of values and determinations. In some embodiments, the values and determinations comprised in the first set of values and determinations have a format similar to the one used in the next set of values and determinations. In some embodiments, step 510 may occur in response to another step in the method 500. In some embodiments, step 510 may occur independently of any other step in the method 500.

At step 515, a decision is made to determine whether or not the first set of values and determinations is substantially different from the next set of values and determinations. This may be performed via any of the models described herein. In a number of embodiments, step 515 is completed by the sender. In some embodiments, step 515 is completed by an appliance 200 or a first intermediary. In some embodiments, "substantially different" in step 515 indicates anything other than identical from the value used to be compared to. In a plurality of embodiments, "substantially different" in step 515 indicates different by more than a predetermined threshold value from the value being compared to. In a number of embodiments, "substantially different" in step 515 indicates different as determined by an algorithm or a function from the value being compared to. In some embodiments, "substantially different" in step 515 indicates different more than a predetermined percentage from the value being compared to, or more than a specific percentage from the average value being compared to.

In a number of embodiments, a predetermined function, application, or a value may be established or utilized to help determine what a substantial difference between two values compared is. This may be performed via any of the models described herein. In some embodiments, any difference between a first value of a first set of values and determinations and a next value, indicating or relating to a same parameter or feature as the first value of a next set of values and determinations results in the first set of values and determinations and the next set of values and determinations being substantially different. In a plurality of embodiments, a difference of more than a predetermined value, a predetermined difference in percentage or a predetermined ratio between a first value of a first set of values and determinations and a next value, indicating or relating to a same parameter or feature as the first value of a next set of values and determinations results in the first set of values and determinations and the next set of values and determinations being substantially different. In some embodiments, step 515 occurs in response to another step in the method 500. In a number of embodiments, step 515 occurs in response to either step 505 or step 510, or both step 505 and step 510. In some embodiments, step 515 occurs independently of any other step in the method 500.

At step 520, the sender receives the next set of values. This may be performed using any of the models described herein and sending and/or receiving any type and form of messages. In some embodiment, if the result of the step 515 is that the first set of values and determinations and the next set of values and determinations are substantially different, the sender receives the next set of values and determinations from the first intermediary. In some embodiments the sender receives the next set of values and determinations from the first intermediary on a regular periodic basis that may be independent from any other step in the method. In some embodiments, step 520 may occur in response to the step 515, step 505 or step 510, or in response to a combination of any two or all three of steps 505, 510 and 515. In some embodiments, step 520 may occur independently of any other step in the method 500.

At step 525, a data transfer manager determines a size of a next portion of data queued for transmission and a time for transmitting the portion of data queued. In some embodiments, the data transfer manager of step 525 is a data transfer manager 430. In certain embodiments, a data transfer manager in step 525 may indicate a data transfer manager in any of the components discussed in FIG. 4. In a number of embodiments, the size of a next portion of data queued for transmission and the time for transmitting the portion of data queued relates to the interactive data 410. In a plurality of embodiments, the size of a next portion of data queued for transmission and the time for transmitting the portion of data queued relates to the bulk data 411. In some embodiments, the size of a next portion of data queued for transmission and the time for transmitting the portion of data queued relates to a combination of the interactive data 410 and the bulk data 411. In certain embodiments, the size of a next portion of data queued for transmission and the time for transmitting the portion of data queued relates to the data sent by a sender, a client 102 or a server 106 to a first intermediary or an appliance 200. In plurality of embodiments, the size of a next portion of data queued for transmission and the time for transmitting the portion of data queued relates to the data sent by a sender, a client 102 or a server 106 to a receiver, a client 102 or a server 106.

It should be expressly understood that any embodiment or a feature illustrated in any figures or in the text relating to any figures may be combined with any other embodiment or any other feature illustrated elsewhere in other figures or other portions of the text.

Figure 6:
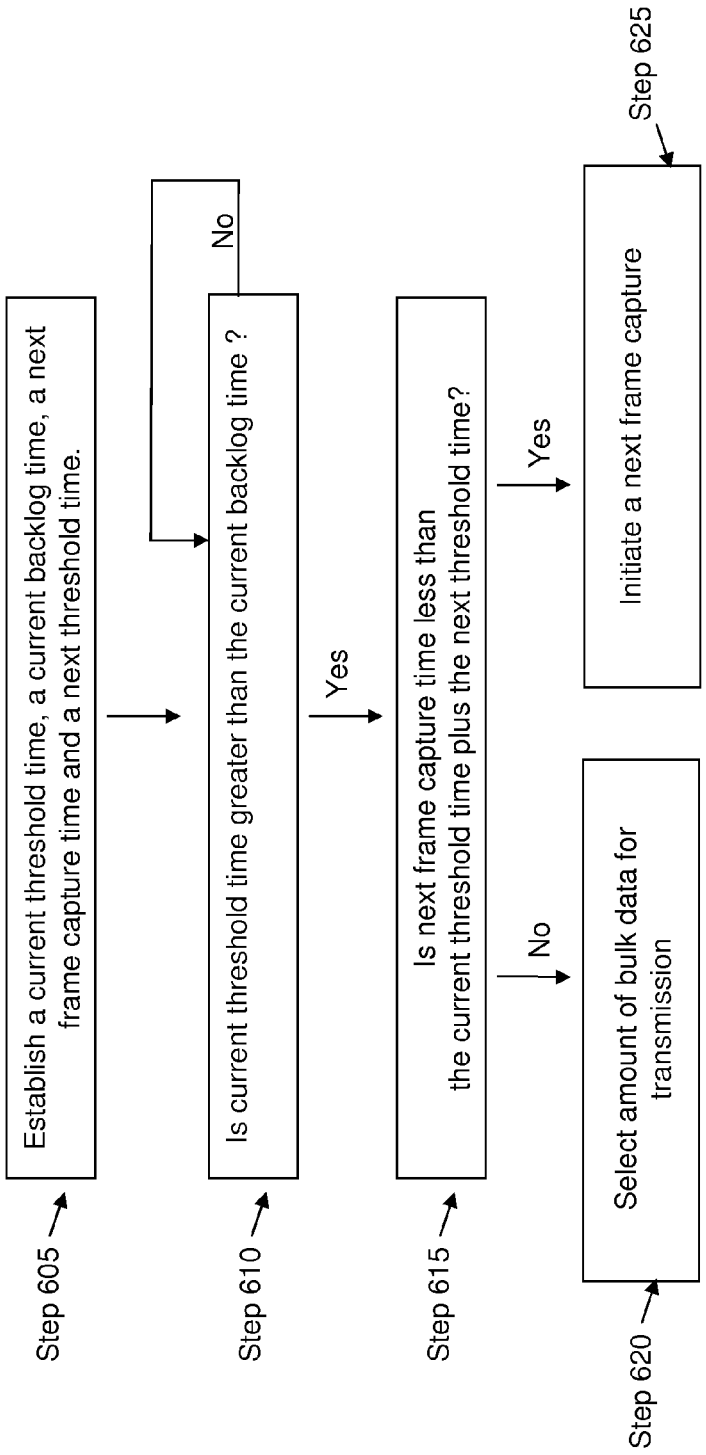
FIG. 6 is a flow diagram illustrating some embodiments of a client or a server side method for a flow control of a data stream communicated via a network between a client and a server.

Referring now to FIG. 6, a number of embodiments of a method 600 for an efficient data flow control by the network optimizer or data flow manager are illustrated. The steps of the method 600 may be implemented in any order. In some embodiments, some steps of the method 600 are combined with other steps or may even be omitted from the method. Furthermore, the decision steps made by the method are also illustrated in FIG. 6. The steps may be performed by the components of a system such as the system presented in FIG. 4, tailored to the control of the amount of data to transmit by the sender. FIG. 6 illustrates a number of embodiments wherein the method utilizes available updated information to make determination of the amount of the data to be transmitted by the sender and the timing to transmit the data.

In brief overview, at step 605 of method 600, establishing by the network optimizer and/or data transfer manager a current threshold time, a current backlog time, a next frame capture time and a next threshold time. In a plurality of embodiments, the current threshold time, the current backlog time, the next frame capture time and the next threshold time are used for controlling the flow of data. Sometimes the current threshold time, the current backlog time, the next frame capture time and the next threshold time are referred to as method 600 values. The method 600 values may be of any format or type. In some embodiments, the method 600 values are integer values. In some embodiments, the method 600 values are character values, float values or long character values. In a number of embodiments, the method 600 values are arrays comprising any number of values of any type. In some embodiments, the method 600 values comprise a data structure comprising any type of values or arrays. In a plurality of embodiments, the method 600 values are functions with respect to time or to an event. In a number of embodiments, the method 600 values may be received from another component such as an appliance 200, a client 102, server 106, or any other unit or a system. In some embodiments, the method 600 values may be the first set of values and determinations from method 500 or the next set of values and determinations from the method 500. In certain embodiments, the method 600 values may comprise any and all embodiments or features from the first set of values and determinations from method 500 or the next set of values and determinations from the method 500.

Step 610 describes a decision making process wherein the system answers the question whether the current threshold time is greater than the current backlog time. In some embodiment, the current threshold time value is compared to the current backlog time value using a logic unit such as a logic comparator. In a number of embodiments, the current threshold time value is compared to the current backlog time using a microprocessor or a central processing unit. In a plurality of embodiments, step 610 is performed by a network optimizer 420, a data transfer manager 430 or a data transfer model 440. In a number of embodiments, step 610 is completed by the sender. In some embodiments, step 610 is performed by an appliance 200 or a first intermediary. In some embodiments, the comparison in step 610 involves a tolerable range wherein no action may be taken if the two values are different within the tolerable range. In a number of embodiments, the tolerable range is a value or a function of a ratio or a percentage. In some embodiments, if the result of step 610 is that the current threshold time is not greater than the current backlog time no action is taken. In a number of embodiments, if the result of step 610 is that the current threshold time is not greater than the current backlog time a step 615 is triggered. In some embodiments, if the result of step 610 is that the current threshold time is greater than the current backlog time no action is taken. In a number of embodiments, if the result of step 610 is that the current threshold time is greater than the current backlog time a step 615 is triggered. In some embodiments, step 610 occurs in response to another step in the method 600. In a number of embodiments, step 610 occurs independently of any other step in the method 600.

Step 615 describes a decision making process wherein the system answers the question whether the next frame capture time is less than the current threshold time plus the next threshold time. In some embodiments, the current threshold time and the next threshold time are added before being compared to the next frame capture time. In some embodiments, the current threshold time and the next threshold time are not added before being compared to the next frame capture time. In some embodiments, the comparison in step 615 involves a tolerable range wherein no action may be taken if the two values are different within the tolerable range. In a number of embodiments, the tolerable range is a value or a function of a ratio or a percentage. In some embodiments, if the result of step 615 states that the next frame capture time is less than the current threshold time plus the next threshold time step 620 is triggered. In a number of embodiments, if the result of step 615 states that the next frame capture time is less than the current threshold time plus the next threshold time step 625 is triggered. In a plurality of embodiments, if the result of step 615 states that the next frame capture time is equal to or greater than the current threshold time plus the next threshold time step 620 is triggered. In some embodiments, if the result of step 615 states that the next frame capture time is equal to or greater then than the current threshold time plus the next threshold time step 625 is triggered. In some embodiments, step 615 occurs in response to another step in the method 600. In a number of embodiments, step 615 occurs independently of any other step in the method 600.

Step 620 describes selecting an amount of bulk data 411 for transmission. In some embodiments, a sender may complete step 620. In a number of embodiments, step 620 is completed by a network optimizer 420 or a data transfer model 430. In a plurality of embodiments, an amount of data is determined by a network optimizer 420, a data transfer manager 430 or a data transfer model 440. Amount of bulk data 411 may be any amount of data expressed in bytes or any other units. In some embodiments, an amount of bulk data 411 includes a whole instruction or a task. In a number of embodiments, an amount of bulk data 411 includes printing instructions or a file to be printed. In a plurality of embodiments, an amount of bulk data 411 comprises a graphical representation of a feature or a shot of a computer screen. In some embodiments, an amount of bulk data 411 comprises a data file, data values, instructions, commands, pictures, videos or audio files, or any other information.

Step 625 recites initiate a next frame capture. In some embodiments, a sender completes the step 625. In a number of embodiments, step 625 is completed by a network optimizer 420 or a data transfer model 430. In a plurality of embodiments, a next frame capture is initiated by a network optimizer 420 or a data transfer manager 430. A next frame capture may comprise any amount of interactive data 410 or bulk data 411. In some embodiments, a next frame capture comprises any amount of interactive data 411 determined by system. In a plurality of embodiments, a next frame capture comprises a predetermined set of data planned for transmission on the next available opportunity.

Any of the embodiments of methods depicted in FIGS. 5 and 6 may have any of the steps performed via sending of message and updated values between models.

E. Allocation of Bandwidth

Figure 7:
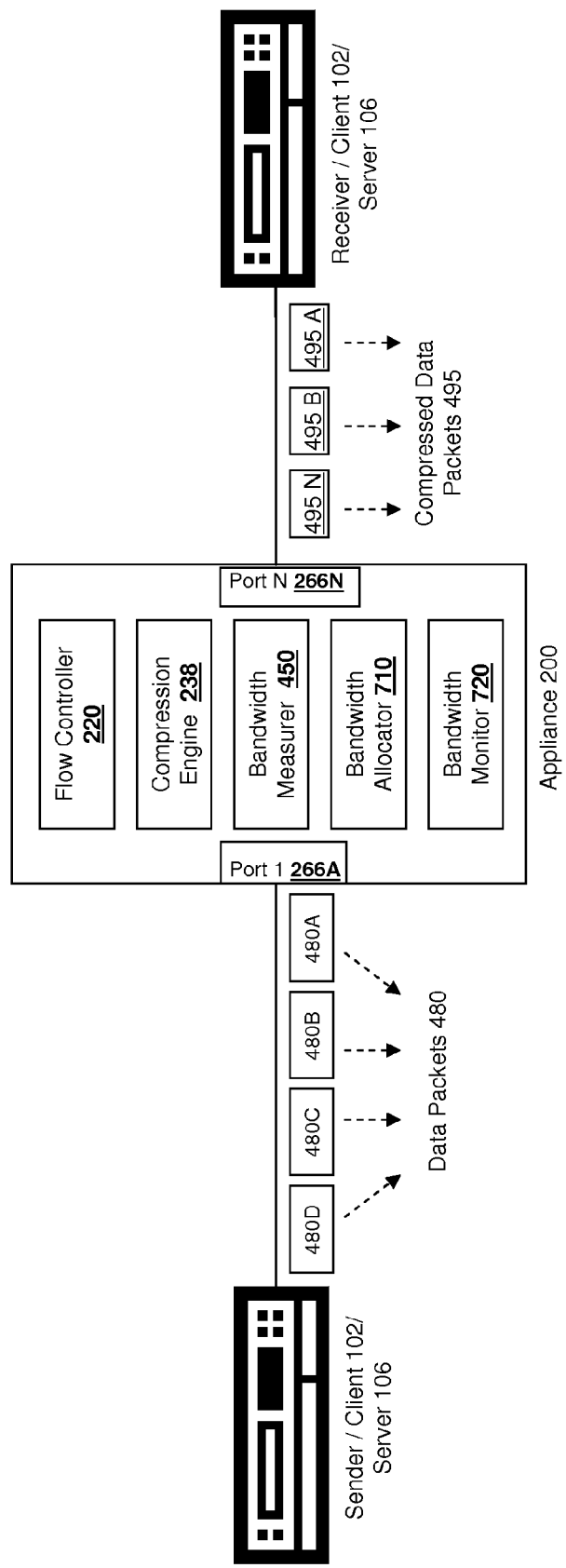
FIG. 7 is a is a block diagram illustrating some embodiments of bandwidth allocation relating to a communication between a sender and a receiver.

Referring now to FIG. 7, a block diagram is illustrated showing embodiments of a system for allocation of bandwidth credit by an intermediary 200. The illustration shows data transmitted from a sender to a receiver, via an intermediary 200, which may also be referred to as an appliance 200. The sender and the receiver may either be a client 102 or a server 106. The intermediary 200 intercepts the data between the sender and the receiver, the data being presented by data packets 480 and compressed data packets 495. The intermediary 200 may compress data packets 480 sent by the sender into compressed data packets 495 transmitted to the receiver using any compression methods or any compression ratios. FIG. 7 illustrates embodiments utilizing only one appliance 200 deployed between the sender and the receiver although in many applications, there may be a plurality of appliances 200 deployed between the sender and the receiver.

In a brief overview, FIG. 7 illustrates a sender sending data to a receiver via an intermediary 200. In some embodiments, data transmitted by the sender may be organized into the data packets 480. In some embodiments, the data transmitted by the sender may comprise data packets 480 along with other additional data formed or organized in ways other than data packets 480. In many embodiments, data packets 480 may define any data transmitted by the sender. The data packets 480 may be received by the intermediary 200. In addition to the aforementioned flow controller 220, compression engine 238 and bandwidth measurer 450, the appliance 200 may further comprise a bandwidth allocator 710 and a bandwidth monitor 720. The intermediary 200 may compress the data from the sender into compressed data packets 495. The compressed data packets 495 may be sent or transmitted to the receiver or a plurality of receivers. The receiver, or the plurality of receivers, may be any number of clients 102, servers 106, appliances 200, any of which may receive compressed data packets 495 compressed by the appliance 200.

In many embodiments, the sender may generate data and transmit the generated data in the form of a stream of data packets 480. In some embodiments, the sender may receive data from another sender and forward the data to the appliance 200. The sender may communicate with the application 200 transmitting the information back and forth. The information transmitted may comprising data packets 480. Data packets 480, in some embodiments, further comprise any number of signals, instructions, digital or analog data, digital data bits, electrical signals, optical signals, optical pulses, or any signals detectable by the sender or the receiver.

The appliance 200 illustrated in FIG. 7 may comprise a flow controller 220. The flow controller 220 may determine the rate of transmission of the data transmitted by the sender or the receiver. In a number of embodiments, the flow controller 220 determines the bandwidth usage of the sender or the receiver. In many embodiments, the flow controller 220 determines the bandwidth credit of the sender or the receiver. The flow controller 220 may also determine a difference between the rate of transmission of the sender or the receiver and the bandwidth usage of the sender or the receiver. The flow controller 220 may also determine a difference between the rate of transmission of the sender or the receiver to determine a bandwidth credit for the sender or the receiver. In a number of embodiments, the flow controller 220 determines that a difference between the rate of transmission of the sender and the bandwidth usage of the sender falls below or above a predetermined threshold of the bandwidth credit. In some embodiments, the flow controller 220 determines that a difference between the rate of transmission of the sender and the bandwidth usage of the sender falls within a predetermined threshold range.

The bandwidth credit may be any amount of data a sender may transmit. In some embodiments, the bandwidth credit may be an amount of bytes, megabytes, gigabytes or terabytes of data a sender may transmit over a period of time. In a number of embodiments, the bandwidth credit may be any amount of data a receiver may receive over a period of time. In some embodiments, the bandwidth credit of a sender or a receiver is not bounded by a period of time. Sometimes, a bandwidth credit is an amount of data, in bytes or megabytes for example, which a sender may send in a one-time transmission. In some embodiments, a bandwidth credit is an amount of data in any units of data a sender may transmit in any number of transmissions. Bandwidth credit, in some embodiments, may be an amount of bandwidth a sender, an appliance or a receiver may receive or transmit over a predetermined time period, or even sometimes independent from any time period.

The compression engine 238, illustrated by FIG. 7, may perform any compression of data or reformatting of data which traverses the appliance 200. In some embodiments, the compression engine 238 compresses the data of the appliance 200 using compression ratios which vary between from a sections of a data stream to a section of a data stream. For example, some groups of data packets 480 may be compressed using a compression ratio different from the compression ratios of other groups of data packets 480. In some embodiments, compression engine 238 comprises any functionality of a flow controller 220, a bandwidth measurer 450, or any other functionality of an appliance 200. In a number of embodiments, the compression engine 238 compresses the data transmitted by a sender using a specific compression ratio or a specific compression format. Sometimes, the compression format or the compression ratio used by the compression engine 238 is identified by the sender. In some embodiments, the appliance 200 or the compression engine 238 assigns a compression ratio used for compressing data transmitted by the sender based on identification of the sender. The compression engine 238 may compress data transmitted by the sender or the receiver by using an algorithm compressing data packets 480 from the sender into compressed data packets 495. Some compressed data packets 495 compressed by the compression engine 238 may have compression ratios different from the compression ratios of other compressed data packets 495 compressed by the compression engine 238. Compression engine 238, in some embodiments, monitors the compression ratios of each compressed data packets 495 and data packets 480. In some embodiments, the compression engine 238 maintains statistics relating the ratio of size of data packets 480 and compressed data packets 495 or compression ratios relating each of the data packets 480 or compressed data packets 495.

Bandwidth measurer 450, illustrated by FIG. 7, may be any device, unit or a function measuring bandwidth between any devices on a network 104, such as senders, receivers or appliances 200. In many embodiments, the bandwidth measurer monitors the bandwidth of the network 104 or over a portion of the network 104. In some embodiments, bandwidth measurer 450 measures the bandwidth between two or more appliances, senders or receivers on a network 104. In a number of embodiments, bandwidth measurer 450 measures the bandwidth between a sender and an appliance 200. In many embodiments, the bandwidth measurer 450 measures the bandwidth between the receiver and the appliance 200. The bandwidth 450 may measure the bandwidth between two or more appliances, clients or servers on the network, in the upload or the download directions separately. In some embodiments, bandwidth measurer 450 measures an average bandwidth usage over a period of time between a sender and an appliance 200. In many embodiments, bandwidth measurer 450 measures the amount of data transmitted between two devices on a network and determines the bandwidth between the two devices using the amount of the data transmitted and the amount of time it took to transmit the data. The bandwidth measurer 450 may measure an average bandwidth credit used by a sender or a receiver over a period of time. The bandwidth measurer 450 may also measure an average bandwidth usage over a period of time between a receiver and an appliance 200. The bandwidth measurer 450 may also measure an average bandwidth credit for a sender or a receiver unbounded by or independent from any period of time the bandwidth credit is to be used for. The average bandwidth usage may be updated after each period of time passes, thus keeping the average bandwidth usage updated. In some embodiments, the bandwidth measurer may measure the available bandwidth or the bandwidth unused by traffic, between any one of a sender and a receiver, sender and an appliance 200 or an appliance 200 and a receiver, or any other device or a group of devices on a network.

Bandwidth allocator 710 may be any device, function, component or unit for allocating bandwidth or establishing a bandwidth for any entity or device such as a sender, a receiver or an appliance 200. The bandwidth allocation may be in a form of a credit, subscription or annuity of bandwidth allocation in any type and form of units. Bandwidth allocator 710 may comprise any circuitry, software, algorithms, functions or devices for determining an amount of bandwidth to be allocated to any one of a sender, receiver or an appliance 200. Bandwidth allocator 710 may comprise any type and form of software, application, library, service, script, process, task or set of executable instructions. In many embodiments, bandwidth allocator 710 comprises any functionality of a bandwidth measurer 450. In some embodiments, bandwidth allocator 710 comprises a bandwidth measurer 450. In some embodiments, bandwidth measurer 450 comprises a bandwidth allocator 710 or comprises any functionality of a bandwidth allocator 710.

In some embodiments, bandwidth allocator 710 receives information relating to bandwidth measurement from a bandwidth measurer and allocates bandwidth in response to the received information. In a number of embodiments, bandwidth allocator receives information from a flow controller 220, compression engine 238, bandwidth monitor 720, a sender, a receiver or an appliance 220 and determines an amount of bandwidth to be allocated in response to the received information. In a variety of embodiments, bandwidth allocator 710 determines or establishes an amount of bandwidth to be allocated to any one of a sender, receiver or an appliance 200 using bandwidth statistics or bandwidth measurements, or any bandwidth related information from any one of bandwidth measurer 450, bandwidth monitor 720, flow controller 220 or any other component of an appliance 200. In a number of embodiments, bandwidth allocator 710 determines or establishes an amount of bandwidth to be allocated to any one of a sender, receiver or an appliance 200 using bandwidth statistics or bandwidth measurements or any bandwidth related information from a sender or a receiver. In some embodiments, bandwidth allocator 710 uses bandwidth usage statistics or measurements to allocate the bandwidth to any one of a sender a receiver or an appliance 200. In a plurality of embodiments, bandwidth allocator 710 allocates a bandwidth amount to a sender wherein the sender can transmit an amount of information or data identified by the bandwidth allocated within a specified amount of time. In some embodiments, bandwidth allocator 710 allocates a bandwidth amount to a sender to transmit an amount of information or data identified by the bandwidth allocated regardless of the timing of the transmission. In some embodiments, the bandwidth allocated by the bandwidth allocator 710 may be used by the sender to send a one time transmission whose bandwidth amount does not exceed the amount defined by the bandwidth allocated. In some embodiments, the bandwidth allocated by the bandwidth allocator 710 may be used by the sender to send a plurality of transmissions which use bandwidth amounts equal to or less than the allocated bandwidth amount.

Bandwidth monitor 720 may be any device, function, component, unit or piece of software or hardware monitoring bandwidth between any two or more devices, such as senders, receivers and appliances 200, on a network. In some embodiments, bandwidth monitor 720 comprises any circuitry, logic components, hardware, software or a combination of software and hardware for monitoring bandwidth on a network. Bandwidth monitor 720 710 may comprise any type and form of software, application, library, service, script, process, task or set of executable instructions. In some embodiments, bandwidth monitor comprises any one of, or any combination of a flow controller 220, compression engine 238, bandwidth measurer 450 and bandwidth allocator 710. In a number of embodiments, bandwidth monitor 720 comprises any functionality of any one or any combination of a bandwidth allocator 710, bandwidth measurer 450, compression engine 238 and a flow controller 220. In some embodiments, any one of a flow controller 220, compression engine 238, bandwidth measurer 450, bandwidth allocator 710 or bandwidth monitor 720 comprises any functionality, any features or any processes and functions of any one of, or any combination of a flow controller 220, compression engine 238, bandwidth measurer 450, bandwidth allocator 710, bandwidth monitor 720, appliance 200, sender and a receiver.

In some embodiments, bandwidth monitor 720 monitors bandwidth between a sender and an appliance 200 by measuring an amount of bandwidth used between the sender and the appliance 200. In some embodiments, bandwidth monitor 720 monitors bandwidth between a receiver and an appliance 200 by measuring an amount of bandwidth between the sender and the appliance. In a number of embodiments, bandwidth monitor 720 receives any number of signals or an inputs from any one of or any combination of: bandwidth measurer 450, bandwidth allocator 710, compression engine 238, flow controller 220, a sender, an appliance 200 or a receiver, and using the signals or inputs the bandwidth monitor 720 monitors the bandwidth. In some embodiments, the bandwidth monitor 720 monitors the bandwidth between a sender and a client, sender and a receiver or receiver and a client using a bandwidth measurement or a plurality of bandwidth measurements from any one of a bandwidth measurer 450, bandwidth allocator 710 or appliance 200.

In some embodiments, the bandwidth monitor 720 monitors any type of bandwidth activity via one or more bandwidth measurers 450. The bandwidth monitor 720 may interface to or communicate with a bandwidth measurer to obtain measures of bandwidth on a predetermined frequency, over predetermined time periods, ad-hoc or upon request. The bandwidth monitor may use any type and form of API to receive events, updates or information regarding a measurement of bandwidth performed by a bandwidth measurer. The bandwidth monitor 720 may monitor an amount of bandwidth used in relation to a bandwidth allocation to an entity such as a client. The bandwidth monitor 720 may monitor an amount of bandwidth used in relation to a bandwidth credit, subscription or annuity of an entity such as a client.

Figure 8:
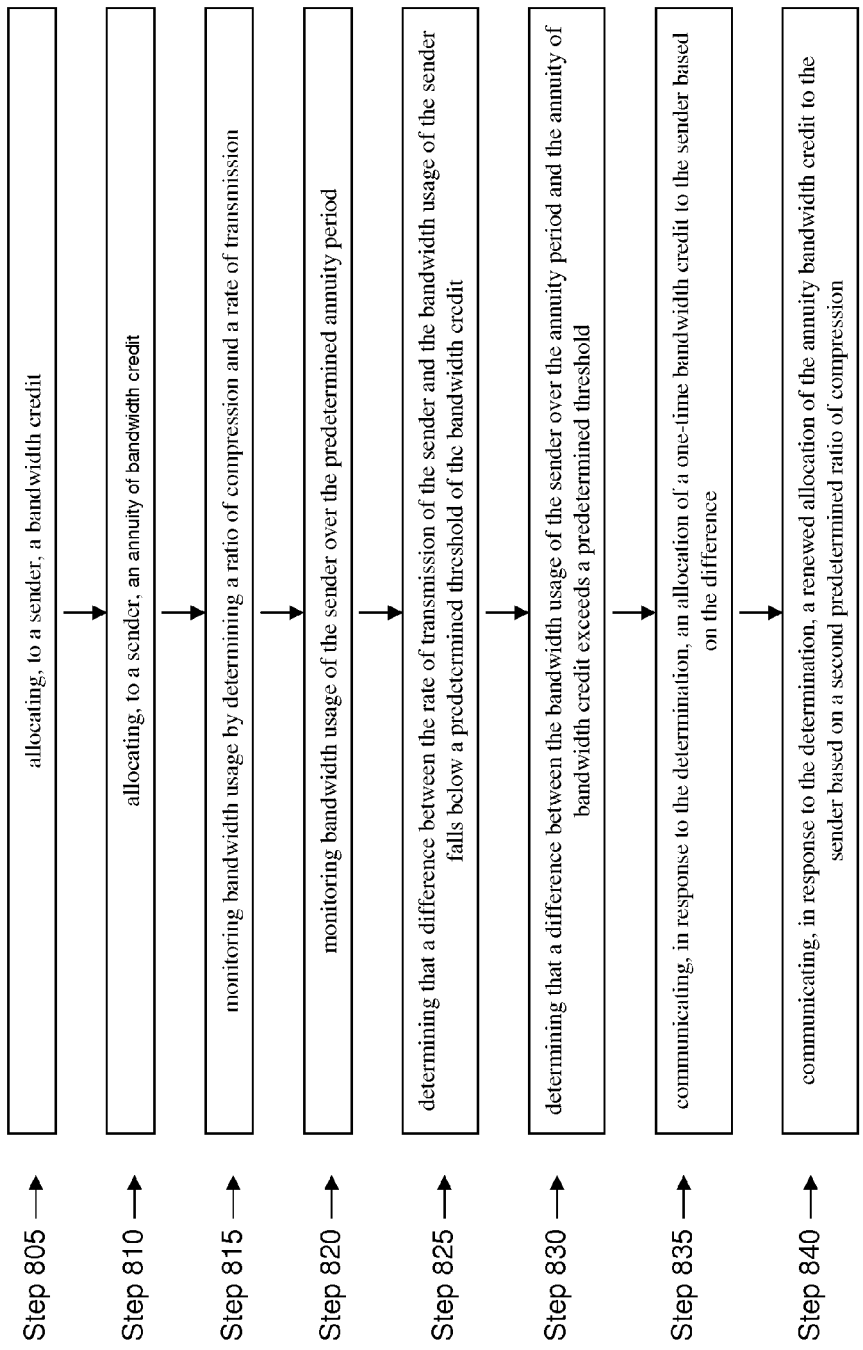
FIG. 8 is a flow diagram illustrating some embodiments of a method for bandwidth allocation relating to a communication between a sender and a receiver.

Referring now to FIG. 8, an embodiment of steps of a method 800 for allocating a bandwidth credit is illustrated. In some aspects, the method 800 comprises steps for allocating a bandwidth credit to an entity, such as a sender or a receiver. In many embodiments, an intermediary deployed between a sender and one or more receivers allocates a bandwidth credit of the sender or the receiver by comparing the allocated bandwidth credit to a measurement of data transmission rate. In some aspects, some steps of method 800 recite renewing an annuity of bandwidth credit of a sender or a receiver. In many embodiments, an intermediary deployed between a sender and one or more receivers renews an annuity of bandwidth credit of the sender by determining the allocated bandwidth credit to a measurement of data transmission rate. In addition, the method 800 may comprise any additional steps which may be implemented in any order.

FIG. 8 illustrates an embodiment of a method 800 comprising steps 805 through 840. At step 805, a bandwidth credit is allocated to a sender. In some embodiments, at Step 810 an annuity of bandwidth credit is allocated to the sender.

At step 815, bandwidth usage is monitored by determining a ratio of compression and a rate of transmission. At step 820, monitoring bandwidth usage of the sender over the predetermined annuity period. At step 825, a difference between the rate of transmission of the sender and the bandwidth usage of the sender is determined to fall below a predetermined threshold of the bandwidth credit. In some embodiments, at step 830, a difference between the bandwidth usage of the sender over the annuity period and the annuity of bandwidth credit is determined to exceed a predetermined threshold. At step 835 in response to the determination at step 825, an allocation of a one-time bandwidth credit is communicated to the sender, such as based on the difference. At step 840, in response to the determination at step 830, a renewed allocation of the annuity bandwidth credit is communicated to the sender based on a second predetermined ratio of compression.

In further detail of step 805, any type and form of bandwidth credit may be allocated to an entity, such as a sender. In some embodiments, an intermediary 200, allocates a bandwidth credit to a sender, a receiver, or even an intermediary 200. Sometimes, a bandwidth allocator 710 may allocate a bandwidth credit to a sender or a receiver. In many embodiments, a bandwidth credit allocated identifies an amount of data the sender may transmit over a predetermined period of time. In some embodiments, a bandwidth credit allocated identifies an amount of data the sender may transmit to one or more receivers. In a number of embodiments, the bandwidth credit allocated identifies an amount of data the sender may transmit to a receiver via an intermediary. In a variety of embodiments, the bandwidth credit allocated identifies an amount of data of the sender compressed by the intermediary and transmitted to the receiver. In some embodiments, a bandwidth credit is allocated by comparing a bandwidth credit determined to a measurement of data transmission rate between a sender and an intermediary 200. Sometimes, a bandwidth credit is allocated by comparing a bandwidth credit determined to a measurement of data transmission rate between a receiver and an intermediary 200. In many embodiments, a bandwidth credit to the sender or the receiver is allocated by comparing a bandwidth credit determined to a measurement of data transmission rate traversing an intermediary. In many embodiments, allocating a bandwidth credit to the sender or the receiver is completed using a determination of the compression of data of the sender compressed by the intermediary 200 or using a compression ratio of the data of the sender compressed by the intermediary 200. In a number of embodiments, a bandwidth credit is allocated using a determination of the compression of data of the receiver compressed by the intermediary 200, or using a compression ratio of the data of the sender compressed by the intermediary 200.

In some embodiments, a plurality of bandwidth credits may be allocated to a plurality of senders. Each of the plurality of bandwidth credits may correspond to each one of the senders and identifying an amount of data each of the plurality of senders may transmit to one or more receivers. In some embodiments, allocating a bandwidth credit to a sender comprises identification of an amount of data the sender may transmit in a one-time transmission to a receiver. In a number of embodiments, allocating a bandwidth credit to a sender comprises an identification of an amount of data the sender may transmit to a receiver over a plurality of transmissions within a predetermined period of time. In a plurality of embodiments, allocating a bandwidth credit to a sender comprises an identification of an amount of data the sender may transmit to a receiver over a plurality of transmissions not bounded by any period of time. Sometimes, allocating a bandwidth credit to a sender comprises an identification of an amount of data the sender may transmit to a receiver via an intermediary 200. In some embodiments, allocating a bandwidth credit to a sender comprises an identification of specific data the sender may transmit to a receiver. In a number of embodiments, an identification of an amount of data the sender may transmit to a receiver is responsive to an information relating the compression ratios of the data of the sender transmitted to the receiver and compressed by the intermediary.

At step 810, any type and form of annuity of bandwidth credit may be allocated to an entity, such as a sender. In some embodiments, an intermediary 200 allocates an annuity of bandwidth credit to a sender or a receiver. In a number of embodiments, a bandwidth allocator 710 allocates an annuity of bandwidth credit to a sender or a receiver. In many embodiments, an annuity of bandwidth credit allocated identifies an amount of data the sender may transmit over a predetermined period of time, such as every day, week, month, year or any other annuity period. In some embodiments, an annuity of bandwidth credit allocated identifies an amount of data the sender may transmit to one or more receivers. In a number of embodiments, the annuity of bandwidth credit allocated identifies an amount of data the sender may transmit to a receiver via an intermediary over the annuity period. In a variety of embodiments, the annuity of bandwidth credit allocated identifies an amount of data of the sender compressed by the intermediary and transmitted to the receiver over the annuity period. In some embodiments, an annuity of bandwidth credit of the sender or the receiver is allocated using an amount of bandwidth determined by an appliance 200 or bandwidth allocator 710. In a number of embodiments, an annuity of bandwidth credit is allocated by utilizing a determination of a data transmission rate of the data sent by the sender. In a number of embodiments, an annuity of bandwidth credit is allocated by utilizing a determination of a data transmission rate of the data sent by the receiver. In some embodiments, an annuity of bandwidth credit is allocated by using a determination of compression or compression ratio of data transmitted by the sender. Sometimes, an annuity of bandwidth credit is allocated by using a determination of compression or compression ratio of data transmitted by the receiver.

In some embodiments, a plurality of annuities of bandwidth credits are allocated to or for a plurality of senders. Each of the plurality of annuities of bandwidth credits may correspond to each one of the senders, identifying an amount of data each of the plurality of senders may transmit to one or more receivers. In some embodiments, allocating an annuity of bandwidth credit to a sender, or a receiver, comprises identification of an amount of data the sender or the receiver may transmit in a one-time transmission. In a number of embodiments, allocating an annuity of bandwidth credit comprises an identification of an amount of data the sender may transmit to a receiver over a plurality of transmissions within a predetermined period of time. In a plurality of embodiments, allocating an annuity of bandwidth credit to a sender comprises an identification of an amount of data the sender may transmit to a receiver over a plurality of transmissions not bounded by any period of time. Sometimes, allocating an annuity of bandwidth credit to a sender comprises an identification of an amount of data the sender may transmit to a receiver via an intermediary 200. In some embodiments, allocating an annuity of bandwidth credit to a sender comprises an identification of specific data the sender may transmit to a receiver. In a number of embodiments, an identification of an amount of data the sender may transmit to a receiver is responsive to an information relating the compression ratios of the data of the sender transmitted to the receiver and compressed by the intermediary. In some embodiments, an identification of an amount of data the sender may transmit to a receiver is responsive to a determination of data transmission rate of either a sender or a receiver.

At step 815, bandwidth usage is monitored, for example, by determining a ratio of compression and a rate of transmission. In some embodiments, a bandwidth monitor 720 monitors the bandwidth usage. In a number of the embodiments, the bandwidth usage monitored is the bandwidth usage of the sender. Sometimes, the bandwidth usage monitored may be the bandwidth usage of the receiver. In some embodiments, the bandwidth usage monitored is the bandwidth usage of the sender or the receiver traversing an intermediary 200. In a plurality of embodiments, bandwidth usage is monitored by determining a ratio of compression of data of the sender compressed by the intermediary. In many embodiments, bandwidth usage is monitored by determining a rate of transmission of data by the sender compressed by the intermediary. In some embodiments, bandwidth usage is monitored by determining a ratio of compression of data of the receiver compressed by the intermediary. In many embodiments, bandwidth usage is monitored by determining a rate of transmission of data by the receiver compressed by the intermediary. In some embodiments, bandwidth usage is monitored by determining a ratio of compression of data of the receiver or the sender traversing an intermediary within a predetermined amount of time. In many embodiments, the ratio of compression of data of the receiver or the sender is determined by determining an average of a compression of data compressed by the intermediary over a predetermined period of time. In many embodiments, the ratio of compression of data of the receiver or the sender is determined by determining a median of a compression of data compressed by the intermediary over a predetermined period of time. In many embodiments, the rate of transmission of compressed data is determined by establishing or estimating an average rate of transmission of compressed data over a predetermined period of time. In many embodiments, the rate of transmission of compressed data is determined by establishing or estimating a median rate of transmission of compressed data over a predetermined period of time. In some embodiments, bandwidth usage is monitored by determining a ratio of compression data of the sender compressed by the intermediary and a rate of transmission of compressed data of the sender transmitted by the intermediary to one or more receivers. In a variety of embodiments, bandwidth usage is monitored by measuring or monitoring bandwidth usage by any one of, or any combination of: a sender transmitting the data, the sender receiving the data, an appliance 200 receiving the data, the appliance 200 transmitting the data, a receiver receiving the data and the receiver transmitting the data.

At step 820, bandwidth usage of an entity, such as a sender, is monitored over the annuity period. In one embodiment, the annuity period comprises a predetermined annuity period. In many embodiments, the annuity period is a predetermined duration of time. In some embodiments, the bandwidth usage of the sender is monitored over a relatively longer annuity period, such as a week, a month or a year. In some embodiments, the bandwidth usage of the sender is monitored over a relatively shorter annuity period, such as a second, a minute, an hour, or a range of hours. In some embodiments, the annuity period is a period of time defined by a sender, receiver or an intermediary. In a plurality of embodiments, the annuity period is defined by a user transmitting information or data from the sender. In a number of embodiments, the annuity period is defined by a user receiving information or data on the receiver. In a plurality of embodiments, an operator of the intermediary 200 sets the predetermined annuity period. In some embodiments, the intermediary 200 determines the predetermined annuity period based on the statistics of the bandwidth usage by the sender or the receiver. In some embodiments, bandwidth measurer 450 or the bandwidth monitor 720 determines the predetermined annuity period. In a variety of embodiments, bandwidth usage is monitored by measuring bandwidth usage by any one of, or any combination of: a sender transmitting the data, the sender receiving the data, an appliance 200 receiving the data, the appliance 200 transmitting the data, a receiver receiving the data and the receiver transmitting the data.

At step 825, a difference between the rate of transmission of the sender and the bandwidth usage of the sender may be determined to fall below a predetermined threshold of the bandwidth credit. In some embodiments, the flow controller 220 determines that a difference between the rate of a transmission of the sender and the bandwidth usage of the sender falls below a predetermined threshold of the bandwidth credit. In various embodiments, the compression engine 238, the bandwidth measurer 450, the bandwidth allocator 710, the bandwidth monitor 720, or any other component of the intermediary 200 determines the difference between the rate of transmission of the sender and the bandwidth usage of the sender. In many embodiments, the predetermined threshold is a range, such as a predetermined threshold range. The difference between the rate of transmission and the bandwidth usage of the sender may fall within a predetermined threshold range. In a plurality of embodiments, the difference between the rate of transmission and the bandwidth usage of the sender falls outside of a predetermined threshold range. Predetermined threshold may be any value of the bandwidth, any amount of data or any amount of data per period of time. Predetermined threshold may be any number or a value. Predetermined threshold range may be any range of bandwidth, any range of data amount or any range of data amount per period of time. In some embodiments, the intermediary 200, or any intermediary 200 component determines that a difference between the rate of transmission of the sender and the bandwidth usage of the sender falls above a predetermined threshold of the bandwidth credit. In a number of embodiments, the predetermined threshold of the bandwidth credit is determined by comparing the amount of data of the compressed data packets 495 to the amount of data of the data packets 480 corresponding to the compressed data packets 495, before the same data packets 480 were compressed by the intermediary 200. In a number of embodiments, the predetermined threshold of the bandwidth credit is determined by using the amount of data of the compressed data packets 495 and the amount of data of the data packets 480 corresponding to the compressed data packets 495, before the same data packets 480 were compressed by the intermediary 200. In some embodiments, the predetermined threshold is determined by determining the compression ratios of the compressed data packets 495 in relation to the data packets 480 corresponding to the compressed data packets 495 before being compressed by the intermediary 200.

At step 830, a difference between the bandwidth usage of the sender over the annuity period and the annuity of bandwidth credit may be determined to exceed a predetermined threshold. In some embodiments, the predetermined threshold is a predetermined threshold of a bandwidth credit. In some embodiments, the flow controller 220 determines that a difference between the bandwidth usage of the sender over the annuity period and the annuity of bandwidth credit exceeds a predetermined threshold. In various embodiments, the compression engine 238, the bandwidth measurer 450, the bandwidth allocator 710, the bandwidth monitor 720, or any other component of the intermediary 200 determines the difference between the bandwidth usage of the sender over the annuity period and the annuity of bandwidth credit. In many embodiments, the predetermined threshold is a predetermined threshold range. The difference between the bandwidth usage of the sender over the annuity period and the annuity of bandwidth credit may fall within a predetermined threshold range. In a plurality of embodiments, the difference between the rate of transmission and the bandwidth usage of the sender falls outside of a predetermined threshold range. Predetermined threshold may be any value of the bandwidth, any amount of data or any amount of data per period of time. Predetermined threshold may be any number or a value. Predetermined threshold range may be any range of bandwidth, any range of data amount or any range of data amount per period of time. In some embodiments, the intermediary 200, or any intermediary 200 component determines that a difference between the rate of transmission of the sender and the bandwidth usage of the sender falls above a predetermined threshold. In a number of embodiments, the predetermined threshold is determined by comparing the amount of data of the compressed data packets 495 to the amount of data of the data packets 480 corresponding to the compressed data packets 495, before the same data packets 480 were compressed by the intermediary 200. In a number of embodiments, the predetermined threshold of the bandwidth credit is determined by using the amount of data of the compressed data packets 495 and the amount of data of the data packets 480 corresponding to the compressed data packets 495, before the same data packets 480 were compressed by the intermediary 200. In some embodiments, the predetermined threshold is determined by determining the compression ratios of the compressed data packets 495 in relation to the data packets 480 corresponding to the compressed data packets 495 before being compressed by the intermediary 200.

At step 835, in response to the determination, an allocation of a one-time bandwidth credit may be communicated to the sender based on the difference. In some embodiments, an allocation of a one-time bandwidth credit to a receiver is communicated. In some embodiments, communicating an allocation of a one-time bandwidth credit is based on the difference between the bandwidth usage of the sender over the annuity period and the annuity of bandwidth credit. In many embodiments, communicating an allocation of a one-time bandwidth credit is based on the difference between the bandwidth usage of the sender or the receiver over the annuity period and the annuity of bandwidth credit exceeding or not exceeding the predetermined threshold. In some embodiments, communicating an allocation of a one-time bandwidth credit is based on the difference between the rate of transmission of the sender or the receiver and the bandwidth usage. In a plurality of embodiments, communicating an allocation of a one-time bandwidth credit is based on the difference between the rate of transmission of the sender or the receiver and the bandwidth usage of the sender or the receiver falling below or above a predetermined threshold of the bandwidth credit. In some embodiments, communicating an allocation of a one-time bandwidth credit is in response to the determination. In a variety of embodiments, communicating an allocation of a one-time bandwidth credit is in response to the monitoring of the bandwidth usage. In a number of embodiments, communicating an allocation of a one-time bandwidth credit is in response to the monitoring of the bandwidth usage and the determining a difference between the rate of transmission of the sender or the receiver and the bandwidth usage of the sender or the receiver. In many embodiments, communicating an allocation of a one-time bandwidth credit is in response to the monitoring of the bandwidth usage and the determining of the difference between the bandwidth usage of the sender or the receiver over the annuity period and the annuity of bandwidth credit.

At step 840, in response to the determination, a renewed allocation of the annuity bandwidth credit is communicated to a sender based on a second predetermined ratio of compression. In a number of embodiments, a renewed allocation of the annuity bandwidth credit to a receiver is communicated. In some embodiments, communicating a renewed allocation of the annuity bandwidth credit is based on the difference between the bandwidth usage of the sender or the receiver over the annuity period and the annuity of bandwidth credit. In many embodiments, communicating a renewed allocation of the annuity bandwidth credit is based on the difference between the bandwidth usage of the sender or the receiver over the annuity period and the annuity of bandwidth credit, exceeding or not exceeding the predetermined threshold. In some embodiments, communicating a renewed allocation of the annuity bandwidth credit is based on the difference between the rate of transmission of the sender or the receiver and the bandwidth usage of the sender or the receiver. In a plurality of embodiments, communicating an allocation of a one-time bandwidth credit is based on the difference between the rate of transmission of the sender or the receiver and the bandwidth usage of the sender or the receiver falling below or above a predetermined threshold of the bandwidth credit. In some embodiments, communicating an allocation of a one-time bandwidth credit is in response to the determination. In a variety of embodiments, communicating an allocation of a one-time bandwidth credit is in response to the monitoring of the bandwidth usage of the sender or the receiver. In a number of embodiments, communicating an allocation of a one-time bandwidth credit is in response to the monitoring of the bandwidth usage and the determining a difference between the rate of transmission of the sender or the receiver and the bandwidth usage of the sender or the receiver. In many embodiments, communicating an allocation of a one-time bandwidth credit is in response to the monitoring of the bandwidth usage and the determining of the difference between the bandwidth usage of the sender or the receiver over the annuity period and the annuity of bandwidth credit.

In one example, a system for a more efficient control flow of a data stream communicated via an intermediary appliance deployed between a client and a server is presented. The system may include an application which desires to multiplex the delivery of two data streams via a TCP connection. One data stream may be non-real time (bulk) in nature whereas the other stream may be real-time in nature (interactive). Interactive traffic may be intermittent and inherently unpredictable in arrival time or magnitude. The quality of the user experience may be affected by the network transmission delay time of the interactive data. Yet in the instances where simultaneous bulk data and interactive data transfer is desired, the system may select a quantity of bulk data for transmission. The system may further schedule the transfer of the selected quantity of bulk data together with the interactive data.

A network transmission delay time of the combined data stream of the interactive and bulk data quantities may further include the transfer time and queuing delay time. The transfer time may be fixed by the physics of the transmission media (wire, wireless, optical, etc.). The queuing delay time may include a function of the behavior of the application combined with other applications in the network. Increasing the queuing time may result in a perceived decrease in the quality of the user experience as it incurs additional delay. Therefore, if the application sends the combined data stream (bulk and interactive) faster than the network can transmit it, the queuing time may increase and the user experience may be degraded. Conversely, if the application sends data slower than the network can transmit it, the application under-utilizes the available resources.

The system of the example may also include a model, such as a data transfer model, of the network bandwidth to determine the amount of data to queue for transmission in any specific interval of time. The model may also control additional internal and network synchronized processes. The inputs to the model may include an estimate of the amount of currently available network bandwidth and the amount of interactive and bulk data awaiting transmission. The model may operate by estimating an amount of data that can be transmitted by the network in the time available before the next scheduling event, such as a frame capture for example. The model may queue the estimated amount of data by selecting the estimated amount of data from the available interactive and bulk data awaiting transmission. In some instances where the available network BW may be relatively unchanged over a period of time such model may yield a desirable result, i.e., good utilization of the available resources without increasing the queuing delay that yields a degraded customer experience.

A bandwidth estimator, such as a Bandwidth Measurer, may obtain a bandwidth estimate from the receiver. The receiver may be able to make estimates of the available network bandwidth by noting the arrival time of packets. For example, if two or more packets were sent adjacent in time by the sender (which may be indicated by marking the packets), then the receiver can use the spacing in the arrival time of the packets to estimate the available bandwidth. In such cases, the receiver may include any of the intermediary appliance, the client or the server. In practice, there may be multiple layers of the system between the sender's marking of adjacently sent packets and the receiver's reception of the data. Each of these layers may have the opportunity to alter the relative arrival time of the packets and to affect the measurements (examples: multi-processor scheduling delays, variable speed CPUs, network queuing changes, cross-traffic in the network, network route flaps, link bonding, packet drops, etc.). Therefore, some estimates must may be smoothed to obtain a more stable and more accurate bandwidth estimation.

Further in relation to this example, in some instances insertion of high-performance compression into the network infrastructure may affect bandwidth estimation unless system has means to compensate. High-performance compression may include high compression ratios achieved independent of line speed. In some examples, the assumption that the network bandwidth is relatively unchanged over the scheduling period and estimation period may be invalid, as the network bandwidth may change. Therefore, unless the system includes some measures to compensate, the bandwidth estimation mechanism may be less accurate.

High-performance network-based compression may achieve high compression ratios, such as for example more than 100:1. As data may be processed by a compression engine, the compressibility of that data can quickly transition from one extreme to the other. For example, a compression may change from about 100:1 for a series of data packets to down to 10:1 or even 0.95:1. As such, the system which estimates bandwidth more accurately and accounts for changes in the bandwidth more quickly may handle these types of compression ratio transitions with a greater success.

The system may use packet dispersion (PD) for measuring the line-speed of the slowest link in a network connection. A sender may mark a group of two or more packets (aka a train) that are placed onto the initial network segment adjacent to each other (i.e., back to back with no 'dead time' on the link). As the train travels through the network the packets may be spaced apart based on the queuing and serialization delay of the various links that the train passes over. If the train passes through a "bottleneck" link the two packets may leave the bottleneck link spaced according to the line speed of that bottleneck link. Provided that the train experiences no more bottlenecks in the network, the packets may retain their spacing upon arrival at the receiver. The receiver may measure the actual arrival time of the packets. In some embodiments, this information, combined with the size of the packet train (except for the first packet) is used to compute a bandwidth for the bottleneck link. In some embodiments, the computation may be affected based on additional network effects or obstacles, such as for example packet reordering in the network, insertion of cross-traffic within the train, different routing paths for members of the train, packet retransmissions, repacketization from intermediate proxies, multi-programming issues within the host operating systems of the sender and receiver, etc. In one instance, a high-performance network-based compression may lead to obstacles to the computation. Consequently, the system may include features to allow a sender to quickly adapt to changes in the compression ratio of its data. This should prevent over-sending of data which leads to a detriment of interactive response times while simultaneously fully utilizing network resources.

The system may include configuration comprising a client, an upstream compression device (compressor) operating on an intermediary appliance near the client, a downstream decompression device (decompressor) operating on an intermediary appliance near the server and the server. In some embodiments, the client may be the data sender. In other embodiments, the server may send the data. In some embodiments, the data may flow between the client and the server simultaneously in both directions. When data flows from server to client, the intermediary appliance that is nearest to the server may perform compression and the intermediary appliance that is nearest to the client may perform decompression. The reversed configuration may be used in instances where the data is transmitted in the reversed direction or in both directions simultaneously. The network link between the upstream and downstream systems may be slower than the links between the client and upstream system (the intermediary appliance nearest to the client) and the server and the downstream system (the intermediary appliance nearest to the server).

The interactive traffic may be generated on a semi-regular basis by sampling the drawing operations of an application. Drawing may be stimulated by a receipt of input in a form of a keyboard or a mouse operation. An arrival-time and quantity of drawing output may be application or input sensitive. The system may operate on a periodic basis where each period is designated as a frame. Frame rates may be anywhere between 1 per second to 500 per second, such as for example 10 per second. Increasing the frame rate may provides a diminishing improvement of motion image with about 30-60 per second being a reasonable upper limit due to the physics of the eye-brain interface combined with conventional display systems. Decreasing the frame-rate may cause a corresponding decline in the perceived user experience. For each frame period, the system may process the queued drawing operations turning them into interactive network data. The network data may comprise an unpredictable and time varying amount. The system may queue the interactive data for transmission across the network. If the current network transfer rate bandwidth is smaller than the interactive data generation rate, then the next frame-capture time may be delayed until the network model indicates that the network is free from backlog. This may prevent an increase in queuing delay in the network and it may result in reducing the frame-capture rate.

In some embodiments, if the model indicates or determines that transmission of the interactive data will complete prior to the next frame-capture time of the next frame of data to be transmitted, then a quantity of bulk data is selected and queued for transmission. The quantity of bulk selected may be dependent on a determination of how much available bandwidth there is for transmitting the bulk data. The sender or the intermediary appliance system closest to the sender may maintain a network model that predicts the occupancy of data on the network. This model may use recent estimates of network bandwidth and compression ratio to predict network queuing of transmitted data.

Similarly, the compressor on the intermediary appliance may also maintain a network model which predicts network queuing backlog. The compressor's model may be more accurate since it may use actually compressed data statistics rather than the estimated (and outdated) value used by the original sender, such as the client or the server. As the sender of the system sends data, the sender may add to the data stream a model-state message. The model-state message may include information that describes a current state of the sender's network model. In some embodiments, the model-state message is referred to as the first set of values and determinations. The current state may include a current point in the data stream transmitted or queued. The model message may further include a message id, such as a uniqueness token for example. The sender may preserve the state of its model at each point that a model-state message is sent as well as a record of data that was sent between model-state messages. In one embodiment, a predetermined number of the most recent messages are preserved. The predetermined number may be set based on the near-worst-cast latency expected in communication with the compressor and the frequency of message insertion.

The compressor may receive the sender's model-state message and compare that model state to the compressor's more accurate model state. This may result in the computation of a backlog delta. If the delta is sufficiently large enough then a model-state-update message may be sent from the compression engine back to the sender. The model-state-update message may include the message id from the model-state message that triggered this message as well as the updated and corrected model parameters, i.e., new values for recent compression ratio, bandwidth, and backlog.

The model-state-update message may be received by the sender. In some embodiments, the model-state-update message includes the next set of values and determinations or the updated set of values and determinations. The sender may extract the data and looks back into the preserved network model associated with this model-state-update. The sender may compare the model-state-update message with the latest network model state estimate of the sender's model. In some embodiments, the sender may discard some older model state preservation. The new values of the network model may be substituted into the model history state vector and all 'newer' model states may be updated with the parameters of the model-state-update message. Updating of the parameters may result in a new backlog value.

The newly updated sender's model may use the updated parameters recalculate or update the behavior of the frame-capture logic and control the transmission of additional bulk data. In some embodiments, if the sender determines using the updated parameters that the backlog is above a threshold of time, the sender may sleep or cease transmissions for a substantial portion of that time. The sender may wait for the backlog to decline or to reach a state at which the sender may resume transmissions. In other embodiments, if the sender determines that the backlog is below a threshold of time but the next frame capture event is within another threshold of time, then the frame capture processing is initiated. In yet other embodiments, if the sender determines that the backlog is below a threshold of time and the next frame capture event is more than another threshold of time, then an amount of bulk data is selected for transmission. The sender may use model and the parameters to avoid driving the network backlog above a threshold of time. By keeping this threshold low, the sender may minimize the effects of over-estimating the compression ratio.

In another embodiment, the system of the example sets the compression ratio estimate used by the sender to a value somewhat less than the most recently measured value. Such a "conservative" setting of the value may minimize the effects of over-estimating the compression ratio. In some embodiments, either the sender and/or the compressor can convert the measured value into the "conservative" setting used by the sender. In further embodiments, by frequent insertion of a model-state message, the sender provides opportunities for the compressor to inform the sender of the availability of additional network bandwidth. In some embodiments, different compression ratio values are maintained for the different types of data, bulk and interactive.

The compressor on the intermediary appliance closest to the sender may perform bandwidth estimation using any number of techniques. In some embodiments, the compressor/decompressor system on the two appliances uses packet trains. In some embodiments, compressed packets themselves are marked which may overcome the effects of compression. In other embodiments, the TCP congestion window combined with the TCP smoothed round trip time (SRTT) are used to make a bandwidth estimate without the explicit cooperation of the receiver beyond the receiver's TCP stack.

Many alterations and modifications may be made by those having ordinary skill in the art without departing from the spirit and scope of the disclosure. Therefore, it should be clear that any of the embodiments presented above may be combined with any other embodiments above for expressing any other aspects of the disclosure. It should also be expressly understood that the illustrated embodiments have been shown only for the purposes of example and should not be taken as limiting the disclosure, which is defined by the following claims. These claims are to be read as including what they set forth literally and also those equivalent elements which are insubstantially different, even though not identical in other respects to what is shown and described in the above illustrations.

What is claimed:

1. A method of controlling flow of data communicated by a sender, the method comprising:
   (a) identifying, by a data transfer manager of a sender, in a queue of data to be transmitted by the sender to a receiver via a computer network with a device intermediary to the sender and the receiver, between bulk data and interactive data generated by and requested to be transmitted to the receiver by an application on the sender, the device storing the bulk data and interactive data in the queue of data waiting for transmission to the receiver;
   (b) receiving, by the data transfer manager, from the device backlog information of an amount of data transmitted by the sender to the receiver but still queued at the device to be transmitted by the device to the receiver, and at least one of a value of bandwidth between the device and the receiver or a compression ratio of compression of data between the device and the receiver; and
   (c) determining, by the data transfer manager, a first amount of interactive data and a second amount of bulk data to be transmitted from the queue based on the backlog information comprising at least one of the value of bandwidth or the compression ratio; and
   (d) updating, by the data transfer manager, the backlog information with the at least one of the value of bandwidth or the compression ratio.

2. The method of claim 1, wherein step (b) further comprises receiving, by the data transfer manager, from the device a value of bandwidth between the device and the receiver.

3. The method of claim 2, wherein step (c) further comprises determining the first amount of interactive data and the second amount of bulk data to be transmitted from the queue based on the backlog information and the value of bandwidth.

4. The method of claim 1, wherein step (b) further comprises receiving, by the data transfer manager, from the device a compression ratio of compression of data between the device and the receiver.

5. The method of claim 4, wherein step (c) further comprises determining the first amount of interactive data and the second amount of bulk data to be transmitted from the queue based on the backlog information and the compression ratio.

6. The method of claim 1, wherein step (a) further comprises identifying from the data generated by the application the bulk data comprising data that is not real time data.

7. The method of claim 1, wherein step (a) further comprises identifying from the data generated by the application the interactive data comprising data that is real time data.

8. The method of claim 1, wherein step (a) further comprises distinguishing between interactive data and bulk data from the data generated by the application.

9. The method of claim 1, wherein step (b) further comprises receiving, by the data transfer manager, from the device backlog information comprising an amount of data in a second queue of the device waiting to be transmitted by the device to the receiver.

10. The method of claim 1, wherein step (c) further comprises determining, by the data transfer manager based on the backlog information, a first timing of a first amount of bulk data and a second timing of a second amount of interactive data from the queue to be sent by the sender.

11. A system for controlling flow of data communicated by a sender, the system comprising:
    a sender comprising at least a processor coupled to a memory and in communication via a computer network with a device intermediary to the sender and a receiver;
    wherein the memory stores computer executable instructions that when executed by the processor performs the operations of a data transfer manager of the sender to identify, in a queue of data to be transmitted by the sender to the receiver, between bulk data and interactive data generated by and requested to be transmitted to the receiver by an application on the sender, the device storing the bulk data and interactive data in the queue of data waiting for transmission to the receiver; and
    receive from the device backlog information of an amount of data transmitted by of the sender but still queued at the device to be transmitted by the device to the receiver and at least one of a value of bandwidth between the device and the receiver or a compression ratio of compression of data between the device and the receiver, determine a first amount of interactive data and a second amount of bulk data to be transmitted from the queue based on the backlog information comprising at least one of the value of bandwidth or the compression ratio; and
    update the backlog information with the at least one of the value of bandwidth or the compression ratio.

12. The system of claim 11, wherein the data transfer manager is further configured to receive from the device a value of bandwidth between the device and the receiver.

13. The system of claim 12, wherein the data transfer manager is further configured to determine the first amount of interactive data and the amount of bulk data to be transmitted from the queue based on the backlog information and the value of bandwidth.

14. The system of claim 11, wherein the data transfer manager is further configured to receive from the device a compression ratio of compression of data between the device and the receiver.

15. The system of claim 14, wherein the data transfer manager is further configured to determine the first amount of interactive data and the second amount of bulk data to be transmitted from the queue based on the backlog information and the compression ratio.

16. The system of claim 11, wherein the bulk data comprises data that is not real time data.

17. The system of claim 11, wherein the interactive data comprises data that is real time data.

18. The system of claim 11, wherein the data transfer manager is further configured to distinguish between interactive data and bulk data from the data generated by the application.

19. The system of claim 11, wherein the data transfer manager is further configured to receive from the device backlog information comprising an amount of data in a second queue of the device waiting to be transmitted by the device to the receiver.

20. The system of claim 11, wherein the data transfer manager is further configured to determine based on the backlog information, a first timing of the first amount of interactive data and a second timing of the second amount of bulk data from the queue to be sent by the sender.

* * * * *